(12) United States Patent
Day et al.

(10) Patent No.: US 11,567,627 B2
(45) Date of Patent: Jan. 31, 2023

(54) ECLIPSE CURSOR FOR VIRTUAL CONTENT IN MIXED REALITY DISPLAYS

(71) Applicant: Magic Leap, Inc., Plantation, FL (US)

(72) Inventors: John Austin Day, Miami, FL (US); Lorena Pazmino, Wilton Manors, FL (US); James Cameron Petty, Pleasant Hill, CA (US); Paul Armistead Hoover, Bothell, WA (US); Chris Sorrell, Seattle, WA (US); James M. Powderly, Ft. Lauderdale, FL (US); Savannah Niles, Ft. Lauderdale, FL (US); Richard St. Claire Bailey, Plantation, FL (US)

(73) Assignee: MAGIC LEAP, INC., Plantation, FL (US)

( * ) Notice: Subject to any disclaimer, the term of this patent is extended or adjusted under 35 U.S.C. 154(b) by 259 days.

(21) Appl. No.: 15/920,830

(22) Filed: Mar. 14, 2018

(65) Prior Publication Data

US 2019/0235729 A1    Aug. 1, 2019

Related U.S. Application Data

(63) Continuation-in-part of application No. 15/884,117, filed on Jan. 30, 2018, now Pat. No. 10,540,941.

(51) Int. Cl.
*G06F 3/04817* (2022.01)
*G06F 3/04812* (2022.01)
(Continued)

(52) U.S. Cl.
CPC .......... *G06F 3/04817* (2013.01); *G06F 3/012* (2013.01); *G06F 3/0485* (2013.01);
(Continued)

(58) Field of Classification Search
CPC ............ G06F 3/04817; G06F 3/04812; G06F 3/04815; G06F 3/0485; G06F 2203/048; G06F 3/012; G09G 5/08
See application file for complete search history.

(56) References Cited

U.S. PATENT DOCUMENTS 5,745,713 A * 4/1998 Ferguson ................ G06F 9/451
                                                                    715/716
6,091,415 A    6/2000 Chang et al.
(Continued)

FOREIGN PATENT DOCUMENTS

JP    2006-179006 A    7/2006
JP    2009-080345 A    4/2009
(Continued)

OTHER PUBLICATIONS

U.S. Appl. No. 14/641,376, filed Mar. 7, 2015, Bradski et al.
(Continued)

*Primary Examiner* — Thu V Huynh
(74) *Attorney, Agent, or Firm* — Seed IP Law Group LLP

(57) ABSTRACT

Systems and methods for displaying a cursor and a focus indicator associated with real or virtual objects in a virtual, augmented, or mixed reality environment by a wearable display device are disclosed. The system can determine a spatial relationship between a user-movable cursor and a target object within the environment. The system may render a focus indicator (e.g., a halo, shading, or highlighting) around or adjacent objects that are near the cursor. When the cursor overlaps with a target object, the system can render the object in front of the cursor (or not render the cursor at all), so the object is not occluded by the cursor. The object can be rendered closer to the user than the cursor. A group (Continued)

of virtual objects can be scrolled, and a virtual control panel can be displayed indicating objects that are upcoming in the scroll.

24 Claims, 45 Drawing Sheets

(51) Int. Cl.
  *G06F 3/04815* (2022.01)
  *G06F 3/0485* (2022.01)
  *G06F 3/01* (2006.01)
  *G09G 5/08* (2006.01)

(52) U.S. Cl.
  CPC ...... *G06F 3/04812* (2013.01); *G06F 3/04815* (2013.01); *G09G 5/08* (2013.01); *G06F 2203/04804* (2013.01); *G09G 2340/12* (2013.01); *G09G 2354/00* (2013.01)

(56) References Cited

U.S. PATENT DOCUMENTS

| | | | |
|---|---|---|---|
| 6,084,589 A * | 7/2000 | Shima | G06F 16/954 |
| | | | 345/419 |
| D473,236 S | 4/2003 | Robbin et al. | |
| 6,636,239 B1 | 10/2003 | Arquie et al. | |
| 6,850,221 B1 | 2/2005 | Tickle | |
| 6,882,354 B1 | 4/2005 | Nielsen | |
| 6,918,087 B1 | 7/2005 | Gantt | |
| 7,202,867 B1 | 4/2007 | Rodriguez et al. | |
| 7,546,543 B2 | 6/2009 | Louch et al. | |
| 7,765,491 B1 | 7/2010 | Cotterill | |
| D660,313 S | 5/2012 | Williams et al. | |
| D712,920 S | 9/2014 | Sloo et al. | |
| 8,950,867 B2 | 2/2015 | Macnamara | |
| D733,740 S | 7/2015 | Lee et al. | |
| D733,741 S | 7/2015 | Lee et al. | |
| 9,081,426 B2 | 7/2015 | Armstrong | |
| 9,215,293 B2 | 12/2015 | Miller | |
| 9,285,973 B1 | 3/2016 | Gable | |
| 9,310,559 B2 | 4/2016 | Macnamara | |
| 9,348,143 B2 | 5/2016 | Gao et al. | |
| D758,367 S | 6/2016 | Natsume | |
| 9,417,452 B2 | 8/2016 | Schowengerdt et al. | |
| 9,470,906 B2 | 10/2016 | Kaji et al. | |
| 9,547,174 B2 | 1/2017 | Gao et al. | |
| D781,339 S | 3/2017 | Li et al. | |
| 9,619,105 B1 | 4/2017 | Dal Mutto | |
| 9,671,566 B2 | 6/2017 | Abovitz et al. | |
| 9,740,006 B2 | 8/2017 | Gao | |
| D797,138 S | 9/2017 | Reiter et al. | |
| D797,735 S | 9/2017 | Fraser et al. | |
| D797,767 S | 9/2017 | Esselstrom et al. | |
| 9,791,700 B2 | 10/2017 | Schowengerdt et al. | |
| D806,107 S | 12/2017 | Kim et al. | |
| 9,851,563 B2 | 12/2017 | Gao et al. | |
| D809,001 S | 1/2018 | Funnell, II et al. | |
| 9,857,591 B2 | 1/2018 | Welch et al. | |
| 9,874,749 B2 | 1/2018 | Bradski et al. | |
| D813,900 S | 3/2018 | Karunamuni | |
| D820,307 S | 6/2018 | Jian et al. | |
| D829,239 S | 9/2018 | Rehman | |
| 10,078,919 B2 | 9/2018 | Powderly et al. | |
| D836,107 S | 12/2018 | Natsume et al. | |
| 10,220,303 B1 * | 3/2019 | Schmidt | A63F 13/42 |
| D858,550 S | 9/2019 | Crandall et al. | |
| 10,540,941 B2 | 1/2020 | Day et al. | |
| D879,821 S | 3/2020 | Gray et al. | |
| D897,353 S | 9/2020 | Hall et al. | |
| D900,859 S | 11/2020 | Satterlie et al. | |
| D902,948 S | 11/2020 | Fuller et al. | |
| D905,730 S | 12/2020 | Newsom | |
| D908,728 S | 1/2021 | Lee et al. | |
| 10,885,874 B2 | 1/2021 | Day et al. | |
| D915,424 S | 4/2021 | Elgena et al. | |
| D916,819 S | 4/2021 | Crandall et al. | |
| D916,851 S | 4/2021 | Crandall | |
| D923,028 S | 6/2021 | Perron et al. | |
| 11,157,159 B2 | 10/2021 | Bailey et al. | |
| D934,872 S | 11/2021 | Natsume et al. | |
| D934,873 S | 11/2021 | Natsume et al. | |
| D934,885 S | 11/2021 | Sung et al. | |
| D936,093 S | 11/2021 | Na et al. | |
| D938,978 S | 12/2021 | Vertierra et al. | |
| 2003/0058241 A1 | 3/2003 | Hsu | |
| 2003/0079224 A1 | 4/2003 | Komar et al. | |
| 2004/0210852 A1 | 10/2004 | Balakrishnan et al. | |
| 2005/0116929 A1 | 6/2005 | Molander et al. | |
| 2006/0028436 A1 | 2/2006 | Armstrong | |
| 2006/0132460 A1 | 6/2006 | Kolmykov-Zotov et al. | |
| 2006/0248447 A1 * | 11/2006 | Makkonen | G06F 3/04812 |
| | | | 715/210 |
| 2007/0081123 A1 | 4/2007 | Lewis | |
| 2007/0174790 A1 * | 7/2007 | Jing | G06F 3/0482 |
| | | | 715/838 |
| 2007/0182730 A1 * | 8/2007 | Mashitani | H04N 13/31 |
| | | | 345/419 |
| 2007/0186191 A1 | 8/2007 | Kraemer et al. | |
| 2009/0260022 A1 | 10/2009 | Louch et al. | |
| 2009/0325607 A1 | 12/2009 | Conway et al. | |
| 2010/0107120 A1 | 4/2010 | Sareen et al. | |
| 2010/0131886 A1 | 5/2010 | Gannon et al. | |
| 2010/0174993 A1 * | 7/2010 | Pennington | G06F 1/1616 |
| | | | 715/738 |
| 2010/0180186 A1 * | 7/2010 | Skinner | G06F 21/10 |
| | | | 715/205 |
| 2010/0306704 A1 | 12/2010 | Cotterill | |
| 2011/0018797 A1 | 1/2011 | Yen et al. | |
| 2011/0074918 A1 | 3/2011 | Klappert et al. | |
| 2011/0202869 A1 | 8/2011 | Sung | |
| 2011/0246942 A1 * | 10/2011 | Misawa | G06F 3/04815 |
| | | | 715/830 |
| 2011/0294551 A1 | 12/2011 | Forstall et al. | |
| 2011/0320962 A1 | 12/2011 | Naganawa | |
| 2012/0127062 A1 | 5/2012 | Bar-Zeev et al. | |
| 2012/0154446 A1 | 6/2012 | Adams et al. | |
| 2012/0162549 A1 | 6/2012 | Gao et al. | |
| 2012/0206345 A1 * | 8/2012 | Langridge | G06F 3/0304 |
| | | | 345/157 |
| 2012/0218395 A1 | 8/2012 | Anderson et al. | |
| 2012/0290950 A1 | 11/2012 | Rapaport et al. | |
| 2013/0082922 A1 | 4/2013 | Miller | |
| 2013/0100114 A1 * | 4/2013 | Lynch | G06T 11/00 |
| | | | 345/419 |
| 2013/0117377 A1 | 5/2013 | Miller | |
| 2013/0125027 A1 | 5/2013 | Abovitz | |
| 2013/0135309 A1 | 5/2013 | King et al. | |
| 2013/0185642 A1 | 7/2013 | Gammons | |
| 2013/0208234 A1 | 8/2013 | Lewis | |
| 2013/0242262 A1 | 9/2013 | Lewis | |
| 2013/0263044 A1 * | 10/2013 | MacLaurin | G06F 3/04855 |
| | | | 715/786 |
| 2013/0265220 A1 | 10/2013 | Fleischmann et al. | |
| 2013/0278631 A1 | 10/2013 | Border et al. | |
| 2013/0325154 A1 | 12/2013 | Oh et al. | |
| 2014/0003762 A1 | 1/2014 | Macnamara | |
| 2014/0047392 A1 | 2/2014 | Kim et al. | |
| 2014/0071539 A1 | 3/2014 | Gao | |
| 2014/0137016 A1 | 5/2014 | Cui | |
| 2014/0177023 A1 | 6/2014 | Gao et al. | |
| 2014/0195985 A1 | 7/2014 | Yoon et al. | |
| 2014/0218468 A1 | 8/2014 | Gao et al. | |
| 2014/0267420 A1 | 9/2014 | Schowengerdt | |
| 2014/0306866 A1 | 10/2014 | Miller et al. | |
| 2014/0306993 A1 | 10/2014 | Poulos et al. | |
| 2015/0015460 A1 | 1/2015 | Kobayashi et al. | |
| 2015/0016777 A1 | 1/2015 | Abovitz et al. | |
| 2015/0040040 A1 | 2/2015 | Balan et al. | |
| 2015/0062164 A1 | 3/2015 | Kobayashi et al. | |
| 2015/0103306 A1 | 4/2015 | Kaji et al. | |
| 2015/0178939 A1 | 6/2015 | Bradski et al. | |
| 2015/0186728 A1 | 7/2015 | Kimura | |

(56) References Cited

U.S. PATENT DOCUMENTS

| | | |
|---|---|---|
| 2015/0205126 A1 | 7/2015 | Schowengerdt |
| 2015/0205358 A1 | 7/2015 | Lyren |
| 2015/0206321 A1 | 7/2015 | Scavezze et al. |
| 2015/0222883 A1 | 8/2015 | Welch |
| 2015/0222884 A1 | 8/2015 | Cheng |
| 2015/0235441 A1 | 8/2015 | Abovitz et al. |
| 2015/0268415 A1 | 9/2015 | Schowengerdt et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0331601 A1 | 11/2015 | Rosenberg |
| 2015/0346490 A1 | 12/2015 | TeKolste et al. |
| 2015/0346495 A1 | 12/2015 | Welch et al. |
| 2015/0370072 A1 | 12/2015 | Lee et al. |
| 2016/0011419 A1 | 1/2016 | Gao |
| 2016/0025981 A1 | 1/2016 | Burns et al. |
| 2016/0026253 A1 | 1/2016 | Bradski et al. |
| 2016/0062470 A1 | 3/2016 | Pandey et al. |
| 2016/0085302 A1 | 3/2016 | Publicover et al. |
| 2016/0132139 A1 | 5/2016 | Du et al. |
| 2016/0196018 A1* | 7/2016 | Lee .................... H04N 21/4821 715/768 |
| 2016/0357398 A1 | 12/2016 | Frem et al. |
| 2016/0364916 A1 | 12/2016 | Terahata et al. |
| 2017/0018031 A1* | 1/2017 | Bandy .................... H04L 67/42 |
| 2017/0068430 A1* | 3/2017 | Brown ................. G06F 3/0488 |
| 2017/0109936 A1 | 4/2017 | Powderly et al. |
| 2017/0242479 A1 | 8/2017 | Moravetz |
| 2017/0287225 A1 | 10/2017 | Powderly et al. |
| 2017/0357333 A1 | 12/2017 | Balan et al. |
| 2018/0315248 A1 | 1/2018 | Bastov et al. |
| 2018/0045963 A1 | 2/2018 | Hoover et al. |
| 2018/0276898 A1 | 9/2018 | Nishizawa |
| 2018/0292969 A1 | 10/2018 | Dhawan et al. |
| 2018/0321798 A1* | 11/2018 | Kawamura ........... G06F 3/0481 |
| 2018/0350145 A1 | 12/2018 | Byl et al. |
| 2019/0114835 A1 | 4/2019 | Costa et al. |
| 2019/0237044 A1 | 8/2019 | Day et al. |
| 2019/0377487 A1 | 12/2019 | Bailey |
| 2020/0135141 A1 | 4/2020 | Day et al. |
| 2021/0166653 A1 | 6/2021 | Day |
| 2022/0075517 A1 | 3/2022 | Bailey |

FOREIGN PATENT DOCUMENTS

| | | |
|---|---|---|
| JP | 2014-191235 A | 10/2014 |
| JP | 2015-222891 A | 12/2015 |
| WO | WO 2019/152286 | 8/2019 |
| WO | WO 2019/236344 | 12/2019 |

OTHER PUBLICATIONS

U.S. Appl. No. 14/555,585, filed Nov. 27, 2014, Schowengerdt.
U.S. Appl. No. 14/690,401, filed Apr. 18, 2015, Miller et al.
U.S. Appl. No. 14/212,961, filed Mar. 4, 2014, Schowengerdt et al.
U.S. Appl. No. 14/331,218, filed Jul. 14, 2014, Abovitz et al.
U.S. Appl. No. 62/005,807, filed May 30, 2014, Klug et al.
U.S. Appl. No. 62/012,273, filed Jun. 14, 2014, Bradski.
U.S. Appl. No. 62/681,888, filed Jun. 7, 2018, Bailey et al.
Invitation to Pay Additional Fees for PCT Application No. PCT/US19/15274, dated Jun. 10, 2019.
International Search Report and Written Opinion for PCT Application No. PCT/US19/15274, dated Aug. 2, 2019.
International Preliminary Report for Patentability for PCT Application No. PCT/US19/15274, dated Aug. 4, 2020.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

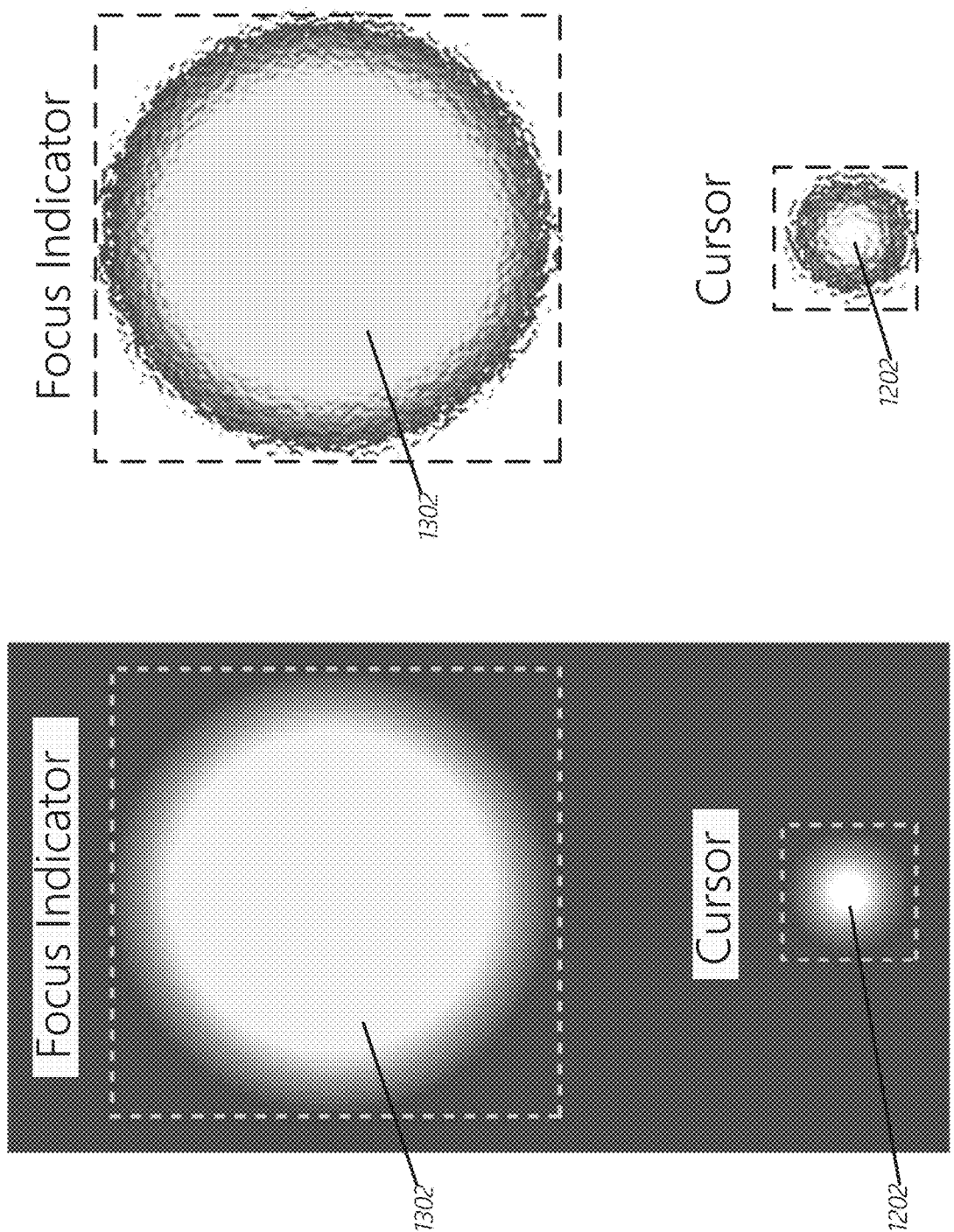

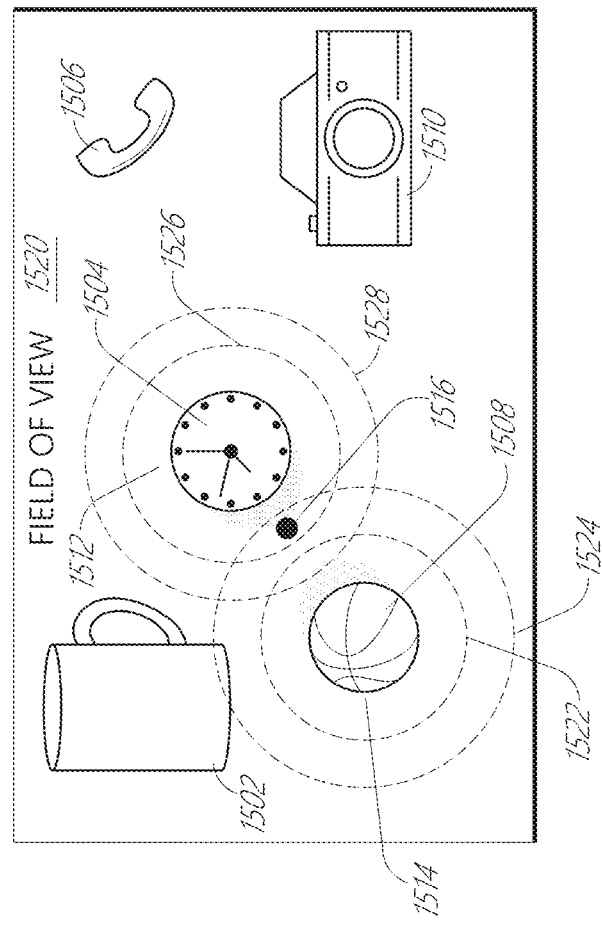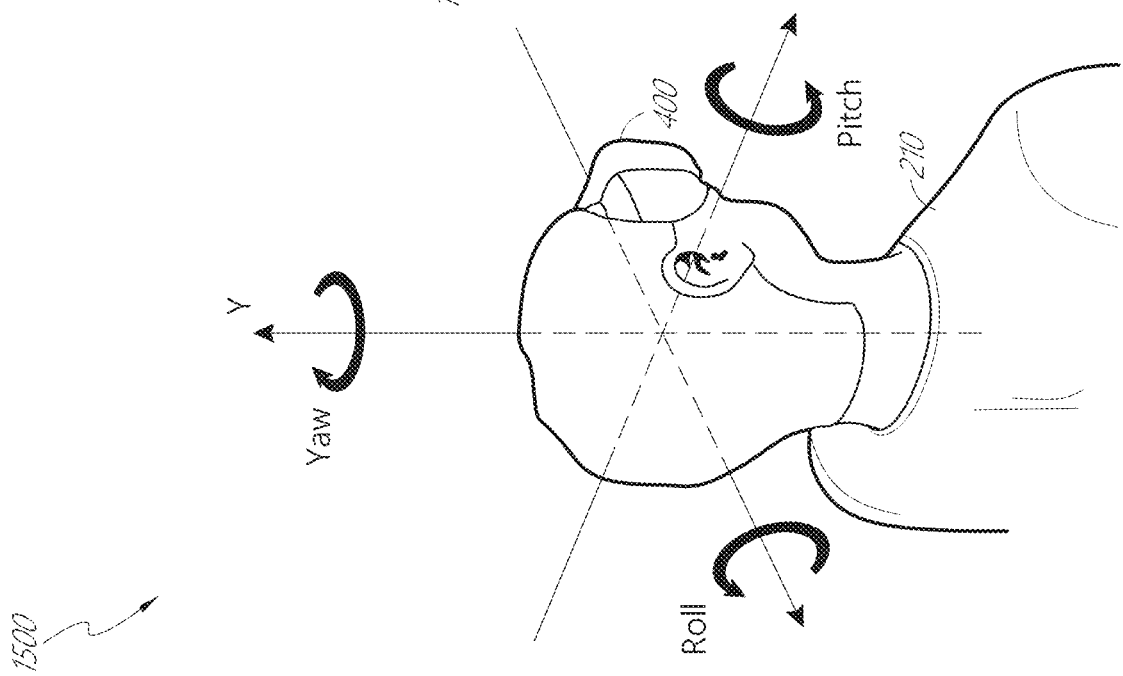
FIG. 15B

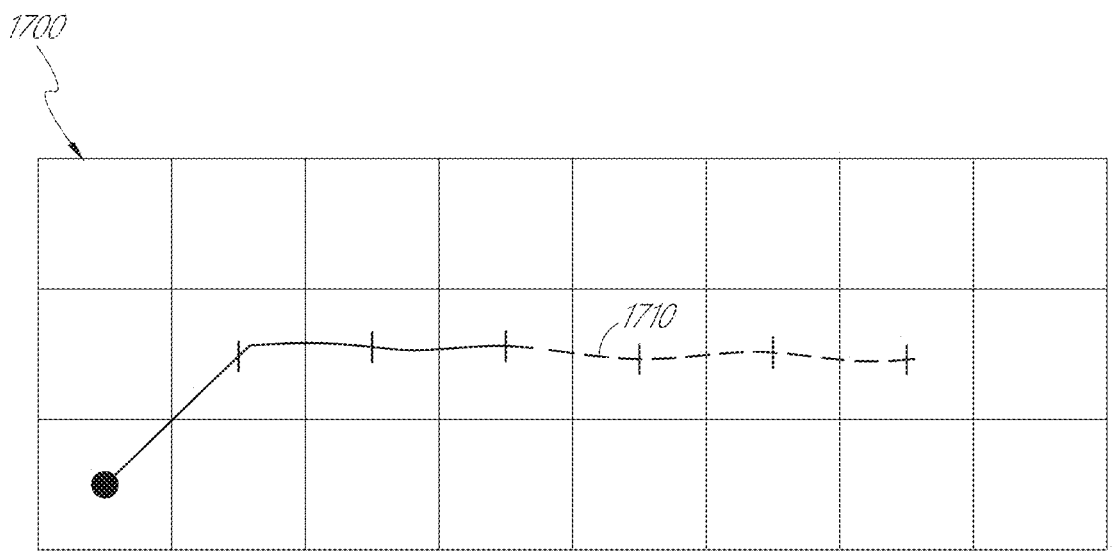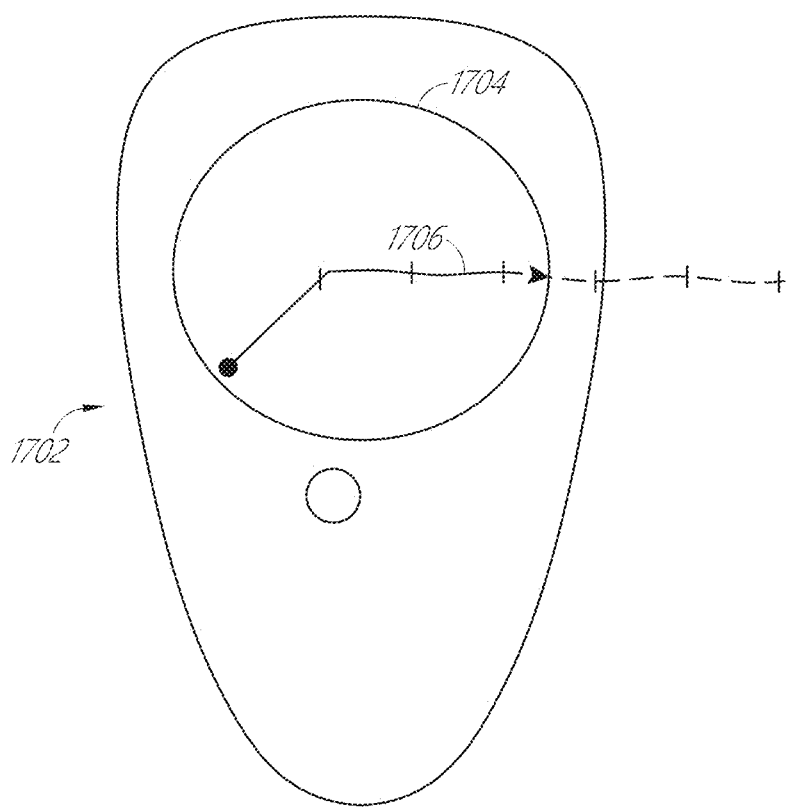
FIG. 17

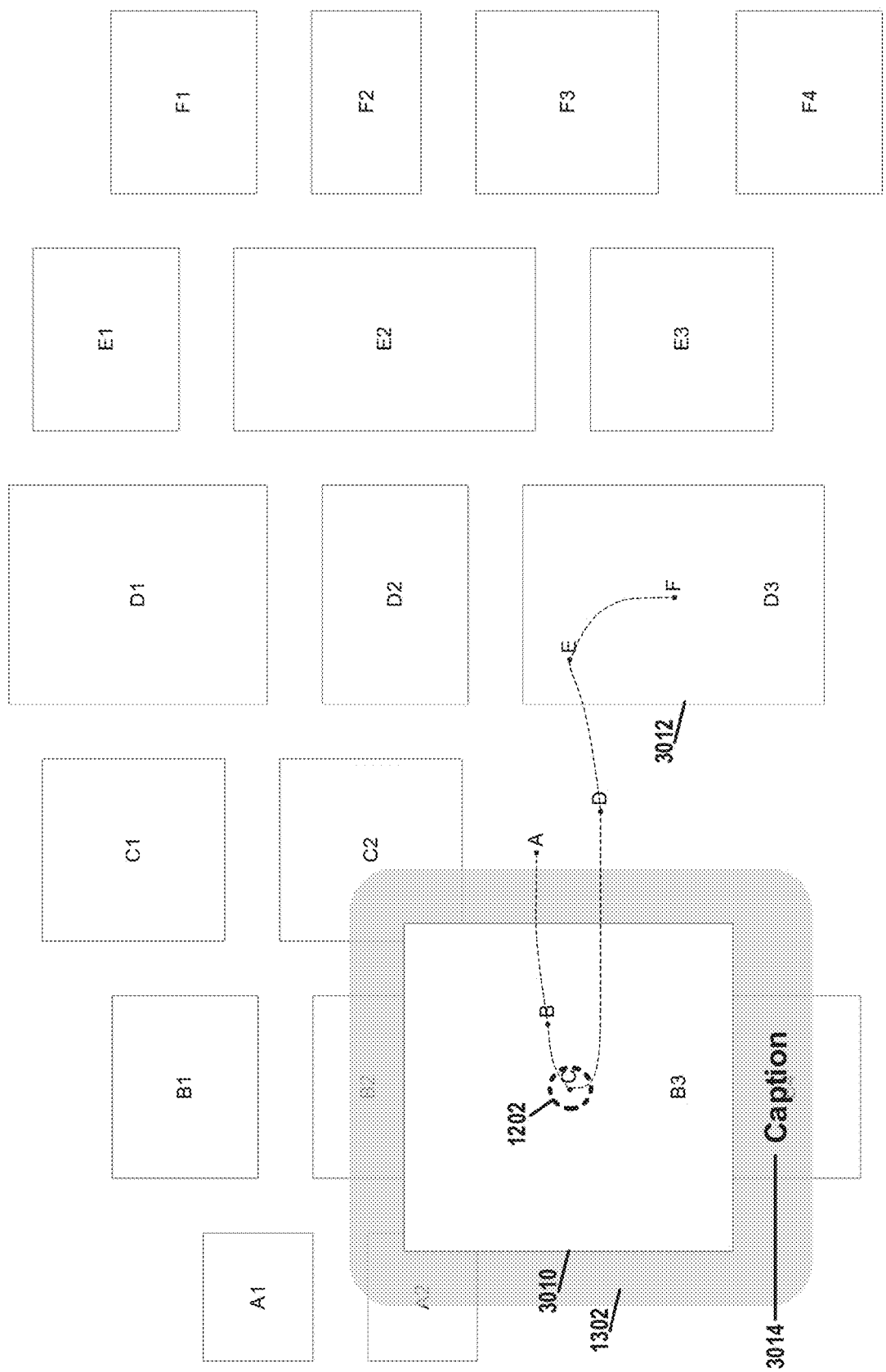

ECLIPSE CURSOR FOR VIRTUAL CONTENT IN MIXED REALITY DISPLAYS

RELATED APPLICATIONS

This application is a continuation-in-part of U.S. patent application Ser. No. 15/884,117, filed Jan. 30, 2018, entitled "ECLIPSE CURSOR FOR MIXED REALITY DISPLAYS," which is hereby incorporated by reference herein in its entirety.

COPYRIGHT STATEMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The present disclosure relates to virtual, augmented, or mixed reality imaging and visualization systems and more particularly to assigning a focus indicator to one or more real or virtual objects in the field of view of a user.

BACKGROUND

Modern computing and display technologies have facilitated the development of systems for so called "virtual reality", "augmented reality", or "mixed reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; a mixed reality, or "MR", related to merging real and virtual worlds to produce new environments where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR and MR technology.

SUMMARY

Techniques for displaying a cursor and a focus indicator associated with real or virtual objects in a virtual, augmented, or mixed reality environment by a wearable display device are described. For example, rendering the cursor in front of objects in the environment tends to occlude the object and place more emphasis in the visual hierarchy on the cursor itself rather than a target object being interacted with. Accordingly, embodiments of the wearable system can utilize an eclipse cursor that moves behind the target object (e.g., so that the cursor is "eclipsed" by the target object), which tends to preserve the emphasis on the target object, rather than the cursor, in the user's visual hierarchy. To aid the user in navigating the cursor among the objects in the environment, the system can render a focus indicator around objects near the cursor. The focus indicator may comprise a halo, shading, or highlighting around at least portions of objects near the cursor. The focus indicator may be emphasized (e.g., brighter, a different color or shade, or larger size) closer to the cursor (and deemphasized farther from the cursor), which provides visual cues to the user in navigating the cursor among objects in the environment and selecting a target object. The eclipse cursor and focus indicator can provide the user with a more natural and immersive user experience.

In various embodiments, a wearable display system can determine a spatial relationship between a user-movable cursor and one or more target objects within the environment. For example, the user may move the cursor by actuating a hand-held user input device (e.g., a totem). The wearable system may render a focus indicator (e.g., a halo, shading, or highlighting) around or adjacent to objects that are near the cursor. The focus indicator may be emphasized in directions closer to the cursor and deemphasized in directions farther from the cursor. When the cursor overlaps with a target object, the system can render the cursor behind the object (or not render the cursor at all), so the object is not occluded by the cursor (e.g., the object eclipses the cursor). The cursor and focus indicator can provide the user with positional feedback and help the user navigate among objects in the environment.

In various aspects, a wearable display system can include a user interface that presents to the user a plurality of interactable virtual items arranged in a grid (regular or irregular) of thumbnails disposed at one or more depths. A thumbnail can comprise a miniature representation of the virtual item (e.g., a document page or an image) that can be used to identify the virtual item by its contents. In some implementations, selecting (e.g., clicking or double-clicking) the thumbnail opens the content of the virtual item (e.g., by executing an application configured to run, play, view, or edit the virtual content). A thumbnail can be rendered so that it appears at one depth (e.g., as a 2D thumbnail) or at multiple depths (e.g., so that it appears 3D). In response to a cursor moving behind one of the thumbnails in the grid, the thumbnail for that item may be rendered with one or more of the following effects: expanding in size, including a focus indicator (e.g., a halo surrounding at least a portion of the thumbnail), moving to a different depth (e.g., to a depth appearing closer to the user), or having different virtual content (e.g., a higher resolution image, a caption, a sound, play of a video or animation of a graphic, etc.). The thumbnails may be ordered according to one or more grouping criteria (e.g., alphabetically by item name, content type, date, etc.). The grid of thumbnails may be scrollable by the user (e.g., using head, eye, or body gestures, or user input from a totem). During scrolling edges of the grid (e.g., in directions of scrolling) may dynamically display indications of virtual content that is next to be displayed (e.g., upcoming content) during the scroll (e.g., as semi-transparent thumbnails, optionally at a different depth than the edge of the grid).

In various aspects, the disclosure provides the ornamental design for a display screen or a portion thereof with an icon or with a transitional (e.g., animated) graphical user interface. An augmented, mixed, or virtual reality display device can comprise the display screen or portion thereof.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIGS. 13A and 13B illustrate non-limiting embodiments of a focus indicator and a cursor.

FIGS. 15A and 15B illustrate examples of implementations of multiple focus indicators having various intensities, positions, or spatial extents based on the cursor's proximity to an object's location within the environment.

FIG. 17 shows an example of a grid and user input on a totem (with a touch sensitive surface).

FIGS. 30A-30F illustrate an embodiment of a transitional sequence for a GUI on a display screen or a portion thereof.

Figure 1:
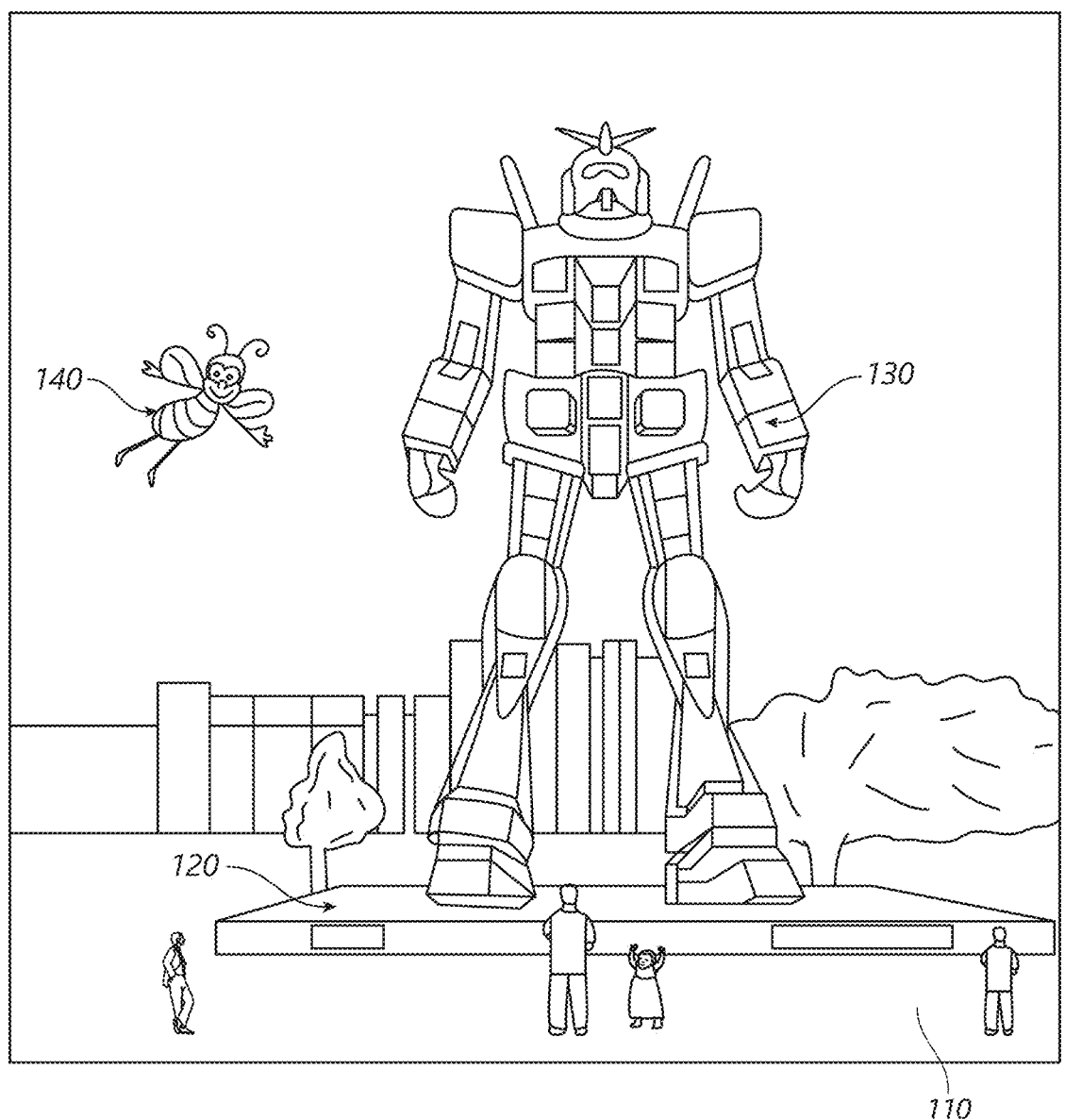
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure. Additionally, the figures in the present disclosure are for illustration purposes and are not to scale.

DETAILED DESCRIPTION

Overview

A wearable device can include a display for presenting an interactive VR/AR/MR environment. The VR/AR/MR environment can include data elements that may be interacted with by the user through a variety of poses, such as, e.g., head pose, eye gaze, or body pose or user input through a user input device. To provide the user with an accurate sense of the user's interaction with real or virtual objects in the VR/AR/MR environment, the system may render an on-screen visual aid to assist the user in navigating among and selecting or interacting with objects in the environment.

In some cases, on-screen visual aids can include a virtual cursor (sometimes also referred to herein as a reticle) that responds to user interaction (e.g., user input via a hand-held totem) and identifies (to the user) the position of a movable indicator that can be used to select or interact with objects in the VR/AR/MR environment. For example, the user may move his or her thumb on a touch-sensitive portion of a totem to move the cursor around in the 3D VR/AR/MR environment. When the cursor is sufficiently close to or hovers over an object, the user may be able to select or interact with the object (e.g., by pressing the touch-sensitive portion of the totem), which may initiate further context-dependent functionality by the wearable device. For example, the user may move a cursor near a virtual video display that is showing a movie and select the display to bring up a menu of other movie choices, volume control, and so forth. In some cases, the cursor is displayed to the user so that the user can readily locate the cursor in the environment. This may occur in relatively sparse environments where there are relatively few objects. In other cases, the cursor is not displayed to the user and the focus indicators described herein (e.g., glows around objects) are used to provide visual cues to the user as to the location of the cursor (e.g., the cursor is positioned near the object with the brightest glow). This may occur in relatively dense environments where there are relatively many objects and the display of the cursor itself may not be needed or may be distracting.

However, a conventional cursor is rendered with no consideration of scene content. In other words, as the cursor is moved around the VR/AR/MR environment, the cursor moves over (e.g., is rendered in front) of the objects within the environment. Continuing with the example above, the conventional cursor may appear in front of the virtual video display which not only occludes the virtual display but distracts the user from the content being shown (e.g., the user will tend to focus more on the cursor itself than the movie, which can be distracting).

Consequently, when a cursor is hovering over an object or is used to select the object, the cursor actually occludes or covers at least a portion of the object. This obstructed view of the object can greatly impact a user's experience within the environment. For example, the object can include content such as text, images, or the like, and the user may find difficulty in selecting the object while also viewing the content of the object.

While these problems are present in a 2D environment, they can be exacerbated in a 3D environment. For example, in a 2D environment, the objects and the cursor do not have depth. Thus, rendering the cursor in front of an object consists of rendering the cursor and the object on the same plane. In contrast, in a 3D environment, a cursor and the objects do have depth relative to the user. Accordingly, at a given time, a cursor in a 3D environment is not necessarily at the same depth as an object in that environment. For example, the cursor may be closer to or farther away from the user relative to an object. Due to this difference in depth, if the user focuses on one of the object or the cursor, the other may appear blurry to the user due to the accommodation disparity between the relative depths. Further, even in instances where a cursor and an object do have the same or similar depth within a 3D environment relative to the user, for the cursor to "roll over" the object in 3D space, the system must change the depth of the cursor to avoid the appearance of the cursor moving through the object. For example, as illustrated in FIGS. 12A and 12B, the system may move the cursor closer to the user such that the cursor is displayed as if it were located between the object and the user. By rendering the cursor closer to the user, the system is effectively (and possibly undesirably) emphasizing the cursor relative to the object, since a person's eyes are typically drawn to objects that are closer to the viewer, and a user is more likely to focus on the cursor because it appears closer to the user than the object.

To address these and other problems, embodiments of the system can render an on-screen visual aid that is content aware. For example, when a cursor and an object overlap, the system can render the cursor behind (rather than in front of) the object or not render the cursor at all (because the cursor is behind the object and not visible to the user). Thus, the cursor does not block the object from the user's vision, and the system does not inadvertently emphasize the cursor by rendering it closer to the user. Embodiments of such a cursor (or reticle) are sometimes referred to as an eclipse cursor or an eclipse reticle, because the target object "eclipses" the cursor.

When a cursor is eclipsed by an object, it may be difficult for the user to get an accurate sense of where the user is pointing toward within the scene or an accurate sense of where the cursor is currently located. That is because the cursor is at least partially blocked by the object. Accordingly, to continue to offer the user an accurate sense of the cursor's position within the environment, the system can render another (or an alternative) on-screen visual aid (e.g., a focus indicator) to emphasize the object when a cursor moves behind (or within a distance threshold of) that object.

A focus indicator can include a halo, a color, a perceived size or depth change (e.g., causing the object to appear closer or larger when selected), shading, virtual rays, or other graphical highlighting emanating from or associated with the object which tends to draw the user's attention. For example, the focus indicator can include a glow that appears to radiate outward from an object, as if a glowing light source were situated behind the object (so that the object "eclipses" the light source). The intensity of the glow may be more intense close to the outer edges of the object and less intense at larger distances from the outer edges of the object. Because the focus indicator does not occlude the object (since the focus indicator is typically rendered at least partially surrounding the object), the focus indicator instead emphasizes the object and advantageously provides the user with a user-friendly, non-distracting alternative to the cursor to indicate which object is currently being interacted with.

In some cases, a cursor can appear to have an attractive effect relative to an object such that a proximity of the cursor to the object affects an intensity or positioning of a focus indicator or the cursor. The attractive effect may tend to act as if the cursor and object (or focus indicator) were magnetically or gravitationally attracted to each other. For example, in some cases, each object may have a focus indicator (e.g., outer glow), and an intensity, size, or location of the focus indicator may vary based on the location of the cursor relative to the object (or focus indicator). For example, as the cursor moves closer to an object, the focus indicator of that object can become brighter, more intense, or move in the direction of (e.g., as if pulled towards) the cursor. As the cursor is moved closer to the object, the system may render the cursor is if it were being pulled behind the object, while at the same time increasing an intensity of the focus indicator. This behavior may permit the user to more naturally and easily select objects, because as the cursor gets close to a desired, target object, the cursor is pulled toward (or snaps onto) the closest object without the user having to make fine adjustments to position the cursor on the target object. The cursor therefore may behave as if it had mass or inertia (so that the cursor tends to keep moving in an initially applied direction) and is pulled by the attractive effect toward nearby objects. As the cursor's location within the environment changes, so can an intensity of a focus indicator(s) associated with object(s) nearby the cursor.

In some cases, the system can assign a focus indicator to more than one object or a focus indicator can have a varying intensity or glow which can fade in or out, for example, based on an object's proximity to the cursor's location within the environment. Accordingly, one or more focus indicators can offer positional feedback to the user by emphasizing one or more objects, for example, at varying intensities. The varying intensity or glow can shift in position as user input shifts to provide sustained input feedback and an accurate sense of cursor position.

In various aspects, the system can include a user interface that presents to the user a plurality of interactable virtual items arranged in a grid (regular or irregular) of thumbnails disposed at one or more depths. In response to a cursor moving behind one of the thumbnails in the grid, the thumbnail for that item may be rendered with one or more of the following effects: expanding in size, including a focus indicator (e.g., a halo surrounding at least a portion of the thumbnail), moving to a different depth (e.g., to a depth appearing closer to the user), or having different virtual content (e.g., a higher resolution image, a caption, a sound, play of a video or animation of a graphic, etc.). The thumbnails may be ordered according to one or more grouping criteria (e.g., alphabetically by item name, content type, date, etc.). The grid of thumbnails may be scrollable by the user (e.g., using head, eye, or body gestures, or user input from a totem). During scrolling edges of the grid (e.g., in directions of scrolling) may dynamically display indications of virtual content that is next to be displayed during the scroll (e.g., as semi-transparent thumbnails, optionally at a different depth than the edge of the grid).

Examples of 3D Display of a Wearable System

A wearable system (also referred to herein as an augmented reality (AR) system) can be configured to present two-dimensional (2D) or three-dimensional (3D) virtual images to a user. The images may be still images, frames of a video, or a video, in combination or the like. The wearable system can include a wearable device that can present a VR, AR, or MR environment, alone or in combination, for user interaction. The wearable device can be a head-mounted device (HMD) which is used interchangeably as an AR device (ARD).

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
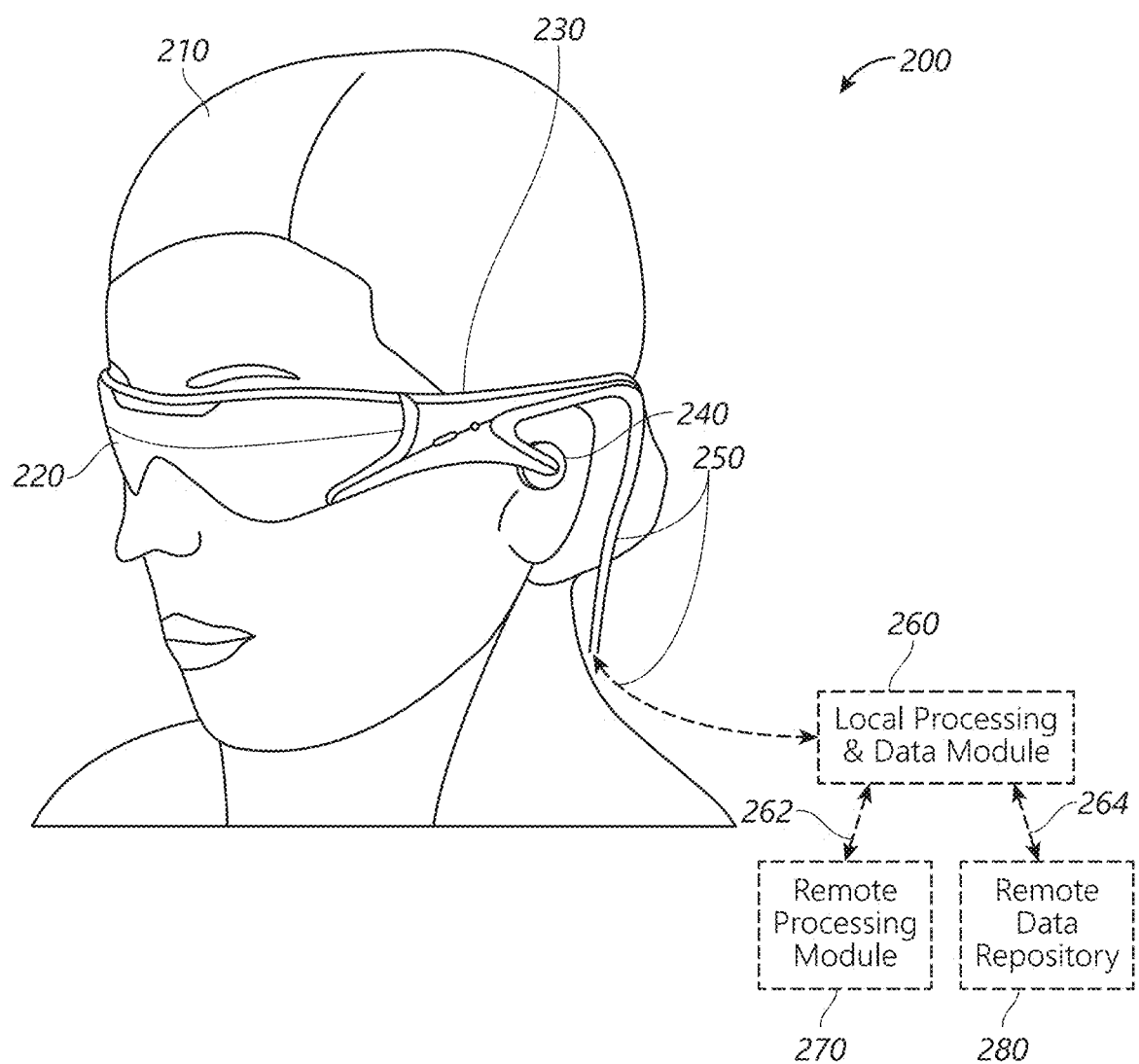
FIG. 2 schematically illustrates an example of a wearable system.

FIG. 2 illustrates an example of wearable system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. For example, the display 220 can embody (e.g., render and present to the user) the eclipse cursor icons and focus indicators described below. Examples of ornamental designs for the eclipse cursor icons and focus indicators are shown in FIGS. 24-29F. The display 220 can comprise a head mounted display (HMD) that is worn on the head of the user. In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control).

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210.

As an example, the wearable system 200 can use the outward-facing imaging system 464 or the inward-facing imaging system 462 to acquire images of a pose of the user. The images may be still images, frames of a video, or a video, in combination or the like.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), microphones, inertial measurement units (IMUs) (e.g., accelerometers, gravitometers, magnetometers, etc.), compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

The human visual system is complicated and providing a realistic perception of depth is challenging. Without being limited by theory, it is believed that viewers of an object may perceive the object as being three-dimensional due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Figure 3:
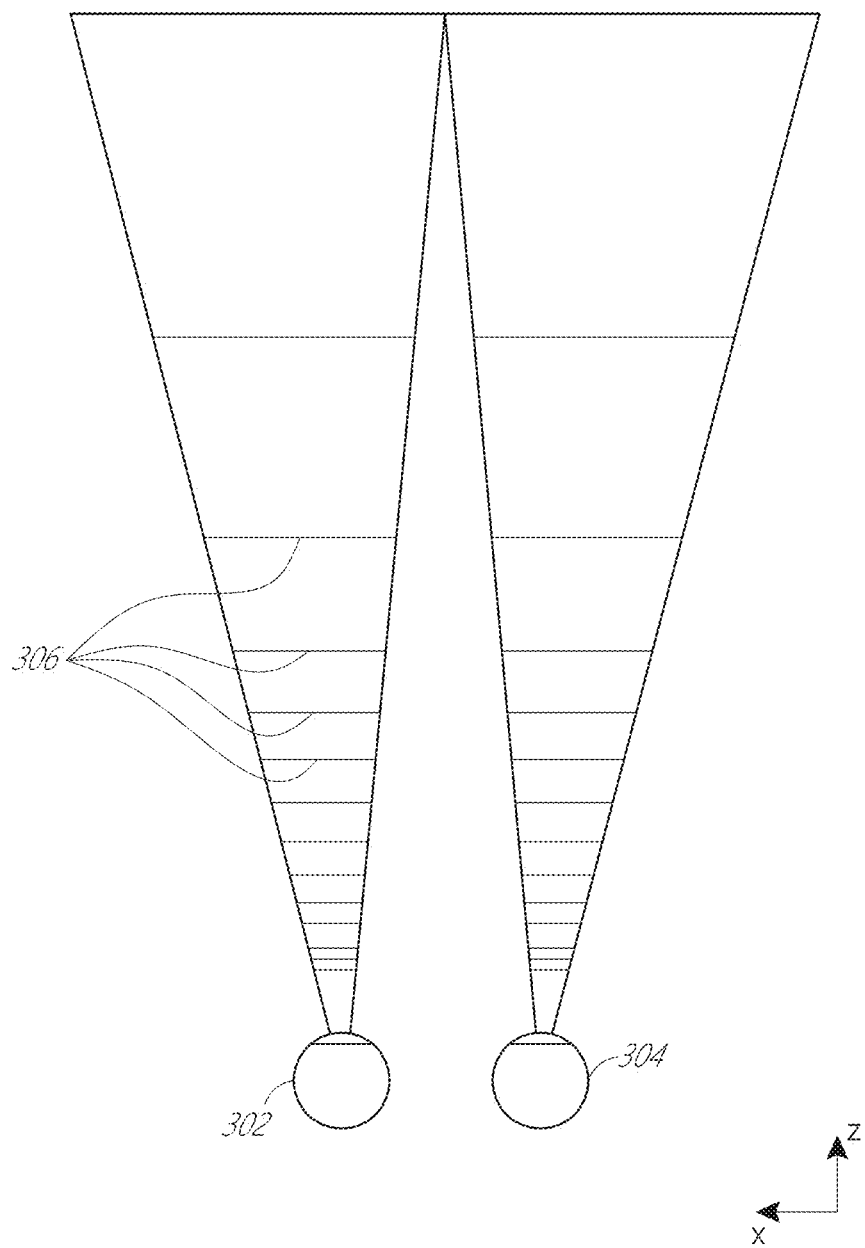
FIG. 3 schematically illustrates aspects of an approach for simulating three-dimensional imagery using multiple depth planes.

FIG. 3 illustrates aspects of an approach for simulating a three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, which has an associated focal distance, such that objects or parts of objects in a particular depth plane are in focus when the eye is in the accommodated state for that depth plane. In some embodiments, three-dimensional imagery may be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for the ease of illustration, it will be appreciated that the contours of a depth plane may be curved in physical space, such that all features in a depth plane are in focus with the eye in a particular accommodated state. The depth planes 306 need not be set at fixed distances from the display (or user's eyes 302, 304) but can by dynamically updated. For example, if the user looks at virtual content in a near-field to the user (e.g., within about 1-2 m), the array of depth planes shown in FIG. 3 may be adjusted to be closer to the user, which increases the depth resolution in the near-field. Likewise, if the user looks at virtual content in the mid-field (e.g., 2 m to 5 m) or far-field (e.g., 5 m to infinity), the depth planes can be adjusted to fall primarily within those distances. The depth planes can be adjusted, for example, by adjusting the waveguide stack described with reference to FIGS. 4-6. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Waveguide Stack Assembly

Figure 4:
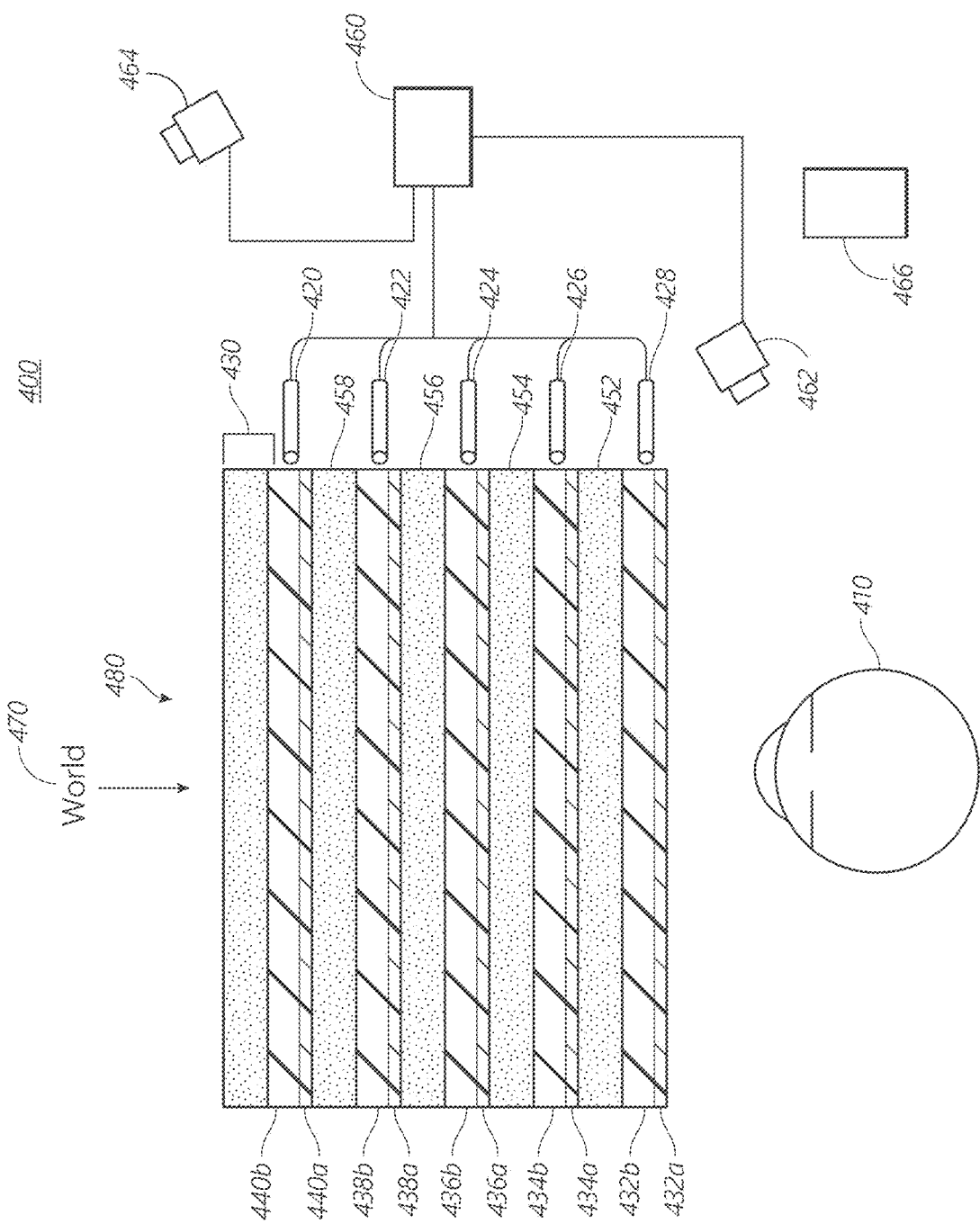
FIG. 4 schematically illustrates an example of a waveguide stack for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 4400b. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440b, 438b, 436b, 434b, 432b, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some embodiments, the light extracting optical elements 440a, 438a, 436a, 434a, 432a may be disposed at the top or bottom major surfaces, or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440*b*, 438*b*, 436*b*, 434*b*, 432*b* may be a monolithic piece of material and the light extracting optical elements 440*a*, 438*a*, 436*a*, 434*a*, 432*a* may be formed on a surface or in the interior of that piece of material.

With continued reference to FIG. 4, as discussed herein, each waveguide 440*b*, 438*b*, 436*b*, 434*b*, 432*b* is configured to output light to form an image corresponding to a particular depth plane. For example, the waveguide 432*b* nearest the eye may be configured to deliver collimated light, as injected into such waveguide 432*b*, to the eye 410. The collimated light may be representative of the optical infinity focal plane. The next waveguide up 434*b* may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434*b* as coming from a first focal plane closer inward toward the eye 410 from optical infinity. Similarly, the third up waveguide 436*b* passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436*b* as coming from a second focal plane that is even closer inward toward the person from optical infinity than was light from the next waveguide up 434*b*.

The other waveguide layers (e.g., waveguides 438*b*, 440*b*) and lenses (e.g., lenses 456, 458) are similarly configured, with the highest waveguide 440*b* in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440*a*, 438*a*, 436*a*, 434*a*, 432*a* may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440*a*, 438*a*, 436*a*, 434*a*, 432*a* may be volumetric or surface features, which may be configured to output light at specific angles. For example, the light extracting optical elements 440*a*, 438*a*, 436*a*, 434*a*, 432*a* may be volume holograms, surface holograms, or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440*a*, 438*a*, 436*a*, 434*a*, 432*a* are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 may be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The entire region available for viewing or imaging by a viewer may be referred to as the field of regard (FOR). The FOR may include $4\pi$ steradians of solid angle surrounding the wearable system 400 because the wearer can move his or her body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Figure 5:
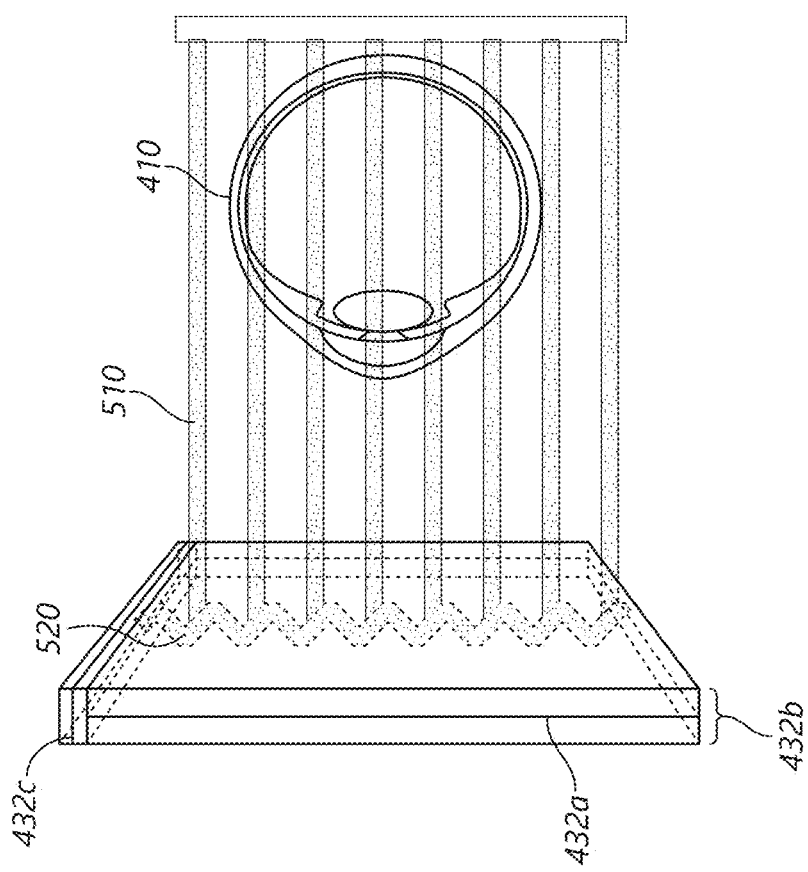
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 480 may function similarly, where the waveguide assembly 480 includes multiple waveguides. Light 520 is injected into the waveguide 432b at the input edge 432c of the waveguide 432b and propagates within the waveguide 432b by TIR. At points where the light 520 impinges on the DOE 432a, a portion of the light exits the waveguide as exit beams 510. The exit beams 510 are illustrated as substantially parallel but they may also be redirected to propagate to the eye 410 at an angle (e.g., forming divergent exit beams), depending on the depth plane associated with the waveguide 432b. It will be appreciated that substantially parallel exit beams may be indicative of a waveguide with light extracting optical elements that outcouple light to form images that appear to be set on a depth plane at a large distance (e.g., optical infinity) from the eye 410. Other waveguides or other sets of light extracting optical elements may output an exit beam pattern that is more divergent, which would require the eye 410 to accommodate to a closer distance to bring it into focus on the retina and would be interpreted by the brain as light from a distance closer to the eye 410 than optical infinity.

Figure 6:
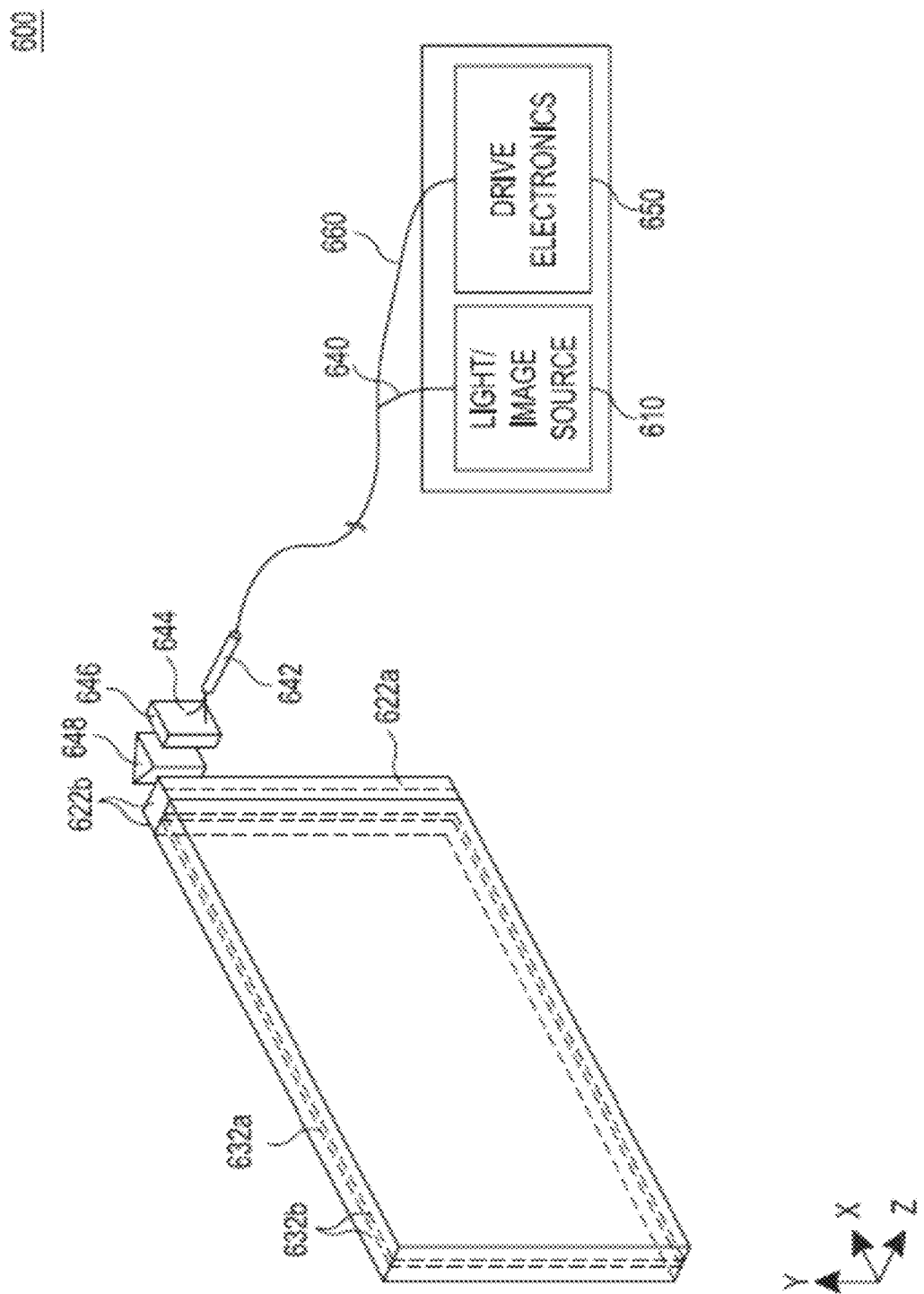
FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field.

FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field. The optical system can include a waveguide apparatus, an optical coupler subsystem to optically couple light to or from the waveguide apparatus, and a control subsystem. The optical system can be used to generate a multi-focal volumetric, image, or light field. The optical system can include one or more primary planar waveguides 632a (only one is shown in FIG. 6) and one or more DOEs 632b associated with each of at least some of the primary waveguides 632a. The planar waveguides 632b can be similar to the waveguides 432b, 434b, 436b, 438b, 440b discussed with reference to FIG. 4. The optical system may employ a distribution waveguide apparatus to relay light along a first axis (vertical or Y-axis in view of FIG. 6), and expand the light's effective exit pupil along the first axis (e.g., Y-axis). The distribution waveguide apparatus may, for example, include a distribution planar waveguide 622b and at least one DOE 622a (illustrated by double dash-dot line) associated with the distribution planar waveguide 622b. The distribution planar waveguide 622b may be similar or identical in at least some respects to the primary planar waveguide 632b, having a different orientation therefrom. Likewise, at least one DOE 622a may be similar or identical in at least some respects to the DOE 632a. For example, the distribution planar waveguide 622b or DOE 622a may be comprised of the same materials as the primary planar waveguide 632b or DOE 632a, respectively. Embodiments of the optical display system 600 shown in FIG. 6 can be integrated into the wearable system 200 shown in FIG. 2.

The relayed and exit-pupil expanded light may be optically coupled from the distribution waveguide apparatus into the one or more primary planar waveguides 632b. The primary planar waveguide 632b can relay light along a second axis, preferably orthogonal to first axis (e.g., horizontal or X-axis in view of FIG. 6). Notably, the second axis can be a non-orthogonal axis to the first axis. The primary planar waveguide 632b expands the light's effective exit pupil along that second axis (e.g., X-axis). For example, the distribution planar waveguide 622b can relay and expand light along the vertical or Y-axis, and pass that light to the primary planar waveguide 632b which can relay and expand light along the horizontal or X-axis.

The optical system may include one or more sources of colored light (e.g., red, green, and blue laser light) 610 which may be optically coupled into a proximal end of a single mode optical fiber 640. A distal end of the optical fiber 640 may be threaded or received through a hollow tube 642 of piezoelectric material. The distal end protrudes from the tube 642 as fixed-free flexible cantilever 644. The piezoelectric tube 642 can be associated with four quadrant electrodes (not illustrated). The electrodes may, for example, be plated on the outside, outer surface or outer periphery or diameter of the tube 642. A core electrode (not illustrated) may also be located in a core, center, inner periphery or inner diameter of the tube 642.

Drive electronics 650, for example electrically coupled via wires 660, drive opposing pairs of electrodes to bend the piezoelectric tube 642 in two axes independently. The protruding distal tip of the optical fiber 644 has mechanical modes of resonance. The frequencies of resonance can depend upon a diameter, length, and material properties of the optical fiber 644. By vibrating the piezoelectric tube 642 near a first mode of mechanical resonance of the fiber cantilever 644, the fiber cantilever 644 can be caused to vibrate, and can sweep through large deflections.

By stimulating resonant vibration in two axes, the tip of the fiber cantilever 644 is scanned biaxially in an area filling two-dimensional (2D) scan. By modulating an intensity of light source(s) 610 in synchrony with the scan of the fiber cantilever 644, light emerging from the fiber cantilever 644 can form an image. Descriptions of such a set up are provided in U.S. Patent Publication No. 2014/0003762, which is incorporated by reference herein in its entirety.

A component of an optical coupler subsystem can collimate the light emerging from the scanning fiber cantilever 644. The collimated light can be reflected by mirrored surface 648 into the narrow distribution planar waveguide 622b which contains the at least one diffractive optical element (DOE) 622a. The collimated light can propagate vertically (relative to the view of FIG. 6) along the distribution planar waveguide 622b by TIR, and in doing so repeatedly intersects with the DOE 622a. The DOE 622a preferably has a low diffraction efficiency. This can cause a fraction (e.g., 10%) of the light to be diffracted toward an edge of the larger primary planar waveguide 632b at each point of intersection with the DOE 622a, and a fraction of the light to continue on its original trajectory down the length of the distribution planar waveguide 622b via TIR.

At each point of intersection with the DOE 622a, additional light can be diffracted toward the entrance of the primary waveguide 632b. By dividing the incoming light into multiple outcoupled sets, the exit pupil of the light can be expanded vertically by the DOE 4 in the distribution planar waveguide 622b. This vertically expanded light coupled out of distribution planar waveguide 622b can enter the edge of the primary planar waveguide 632b.

Light entering primary waveguide 632b can propagate horizontally (relative to the view of FIG. 6) along the primary waveguide 632b via TIR. As the light intersects with DOE 632a at multiple points as it propagates horizontally along at least a portion of the length of the primary waveguide 632b via TIR. The DOE 632a may advantageously be designed or configured to have a phase profile that is a summation of a linear diffraction pattern and a radially symmetric diffractive pattern, to produce both deflection and focusing of the light. The DOE 632a may advantageously have a low diffraction efficiency (e.g., 10%), so that only a portion of the light of the beam is deflected toward the eye of the view with each intersection of the DOE 632a while the rest of the light continues to propagate through the primary waveguide 632b via TIR.

At each point of intersection between the propagating light and the DOE 632a, a fraction of the light is diffracted toward the adjacent face of the primary waveguide 632b allowing the light to escape the TIR, and emerge from the face of the primary waveguide 632b. In some embodiments, the radially symmetric diffraction pattern of the DOE 632a additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 632b by a multiplicity of DOEs 632a at different angles, focus levels, or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Although certain embodiments of the wearable system may render virtual objects on different depth planes (e.g., as described with reference to FIG. 3), this is intended to be illustrative and not limiting. Other optical techniques can be used to render virtual objects so that they appear to be at different depths from the user. For example, a variable focus element (VFE) can be used, e.g., as described in U.S. Patent Publication No. 2015/0346495, which is hereby incorporated by reference herein in its entirety. In other embodiments of the wearable system, different virtual objects may be rendered on the same depth plane but nonetheless appear to the user as if at different depths. For example, the apparent depth of virtual content that is rendered on a depth plane can be changed by changing the rendering locations of pixels associated with the virtual content so that the virtual content has a different vergence location (and different perceived depth). Thus, two virtual objects can be rendered on the same depth plane, but (relative to the first virtual object) the second virtual object can be perceived to be closer to the user, at the same depth from the user, or farther from the user by modifying the pixel rendering positions to create a different vergence location for the second virtual object (relative to the first virtual object). Accordingly, perceived depths of different virtual content can be achieved by rendering the different virtual content on the same depth plane but adjusting vergence.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Wearable Systems, Environments, and Interfaces

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 7:
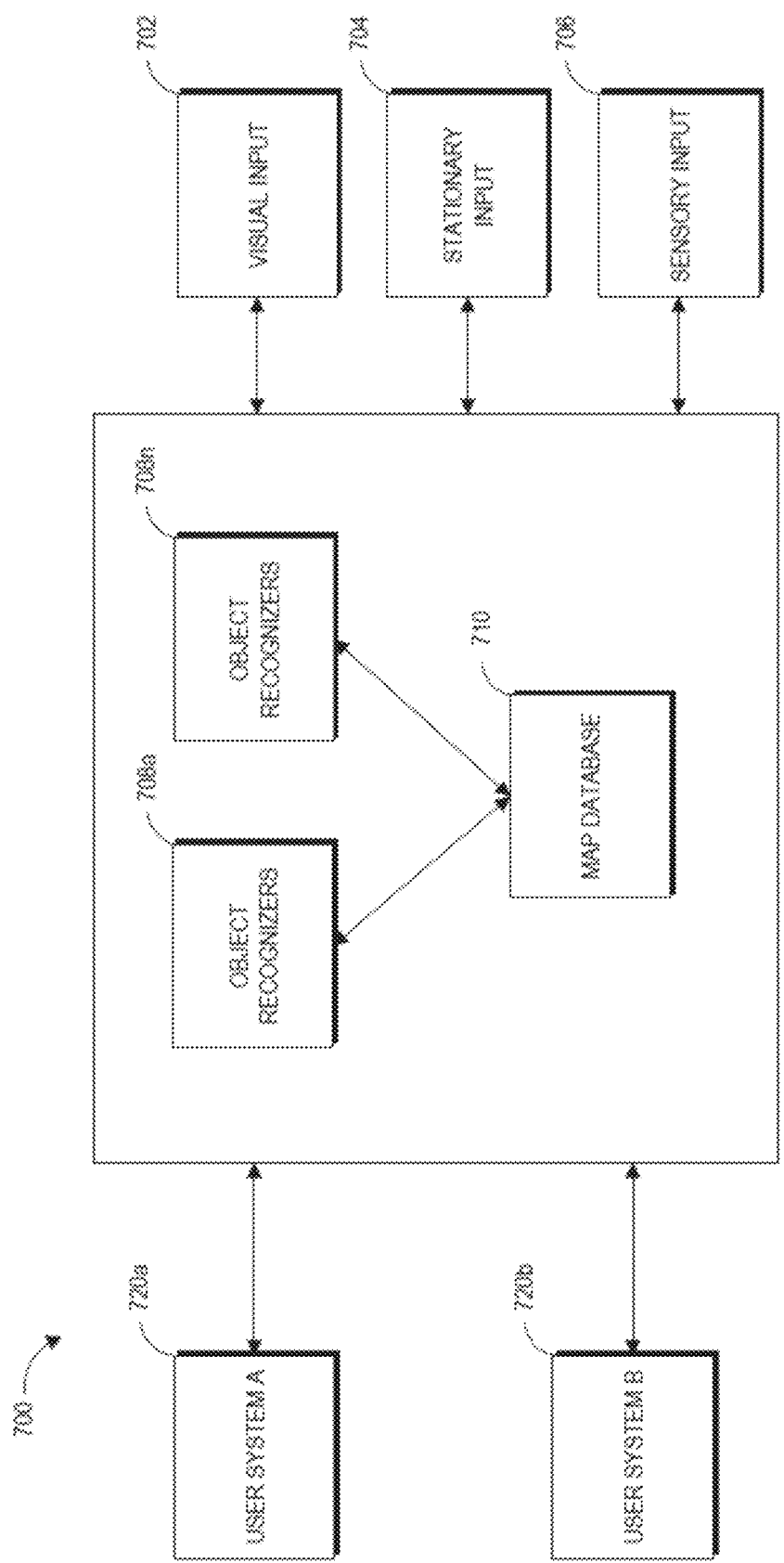
FIG. 7 is a block diagram of an example of a wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, other objects in the user's environment, etc. One or more object recognizers may be specialized for object with certain characteristics. For example, the object recognizer 708a may be used to recognizer faces, while another object recognizer may be used recognize totems.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition, object pose estimation, learning, indexing, motion estimation, or image restoration, etc. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

The object recognizers may identify objects in the 3D environment, and from the system's knowledge of the current position of a cursor used to select or interact with the objects, this information may be used to implement the eclipse cursor techniques described herein. For example, if the cursor location is near a target object identified by the object recognizers, a focus indicator may be provided or emphasized around the target object. The object recognizers may determine a location of the object (e.g., a center) or edges or boundaries of the object, and the location of the cursor (e.g., a ray from the user toward the cursor position) relative to the object's center or edges or boundaries may be used to determine whether or how to render the focus indicator, whether to accelerate the cursor toward the object (e.g., the attractive effect described herein), and so forth.

Figure 8:
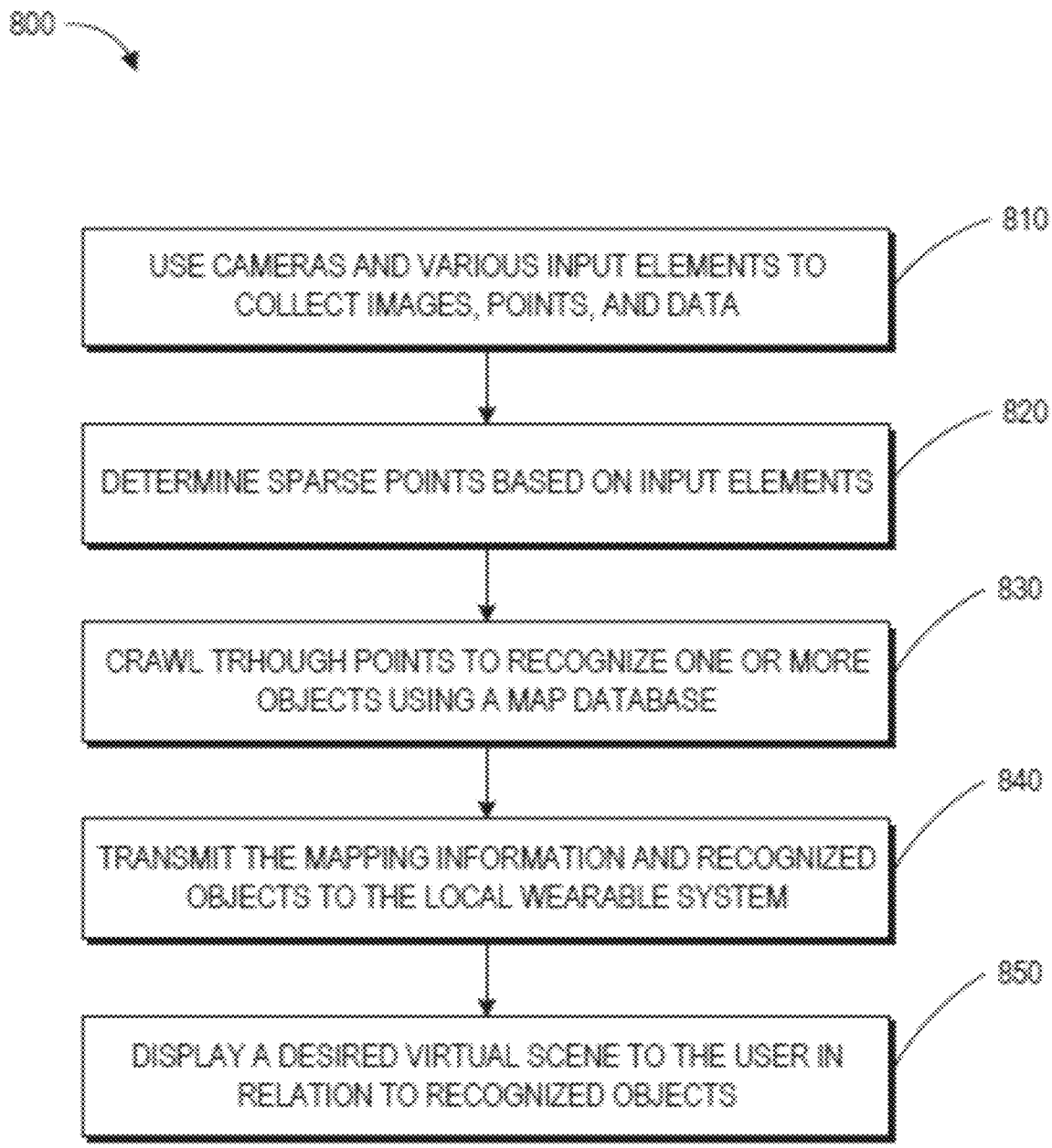
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be represented to a user of the wearable system. The user may be geographically remote from the scene. For example, the user may be New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Figure 9:
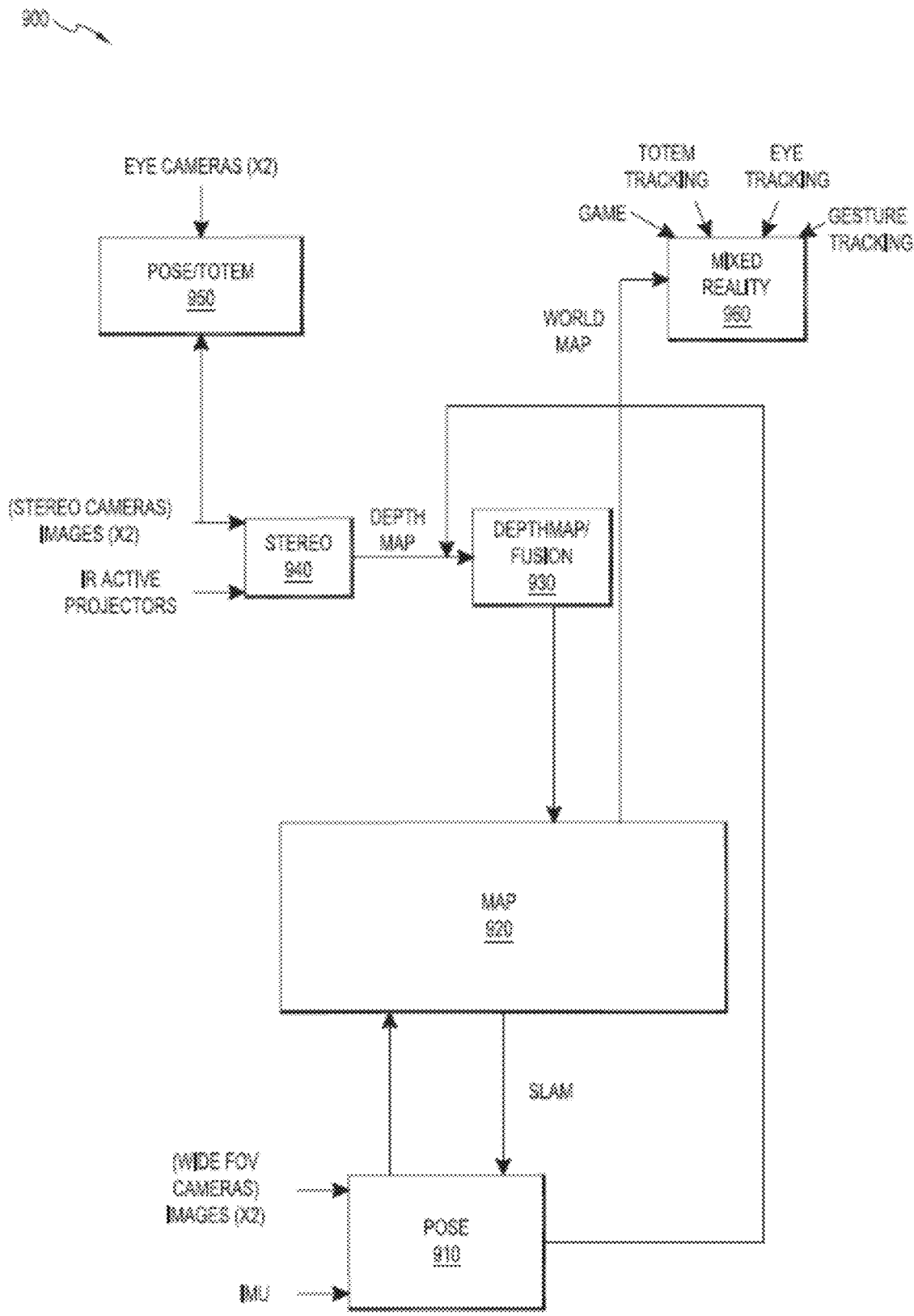
FIG. 9 is a block diagram of another example of a wearable system.

FIG. 9 is a block diagram of another example of a wearable system. In this example, the wearable system 900 comprises a map, which may include map data for the world. The map may partly reside locally on the wearable system, and may partly reside at networked storage locations accessible by wired or wireless network (e.g., in a cloud system). A pose process 910 may be executed on the wearable computing architecture (e.g., processing module 260 or controller 460) and utilize data from the map to determine position and orientation of the wearable computing hardware or user. Pose data may be computed from data collected real-time as the user is experiencing the system and operating in the world. The data may comprise images, data from sensors (such as inertial measurement units (IMUs), which may comprise an accelerometer, a gyroscope, a magnetometer, or combinations of such components) and surface information pertinent to objects in the real or virtual environment.

A sparse point representation may be the output of a simultaneous localization and mapping (SLAM or V-SLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 940, wherein depth information is determined using a technique such as triangulation or time-of-flight sensing. Image information and active patterns (such as infrared patterns created using active projectors) may serve as input to the Stereo process 940. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 940 may be combined in the fusion process 930. Pose may be an input to this fusion process 930 as well, and the output of fusion 930 becomes an input to populating the map process 920. Sub-surfaces may connect with each other, such as in topographical mapping, to form larger surfaces, and the map becomes a large hybrid of points and surfaces.

To resolve various aspects in a mixed reality process 960, various inputs may be utilized. For example, in the embodiment depicted in FIG. 9, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding where such objects are relative to each other, to be another valuable input to mixed reality. Pose relative to the world becomes an input as well and plays a key role to almost any interactive system. Parameters and inputs such as these can be used to provide the eclipse cursor functionality in the mixed reality process 960.

Controls or inputs from the user are another input to the wearable system 900. As described herein, user inputs can include visual input, gestures, totems, audio input, sensory input, etc. In order to move around or play a game, for example, the user may need to instruct the wearable system 900 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 900 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 900 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined.

With regard to the camera systems, the example wearable system 900 shown in FIG. 9 can include three pairs of cameras: a relative wide FOV or passive SLAM pair of cameras arranged to the sides of the user's face, a different pair of cameras oriented in front of the user to handle the stereo imaging process 940 and also to capture hand gestures and totem/object tracking in front of the user's face. The FOV cameras and the pair of cameras for the stereo process 940 may be a part of the outward-facing imaging system 464 (shown in FIG. 4). The wearable system 900 can include eye tracking cameras (which may be a part of an inward-facing imaging system 462 shown in FIG. 4) oriented toward the eyes of the user in order to triangulate eye vectors and other information. The wearable system 900 may also comprise one or more textured light projectors (such as infrared (IR) projectors) to inject texture into a scene.

Figure 10:
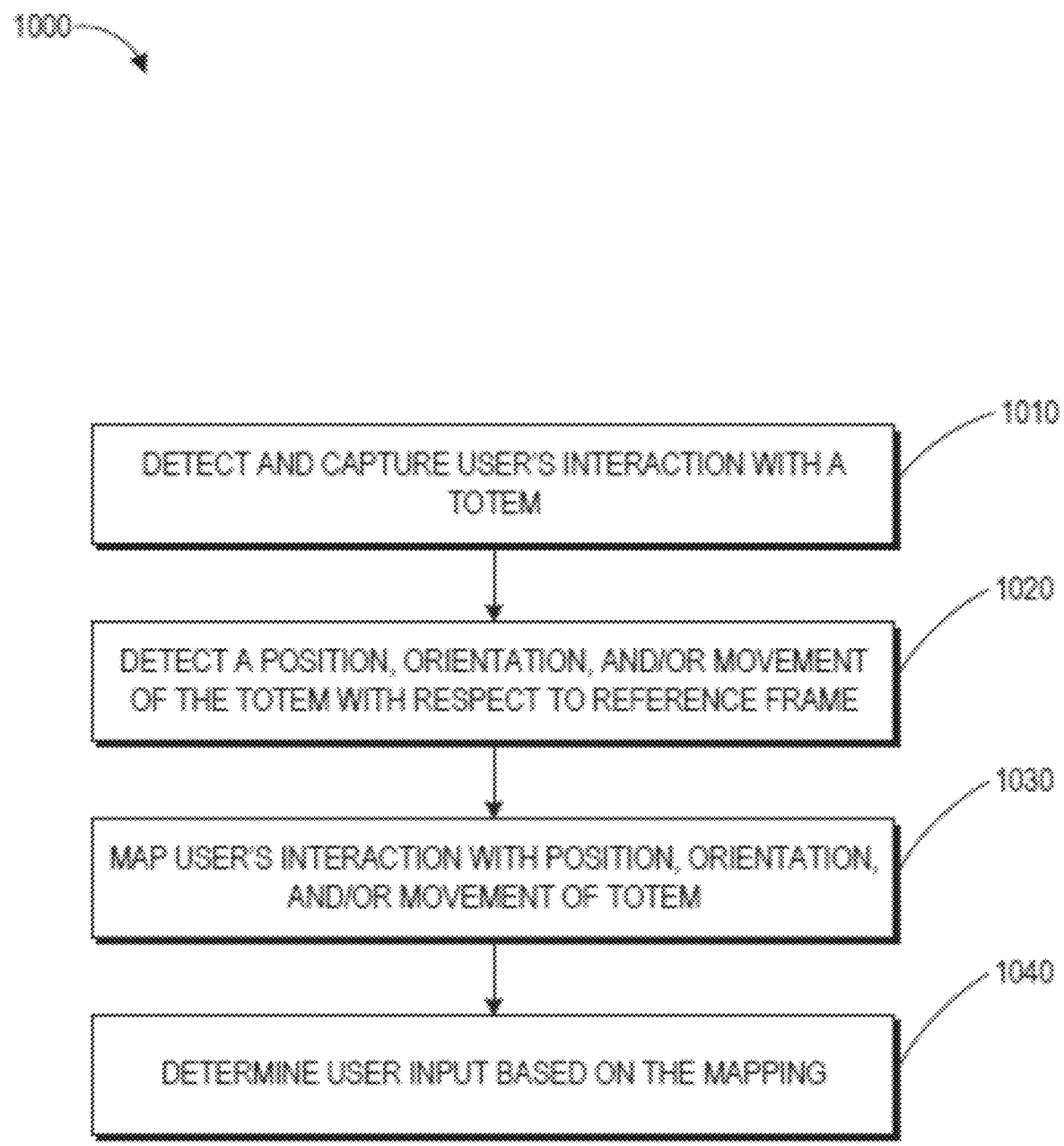
FIG. 10 is a process flow diagram of an example of a method for determining user input to a wearable system.

FIG. 10 is a process flow diagram of an example of a method 1000 for determining user input to a wearable system. In this example, the user may interact with a totem. The user may have multiple totems. For example, the user may have designated one totem for a social media application, another totem for playing games, etc. At block 1010, the wearable system may detect a motion of a totem. The movement of the totem may be recognized through the outward facing system or may be detected through sensors (e.g., haptic glove, image sensors, hand tracking devices, eye-tracking cameras, head pose sensors, etc.).

Based at least partly on the detected gesture, eye pose, head pose, or input through the totem, the wearable system detects a position, orientation, or movement of the totem (or the user's eyes or head or gestures) with respect to a reference frame, at block 1020. The reference frame may be a set of map points based on which the wearable system translates the movement of the totem (or the user) to an action or command. At block 1030, the user's interaction with the totem is mapped. Based on the mapping of the user interaction with respect to the reference frame 1020, the system determines the user input at block 1040.

For example, the user may move a totem or physical object back and forth to signify turning a virtual page and moving on to a next page or moving from one user interface (UI) display screen to another UI screen. As another example, the user may move their head or eyes to look at different real or virtual objects in the user's FOR. If the user's gaze at a particular real or virtual object is longer than a threshold time, the real or virtual object may be selected as the user input. In some implementations, the vergence of the user's eyes can be tracked and an accommodation/vergence model can be used to determine the accommodation state of the user's eyes, which provides information on a depth plane on which the user is focusing. In some implementations, the wearable system can use ray casting techniques to determine which real or virtual objects are along the direction of the user's head pose or eye pose. In various implementations, the ray casting techniques can include casting thin, pencil rays with substantially little transverse width or casting rays with substantial transverse width (e.g., cones or frustums).

The user interface may be projected by the display system as described herein (such as the display 220 in FIG. 2). It may also be displayed using a variety of other techniques such as one or more projectors. The projectors may project images onto a physical object such as a canvas or a globe. Interactions with user interface may be tracked using one or more cameras external to the system or part of the system (such as, e.g., using the inward-facing imaging system 462 or the outward-facing imaging system 464).

Figure 11:
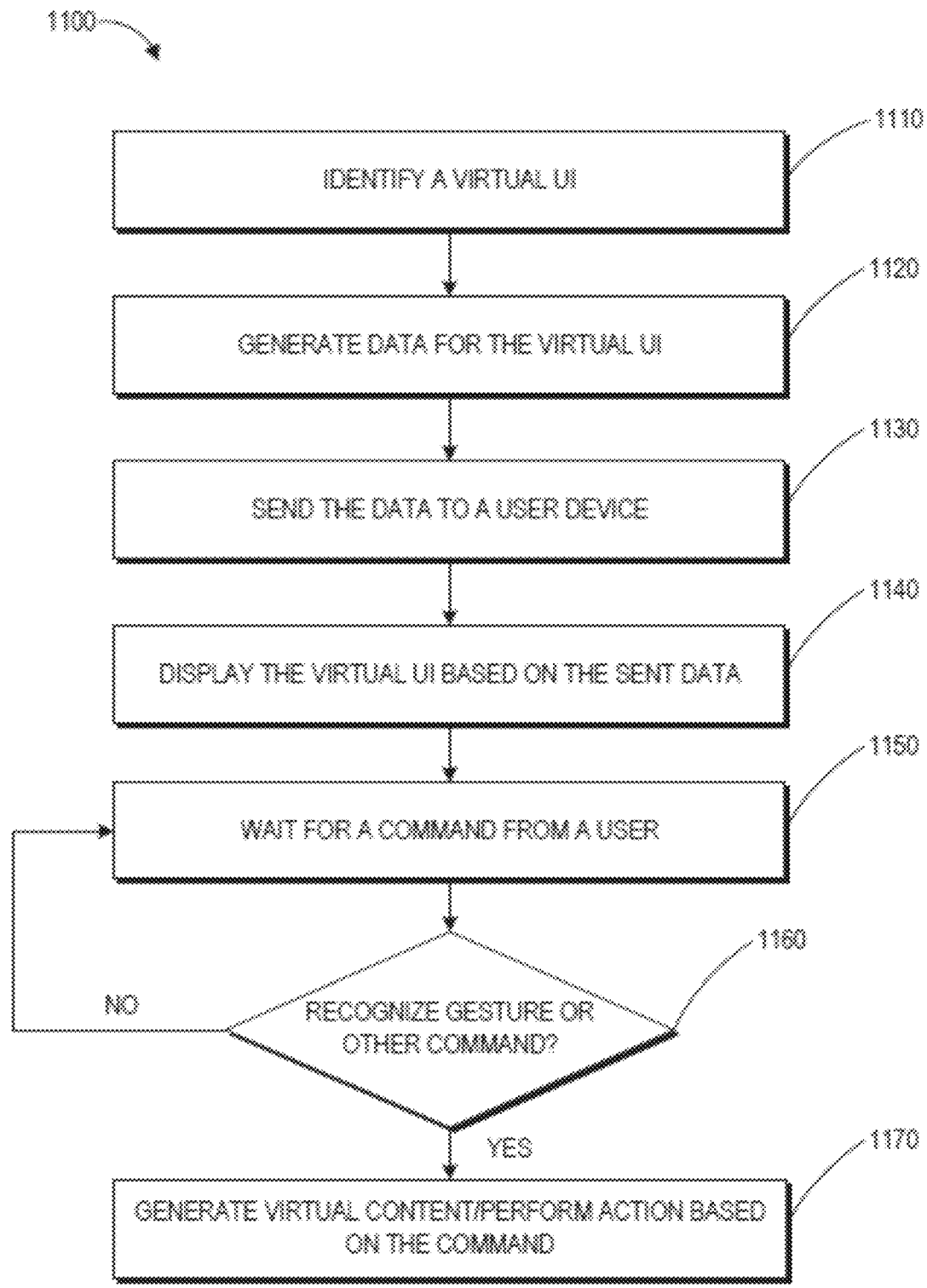
FIG. 11 is a process flow diagram of an example of a method for interacting with a virtual user interface.

FIG. 11 is a process flow diagram of an example of a method 1100 for interacting with a virtual user interface. The method 1100 may be performed by the wearable system described herein.

At block 1110, the wearable system may identify a particular UI. The type of UI may be predetermined by the user. The wearable system may identify that a particular UI needs to be populated based on a user input (e.g., gesture, visual data, audio data, sensory data, direct command, etc.).

At block 1120, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. If the UI is hand centric, the map coordinates of the user's hands may be determined. These map points may be derived through data received through the FOV cameras, sensory input, or any other type of collected data.

At block 1130, the wearable system may send the data to the display from the cloud or the data may be sent from a local database to the display components. At block 1140, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 1150. For example, the UI may be a body centric ring around the user's body. The wearable system may then wait for the command (a gesture, a head or eye movement, input from a user input device, etc.), and if it is recognized (block 1160), virtual content associated with the command may be displayed to the user (block 1170). As an example, the virtual content may include a virtual cursor (or reticle) and a focus indicator associated with an object in the environment. The virtual cursor and focus indicator may comprise aspects of the eclipse cursor technology described with reference to FIGS. 12A-24.

Additional examples of wearable systems, UIs, and user experiences (UX) are described in U.S. Patent Publication No. 2015/0016777, which is incorporated by reference herein in its entirety.

Example Objects in the Field of View (FOV)

Figure 12C:
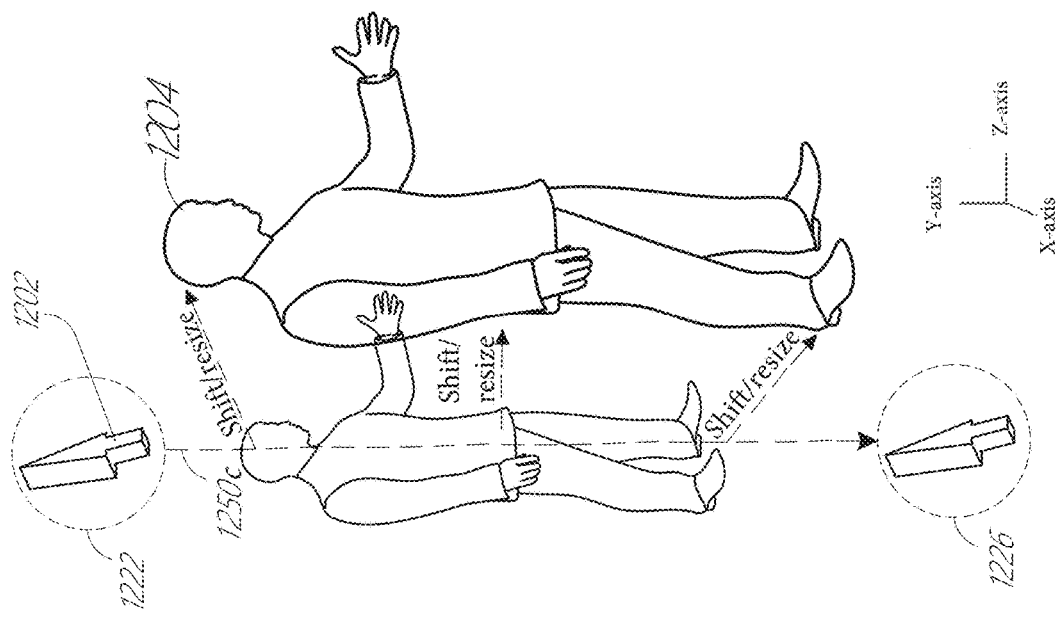
FIGS. 12A-12C illustrate various examples of an object and cursor that can be perceived by the user via the wearable system.
Figure 12B:
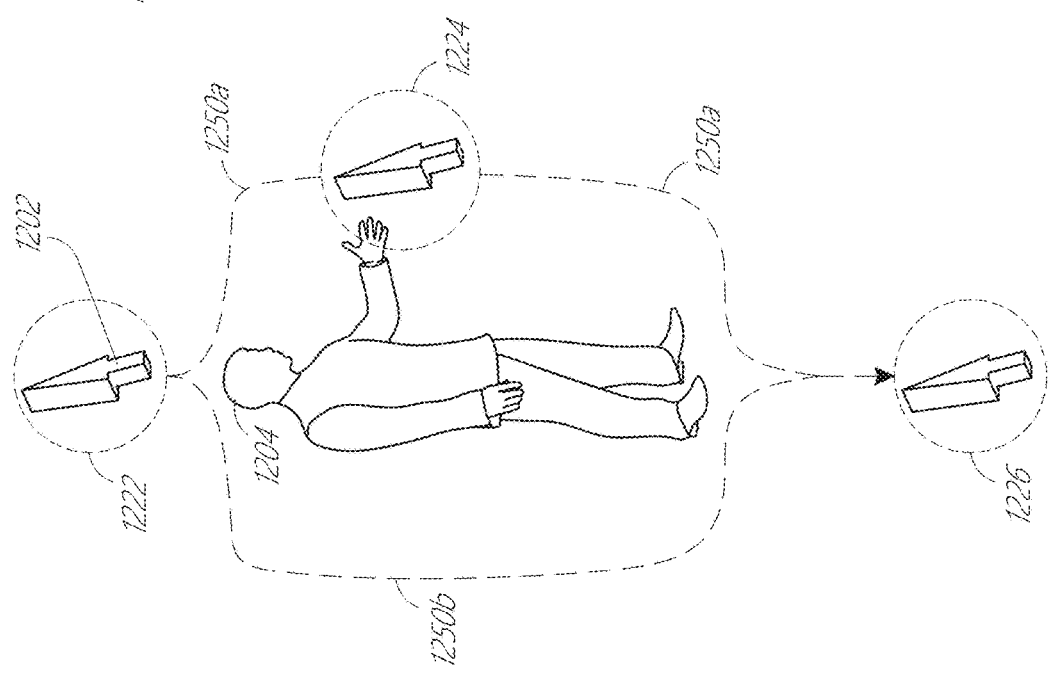
Figure 12A:
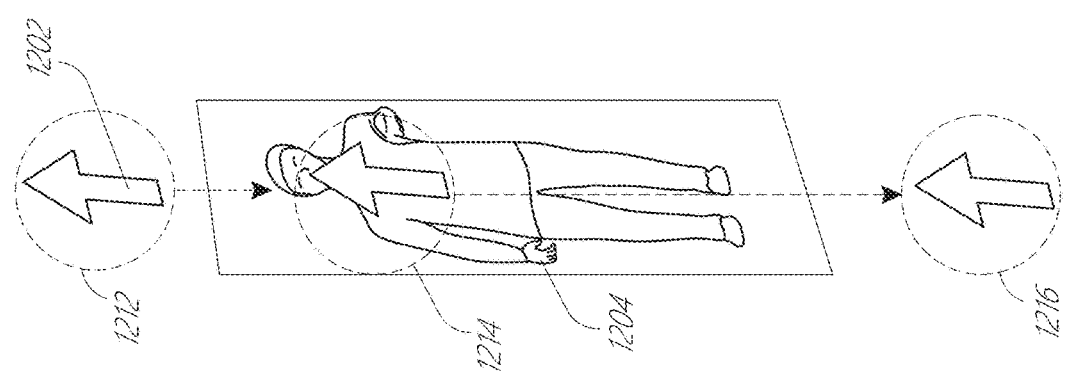

FIGS. 12A-12C illustrate various examples of an object 1204 and cursor 1202 that can be perceived by the user via the wearable system. FIG. 12A shows an example of a 2D environment and FIGS. 12B-12C show examples of a 3D environment. In various embodiments, objects within the user's field of view (FOV) may be virtual or physical objects. For example, one or more objects may include physical objects such as a chair, a tree, a sofa, a wall, etc., while virtual objects may include operating system objects such as e.g., a recycle bin for deleted files, a terminal for inputting commands, a file manager for accessing files or directories, an icon, a menu, an application for audio or video streaming, a notification from an operating system, and so on. Virtual objects may also include objects in an application such as e.g., avatars, virtual objects in games, graphics or images, etc. Some virtual objects can be both an operating system object and an object in an application. In some embodiments, the wearable system can add virtual elements to the existing physical objects. For example, the wearable system may add a virtual menu associated with a television in the room, where the virtual menu may give the user the option to turn on or change the channels of the television using the wearable system.

A virtual object may be a three-dimensional (3D), two-dimensional (2D), or one-dimensional (1D) object. For example, the virtual object may be a 3D coffee mug (which may represent a virtual control for a physical coffee maker). The virtual object may also be a 2D graphical representation of a clock (displaying current time to the user). In some implementations, one or more virtual objects may be displayed within (or associated with) another virtual object. A virtual coffee mug may be shown inside of a user interface plane, although the virtual coffee mug appears to be 3D within this 2D planar virtual space.

Utilization of a Cursor

With continued reference to FIGS. 12A-12C, the wearable system displays a cursor 1202, which can be a movable indicator, that a user can utilize to select or interact with objects within the environment. The cursor can be displayed within a bounded region of the environment (e.g., a location within the FOV). In some cases, the cursor represents a location at which user interaction with real or virtual objects may occur. For example, the user can utilize the cursor 1202 to select, view, or point to an object, such as object 1204. By changing the location of the cursor 1202, the user can alter selections or views, or change where the cursor 1202 is pointing. In various implementations, the user can change the location of the cursor by, for example, translating or rotating a handheld totem, moving a finger (e.g., thumb) across a touch sensitive portion of a totem or other user input device, translating or rotating a body part (e.g., a finger, hand, or arm), or moving his or her head or eyes.

The appearance of a cursor 1202 can take on any of a variety of different colors, outlines, shapes, symbols, sizes, images, graphics, in combination or the like. For example, the cursor 1202 may take a variety of shapes such as a cursor, a geometric cone, a beam of light, an arrow, an oval, a circle, a polygon, or other 1D, 2D, or 3D shapes.

The cursor 1202 may be used to select, view, or point to an object, such as object 1204, by moving the cursor 1202 such that it hovers over, hovers behind, or otherwise points to a target object 1204. Once the cursor 1202 and the target object 1204 are sufficiently aligned, the user may select or interact with the target object 1204 to which the cursor 1204 is hovering or pointing, for example, by making a hand gesture, actuating a touch-sensitive portion of a totem, etc.

The user can move his or her body, head, or eyes to move the cursor 1202. For example, a change in the user's pose (e.g., head pose, body pose, or eye gaze) may alter the location of the cursor 1202 within the FOV. Similarly, the cursor 1202 may be controlled though a user input device such as a user input device 466 of FIG. 4. For example, the user input device can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. For example, as the user moves his hand on a user input device, the cursor 1202 may move from a first position to a second position.

Obscuring Content

Some systems render a cursor with no consideration of scene content. In other words, as a user moves a cursor around a scene, the cursor is rendered in front of the objects in the scene. It follows that when a cursor is used to target or select an object, as the cursor hovers over the object, the cursor can occlude or obscure the object. This can impact a user's experience within an environment. For example, the user may desire to see the object yet the cursor is rendered in front of the object, thereby blocking the user's view of the object. These problems can be further exacerbated when the object includes text, images, or other content that the user wishes to view. Further, when the cursor is rendered in front of the target object, the cursor is higher on the user's visual hierarchy than the target object, which can be distracting, because the user is trying to interact with real or virtual objects in the environment and not the cursor, which preferably should function as a tool rather than be the highest, or higher, object in the visual hierarchy.

FIG. 12A illustrates an example of some of the problems associated with a cursor in 2D environment. As shown, FIG. 12A illustrates various locations of the cursor 1202 as it moves around the 2D environment, specifically as the cursor 1202 moves from position 1212 (e.g., where the cursor 1202 is above the object 1204) to position 1214 (e.g., where the cursor 1202 is in front of the object 1204) to position 1216 (e.g., where the cursor 1202 is below the object 1204).

In the 2D environment of FIG. 12A, the cursor 1202 and the object 1204 have no depth. In other words, the cursor 1202 is rendered at the same depth as the object 1204, and, when the cursor 1202 and the object 1204 overlap, the cursor 1202 is shown instead of the object 1204. For example, as the cursor 1202 moves from position 1212 to position 1214, the cursor 1202 appears to "roll over" the object 1204 such that the cursor 1202 is shown and the portion of the object 1204 behind the cursor is blocked from the user's view.

FIG. 12B illustrates an example of how occlusion by the cursor can be exacerbated in a 3D environment. As shown, FIG. 12B illustrates various locations of the cursor 1202 as it moves around the 3D environment, specifically as the cursor 1202 moves from position 1222 (e.g., where the cursor 1202 is above and centered over the object 1204) to position 1224 along a path 1250*a* (e.g., where the cursor 1202 is in front of the object 1204) to position 1226 (e.g., where the cursor 1202 is centered and below the object 1204).

In the 3D environment of FIG. 12B, the cursor 1202 and the object 1204 do have depth. In other words, for the cursor 1202 to "roll over" or "roll around" the object in 3D space, the cursor 1202 must move closer to or further away from the user such that the cursor 1202 and object 1204 do no overlap. For example, if the cursor 1202 and the object were kept at the same depth during the "roll over," the cursor 1202 might appear to pass through the object 1204, which may be undesirable because it breaks realism and may obscure portions of the cursor 1202 or portions of the object 1204. In FIG. 12B, if moved along the path 1250*a*, the cursor is moved closer to the user such that it is in front of the object 1204 and between the object 1204 and the user (see, e.g., position 1224). For example, the object 1204 in FIG. 12B is a character having an arm extending in front of its body. Initially, at position 1222 the cursor 1202 is approximately the same distance from the user as the character 1204. However, as the cursor 1202 moves along the path 1250*a* from position 1222 to position 1224, the system must bring the cursor 1202 closer to the user in order for the cursor 1202 to be in front of the extended arm of the character 1204. By bringing the cursor 1202 closer to the user, the system is effectively emphasizing the cursor 1202 relative to the character 1204, because a user is more likely to focus on objects that appear closer to him or her. To reduce emphasis on the cursor, the system could dynamically adjust the size of the cursor in order to maintain a consistent appearance of the cursor. However, because the cursor's perceived dimensions would change based on distance from the user, this type of perspective change may confuse the user or, at a minimum, provide the user with misleading information. Accordingly, although it would be desirable to emphasize the character 1204 that the user is attempting to interact with, by utilizing a cursor 1202 that passes in front of the character, the system undesirably emphasizes the cursor 1202 over the character.

To reduce the likelihood of emphasizing a cursor 1202 when the cursor 1202 and the object 1204 overlap, the cursor can, in effect, move along a path 1250*b* that goes behind the object 1204 (such that the object 1204 "eclipses" the cursor). The cursor 1202 is thereby deemphasized relative to the foreground object 1204. When the cursor 1202 is behind an object 1204 (such as the character in FIG. 12B), the wearable system may stop rendering the cursor, because the cursor is not visible to the user (e.g., the object is opaque and "eclipses" the cursor). In some embodiments, when behind the object 1204, the cursor 1202 continues to be rendered by the wearable system, but at a reduced brightness level so that it remains deemphasized relative to the object or the object 1204 is rendered to be in front of the cursor 1202 (e.g., the object eclipses the cursor), which may in effect reduce the perceptibility of the cursor relative to the object. As further described below, additionally or alternatively, when the cursor is behind the object, the system may render a focus indicator (e.g., a glow or halo) around the object 1204 to provide a visual indication to the user as to the location of the cursor.

FIG. 12C illustrates an example of how an object can change in size or shape or perceived depth as the cursor moves behind the object in a 3D environment. As shown, FIG. 12C illustrates various locations of the cursor 1202 as it moves around the 3D environment, specifically as the cursor 1202 moves from position 1222 (e.g., where the cursor 1202 is above and centered over the object 1204) to position 1226 (e.g., where the cursor 1202 is centered and below the object 1204).

In FIG. 12C, rather moving the cursor 1202 closer to the user (e.g., path 1250*a* of FIG. 12B) or moving the cursor 1202 further away from the user (e.g., path 1250*b* of FIG. 12B), the system can move the cursor 1202 along path 1250*c*. In response, the object 1204 can grow larger, or the object 1204 may move closer to the user, or the object foreground can expand (or any combination of these), such that the icon 1204 shifts closer or appears larger or closer to the user. In other words, rather than altering the depth of the cursor 1202 relative to the user or object 1204, the system can keep the cursor at the same depth and adjust a relative depth of the object 1204, such that the object 1204 appears closer to the user than the cursor. In some embodiments, the object 1204 may shift to a new depth (e.g., one that is closer to the user); in some embodiments, the object 1204 may remain at the same depth as the cursor but may be rendered with a closer vergence display input so as to appear closer to the user. By bringing the object 1204 closer to the user, the system is advantageously emphasizing the object 1204, because a user is more likely to focus on objects that appear closer to him or her. Furthermore, similar to path 1250*b* of FIG. 12*b*, because the object is shifted towards a user, the cursor 1202 can, in effect, move along a path 1250*c* that goes behind the object 1204 (such that the object 1204 "eclipses" the cursor). The cursor 1202 may not be rendered while behind the object 1204 or may be rendered at a reduced brightness or with increased transparency. The cursor 1202 is thereby deemphasized relative to the foreground object 1204. When the cursor 1202 is no longer behind the object 1204, the wearable system may shift the object 1204 back to its original position and adjust the object to its original size, thereby deemphasizing the object 1204 and again rendering the cursor 1202 (which is no longer eclipsed) so that the user can view the cursor and the object. As described above, while the cursor 1202 is eclipsed by the object 1204, the system can render a focus indicator around or adjacent at least a portion of the object 1204, which further emphasizes the foreground object relative to the cursor.

Additional examples of behavior of an eclipse cursor are described below with reference to FIGS. 18A-18C and 30A-30F.

Utilization of a Focus Indicator

In some cases, when the cursor 1202 is positioned behind the object 1204, it may be difficult for the user to get an accurate sense of the cursor's location within the scene. For example, the cursor 1202 is (at least partially) blocked by the object 1204, and it may be difficult for the user to visually re-acquire the cursor in the future or remember which object has been selected. Accordingly, to offer the user an accurate sense of the cursor's location within the environment, in some cases, the system can emphasize the object 1204 when the cursor 1202 moves behind that object 1204. For example, the system can assign a focus indicator (e.g., some form of visual highlighting) to the object 1204. Thus, when the cursor 1202 moves near to or behind an object 1204, the focus indicator is activated and the object 1204 is emphasized, while the user still gets an accurate sense of the cursor's location within the scene and which object has been selected.

FIGS. 13A and 13B illustrate non-limiting embodiments of a focus indicator 1302 and a cursor 1202. The appearance of a focus indicator 1302 to can take on any of a variety of different colors, outlines, shapes, symbols, sizes, images, graphics, in combination or the like. For example, the cursor 1202 may take a variety of shapes such as a cursor, a geometric cone, a beam of light, an arrow, cross-hairs, an oval, a circle, a polygon, or other 1D, 2D, or 3D shapes. The focus indicator 1302 can include, but is not limited to, a halo, a color, a perceived size or depth change (e.g., causing the object to appear closer or larger when selected), virtual rays, lines, or arcs, or other graphical highlighting emanating from, surrounding, or associated with at least a portion of the object or its periphery in order to draw the user's attention to the object. The focus indicator 1302 can include a glow that radiates from behind an object, and an intensity of the glow can correspond to a spatial relationship between the cursor's location and the location of the object. For example, the intensity of the glow can be largest near the edge of the object and decrease with distance away from the object. The intensity of the glow can be largest on a side of object closest to the cursor (e.g., along a line between the object and the cursor), and the intensity can be lower (or zero) on the side of the object away from the cursor. As illustrated in FIG. 13B, the cursor or focus indicator may have an iridescent appearance. The focus indicator 1302 (or the cursor 1202) can also include audible or tactile effects such as vibrations, ring tones, beeps, or the like.

The cursor 1202 may be large enough or the object may be small enough that when the cursor 1202 is positioned behind the object, the outer portions of the cursor give the appearance of a focus indicator surrounding the object. In some cases, as illustrated in FIGS. 13A and 13B, the focus indicator 1302 can appear as a larger version of a cursor 1202. For example, the system can render a cursor 1202 and, in response to the cursor passing below a threshold distance between it and the object, the cursor 1202 can be eclipsed (e.g., not rendered) in favor of a focus indicator 1302 that appears around the object. In further response to the cursor passing above a threshold distance between it and the object, the cursor can again be rendered by the system and the focus indicator deemphasized.

Examples of Cursors and Focus Indicators

Figure 14A:
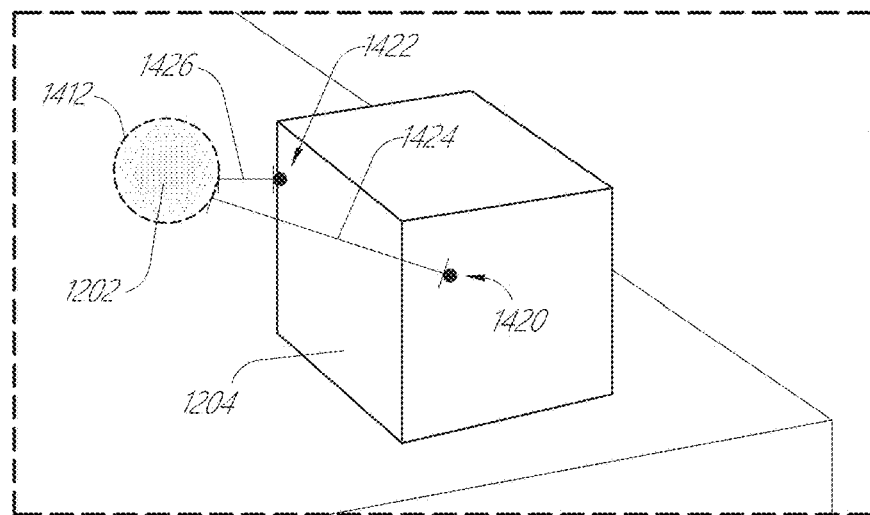
FIGS. 14A-14C illustrate an example of a cursor and an object in a 3D environment perceivable by the user via the wearable display system.
Figure 14B:
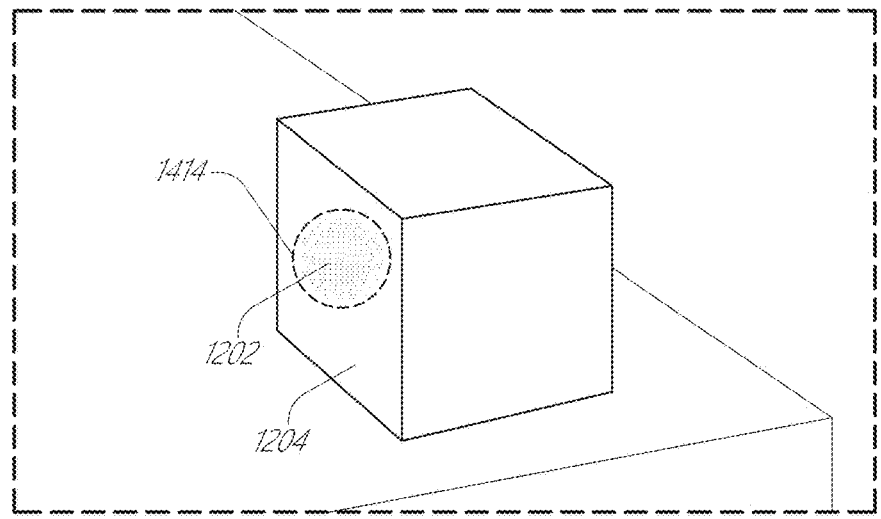

FIGS. 14A and 14B illustrates an example of an environment including a cursor 1202 and an object 1204. In this example, the object 1204 is a cube sitting on a table. As the cursor 1202 transitions from position 1412 in FIG. 14A to position 1414 in FIG. 14B, the cursor 1202 moves over (or in front of) the object 1204. Accordingly, when the cursor 1202 is at position 1414, the cursor 1202 is blocking from the users view a portion of the object 1204, which as discussed above can be distracting to a user.

Figure 14C:
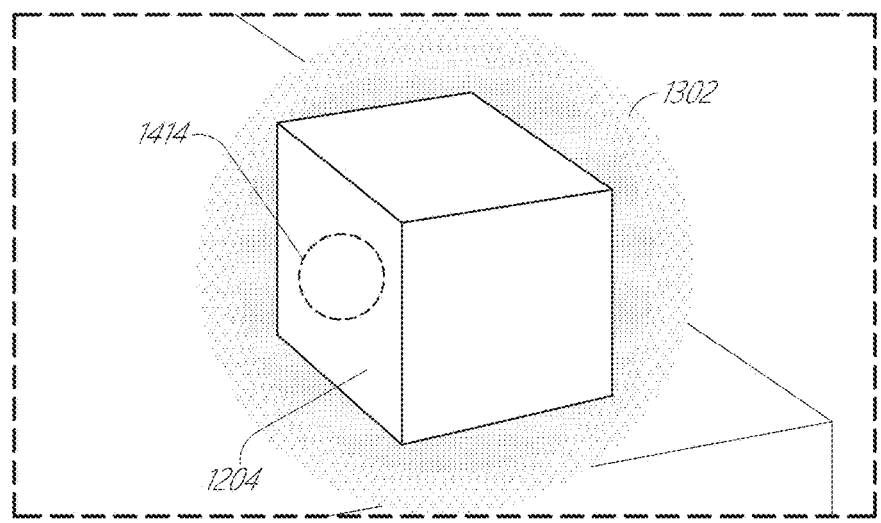

FIG. 14C illustrates an example of an environment schematically illustrating features of the eclipse cursor functionality. In contrast to FIG. 14B, the cursor 1414 moves behind the object 1204 and is not rendered to the user (and is indicated by a dashed line in FIG. 14C). As the cursor 1414 gets close to and passes behind the object 1204, a focus indicator 1302 is rendered to the user. In this example, the focus indicator 1302 is a circular glow surrounding the cube, with the intensity of the glow being highest near the edges of the cube and decreasing in magnitude with increasing distance from the cube.

Focus Indicator Thresholds

As described herein, the focus indicator 1302 can advantageously provide the user with an accurate sense of the cursor's location within the environment when the cursor is eclipsed by an object. For example, as can be seen in FIG. 14C, although the cursor 1414 is not visible to the user, the focus indicator 1302 surrounding the object 1204 identifies to the user that the object is selected (or interacted with) and further indicates that the cursor is behind the object 1204.

The system can assign a focus indicator 1302 to an object based at least in part on a determination that the cursor's location within the environment passes a distance threshold relative to the object. In other words, a focus indicator 1302 can be assigned to an object based on a determined spatial relationship between the cursor's location within the environment and the location, size, shape, orientation, etc. of the object. The cursor's location can be determined via a ray cast or cone cast, and the distance to the object can be determined as the perpendicular distance between the ray (or cone) and the object.

The focus indicator 1302 can offer the user an accurate sense of the cursor's location within an environment. For example, as a user changes the cursor's location within the environment, the system can assign, un-assign, or modify a focus indicator associated with one or more objects in the environment. The system can adjust an intensity, size, shape, color, or other characteristic of a focus indicator 1302 to indicate the relative distance between the cursor and the object. For example, as the cursor's location within the environment moves closer to an object, the focus indicator assigned to that object may be shown more intensely or larger (at least in a direction toward the cursor). As the cursor's location within the environment moves away from an object, the focus indicator assigned to the object may be become less intense or smaller, or the system may stop rendering the focus indicator.

FIG. 14A illustrates examples of various distance threshold considerations of the system when determining how (or whether) to render a focus indicator. The system can monitor the location 1412 of the cursor 1202 and based at least partly on that location, the system can determine whether to assign a focus indicator 1302 and what the properties of the focus indicator are. For example, the system can assign or modify a focus indicator 1302 to an object 1204 if the location 1412 of the cursor 1202 passes below a distance threshold corresponding to the object 1204. The system can un-assign or modify a focus indicator 1302 based at least partly upon a determination that the location 1412 of the cursor 1202 passes above a distance threshold corresponding to the object 1204.

A distance threshold can vary across embodiments and can be based on various factors including but not limited to a size of an object, a number or density of objects in the environment, a proximity of an object relative to another object, or the like. For example, in a crowded environment, the distance threshold at which the focus indicator is activated (or de-activated) may be smaller than in an uncrowded environment in order to avoid visual confusion caused by overlapping focus indicators or having focus indicators on nearly all the objects near the cursor. In various embodiments, the distance threshold may be a fraction of an object's size or a fraction of an average distance among objects in the user's field of view (e.g., 10%, 20%, 50%, 100%, etc.). The distance threshold can be dynamic. For example, if an object (associated with a first distance threshold) moves into a more crowded region of the environment, the object's distance threshold may decrease due to the presence of more nearby objects. Conversely, if the object moves into a less crowded environment, the object's distance threshold may increase.

With reference to FIG. 14A, in some cases, the distance threshold can correspond to a distance between the cursor's location within the environment (e.g., the location 1412) and a portion of the object 1204. For example, the distance threshold can correspond to a distance 1424 between the cursor's location 1412 and the object's center 1420. Similarly, the distance threshold can correspond to a distance 1426 between the cursor's location 1412 and a closest portion 1422 of the object 1204 (e.g., an edge or boundary of the object).

As a non-limiting example, FIG. 14A illustrates the cursor 1202. But since the distance between the cursor 1202 and the object 1204 has not passed below the distance threshold, a focus indicator is not rendered for the object. For example, the system has determined that the location 1412 of the cursor is not close enough to a center 1420 of the object 1204 or that the location 1412 of the cursor is not close enough to a closest portion 1422 of the object 1204. Accordingly, the system renders the cursor 1202 but does not render a focus indicator 1302.

In contrast, as another non-limiting example, FIG. 14C illustrates an example of a situation where the cursor location has passed below the distance threshold (and is behind the object in this illustration). The cursor 1414 is no longer rendered and the focus indicator 1302 is rendered. If the user were to move the cursor so that its distance relative to the object once again exceeds the distance threshold, the user's view might return to the illustration in FIG. 14A where the cursor 1202 is displayed but the focus indicator is not.

Attractive Effect Between Cursors and Objects

In some cases, objects can act as if they have a sticky, gravitational, or magnetized effect on the cursor so that the cursor appears to "snap" onto the object (e.g., once the cursor is sufficiently close to the object). For example, the system can determine the location of the cursor within the user's field of view and can similarly determine a location of one or more objects in the user's field of regard. Based on a spatial relationship between the location of the cursor and the one or more objects, the system can determine which object or objects to assign a focus indicator (e.g., the focus indicator may be displayed (or displayed more prominently) on objects closer to the cursor). The system can continuously assign at least one focus indicator to at least one object in the user's field of regard. For example, the system can assign a focus indicator to the object which is determined to be closest to the location of the cursor. As the location of the cursor changes, so can the object to which the focus indicator is assigned.

To aid the user in moving the cursor onto a desired object (e.g., to select that object for further interaction), the system may simulate the effect of an attractive force between the object and the cursor. The attractive force may mimic a gravitational, magnetic, spring-like, or other attractive force between the objects. For example, the attractive force may decrease as the distance between the object and the cursor increases. Thus, as the user moves the cursor closer to the desired object, the attractive force may increase and tend to pull the cursor toward the desired object. The attractive effect may make it easier for the user to select objects since the user need only move the cursor sufficiently close to a desired object and the system will pull or snap the cursor onto the desired object.

If the system (or the user) moves the cursor onto an object by mistake (or the user changes his or her mind), the user may detach the cursor from the object by applying sufficient user input to pull the cursor off the object.

The amount of the attractive force or the range of the attractive force can be different for different objects or types of objects. For example, objects that the user may want to interact with (e.g., controls for a virtual display, objects or characters in a virtual game) may be more attractive than objects that play a more passive role in the user's environment (e.g., a desk, a graphic on a wall). The attractive force can have a strength that can be modeled as an inverse function of the distance between the cursor and the object (e.g., inverse square law similar to gravity or inverse cube law similar to magnetic dipoles). The strength or range may be user selectable, because some users may prefer a very strong attractive effect in which the system more aggressively pulls the cursor onto objects whereas other users may prefer a small (or no) attractive effect.

Thus, embodiments of the wearable system can simulate the effect of an attractive force between a cursor and an object, because the cursor will be attracted (and "snap") to the closest object. This "attraction" can the offer sustained input feedback and give an accurate sense of position to the user, without, in some cases, requiring the system to display the cursor (because the focus indicators inform the user where the cursor has been pulled to). This can be especially advantageous when the field of regard includes many objects (e.g., objects in a dense grid layout) or when objects are relatively close to each other.

As an example of the attractive force, if the user releases the touchpad of a user input device, the cursor can slide (e.g., as if pulled by gravity) to a position at or within the nearest object (e.g., button, icon, etc.). In various embodiments, this sliding of the cursor can always happen, never happen, or happen if the nearest object is within a certain distance tolerance relative to the cursor. The system can provide settings that include whether the cursor will move to the nearest position on the nearest object, or to a position that aligns with either/both of the object's X and Y axes (e.g., if there is a row of long, adjacent objects, it may be desirable to snap to a central Y or to a central X for a vertical stack of objects). The settings can also include whether use of the attractive force is wanted that are within the entire user environment or whether the attractive force is applied in display panels that include a list or grid of selectable buttons, icons, etc.

In some cases, the cursor "attached" to an object may not immediately become "unattached" to an object unless the user moves an input device sufficiently to indicate to the system to detach the cursor from the previously selected object. This also mimics the effect of a stickiness, gravity, or magnetism between the cursor and the object such that the system acts as if the selected object is holding onto the cursor until the user sufficiently pulls the cursor off of the object.

To further aid user precision when targeting eclipse objects, the system can implement an attractive effect that will tend to draw the cursor towards the closest object, after active user input ceases. Thus, the cursor may act as if it had inertia and may continue to move toward the object even if the user stops actuating a totem or other input device. The pull of the attractive force moves the cursor in a natural way onto the desired object with relatively minimal user action. This can advantageously make it easier for the user to select objects and reduce or minimize user fatigue.

As an example of cursor inertia, if the user is providing touchpad input and cursor motion is being determined or rendered, the system can also associate movement of the cursor which can mimic a degree of inertia. For example, this movement can be applied from the moment that active user input ceases on the touchpad (e.g., the user lifts or stops moving his or her finger). It can cause the cursor to continue along its motion path until a dampening force reduces the inertia back to zero. Controls can limit how much inertia can build up, as well as allowing for inertia boosts to be applied in the event of the user releasing the touchpad at the end of a fast swipe action (e.g., corresponding to a configurable threshold). An inertia boost can support fast swipes through long itemized lists (e.g., to allow one large swipe to carry the cursor from top-to-bottom, if the user chooses).

A cursor can have a magnetized effect on a focus indicator associated with an object such that a proximity of the cursor affects an intensity or positioning of a focus indicator. For example, in some cases, each object may have a focus indicator (e.g., outer glow), and the intensity, size, and location of the focus indicator may vary based on the location of the cursor. For example, as the cursor moves closer to an object, the focus indicator of that object can become brighter, more intense, or move in the direction of (e.g., be attracted toward) the cursor. As the cursor selects the object, the system moves the cursor behind the object while at the same time increasing an intensity of the focus indicator. For example, when the object is selected, the focus indicator can give the appearance of an halo or corona around the object.

Varying Intensity of Focus Indicator

In some cases, the system can assign a focus indicator to more than one object, for example, based on multiple object's proximity to the cursor's location within the environment. Each object can have one or more corresponding distance thresholds (e.g., a close distance threshold, a medium distance threshold, etc.) or a dynamic distance threshold based at least partly on environmental factors (e.g., density of objects in the user's field of view FOV). If the cursor's location within the environment passes a distance threshold, the system can render a focus indicator for the corresponding object. To offer the user additional positional feedback as to where the cursor is located in the environment, the focus indicators that are assigned to various objects can have different attributes (e.g., intensity, color, size, etc.). For example, the focus indicators for objects nearby the cursor can be rendered more brightly than the focus indicators for objects farther away from the cursor. The focus indicator on a side of an object closer to the cursor may be emphasized more than the focus indicator on a side of the object farther from the cursor. Thus, if the cursor were positioned between an upper object and a lower object, the focus indicators for the bottom portion of the upper object and the top portion of the lower object may be rendered more prominently than focus indicators for the more distant, top portion of the upper object and bottom portion of the lower object (if focus indicators are used at all for these portions). Thus, these focus indicators provide a strong visual cue to the user that the cursor is located between the upper and lower objects. The user can, by visually sweeping the FOV, readily identify where the cursor is located by observing the pattern of the focus indicators associated with the objects in the FOV.

Accordingly, an intensity or glow (or size or shape) of a focus indicator can fade in or out depending on the spatial relationship (e.g., distance) between the cursor's location within the environment and the location, size, or shape of nearby objects.

Figure 15A:
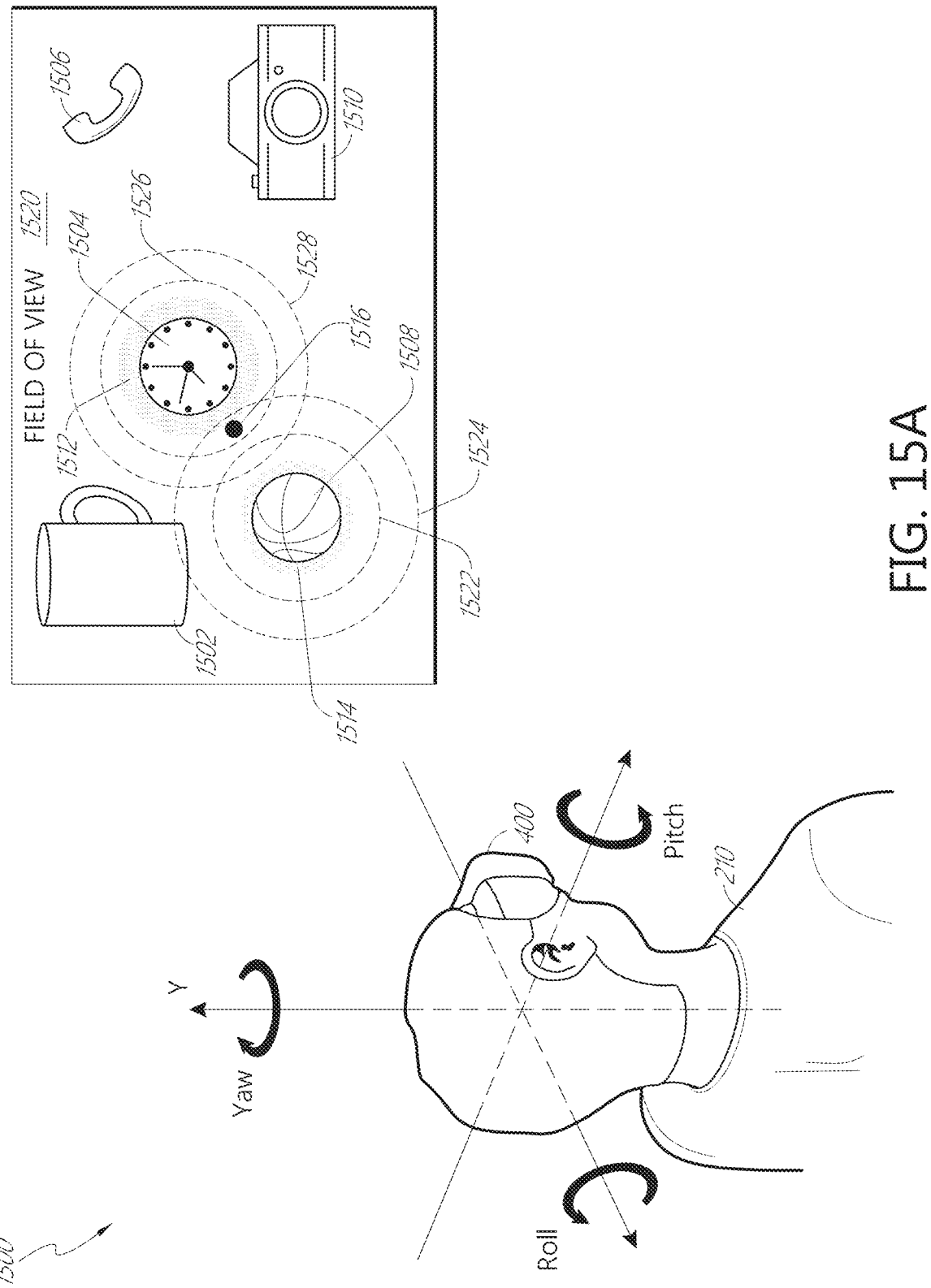

FIGS. 15A and 15B illustrate examples of implementations of multiple focus indicators having various intensities based on an object's proximity to the cursor's location 1516 within the field of view. As illustrated, the user's field of view 1520 includes a plurality of objects, namely a cup 1502, a clock 1504, a phone 1506, a basketball 1508, and a camera 1510. Further, FIGS. 15A and 15B show two distance thresholds for the clock 1504 (thresholds 1526, 1528) and the basketball (thresholds 1522, 1524). The system can provide different functionality when the different distance thresholds are passed. For example, when the cursor passes within the large distance thresholds (1524, 1528) the focus indicator for the associated object may be displayed to the user. When the cursor passes within the smaller distance thresholds (1522, 1526), the system may perform different functionality, for example, further emphasizing the appearance of the focus indicator or activating the attractive effect (described below) in which the cursor is pulled toward and eclipsed by the associated object. The distance thresholds 1522, 1524, 1526, 1528, are shown for illustrative purposes only in FIGS. 15A and 15B and need not rendered by the system. In addition, although FIGS. 15A and 15B illustrate only two thresholds for the objects, any number of thresholds are contemplated (e.g., 1, 2, 3, 4, or more).

As described herein, the wearable system 400 can track, monitor, or otherwise determine the cursor's 1516 location within the field of view 1520. Here, the system has determined that the cursor's location within the environment is between the clock 1504 and the basketball 1508 (and is closer to the clock 1504 than the basketball 1508). Further, the system has determined that the cursor's location within the environment has passed the smaller distance threshold 1526 corresponding to the clock 1504, and that the cursor's location within the environment has passed the larger distance threshold 1524 corresponding to the basketball 1508 (but has not passed the smaller threshold 1522 of the basketball). Accordingly, because the cursor's location within the environment passes a threshold of both the clock 1504 and the basketball 1508, the system renders a focus indicator to each of the clock 1504 and the basketball 1508. However, to provide the user with an understanding that the cursor's location within the environment is closer to the clock 1504 than the basketball 1508, the system can render the focus indicator 1512 assigned to the clock 1504 differently than the system renders the focus indicator 1514 assigned to the basketball 1508. For example, the system can assign a larger or brighter focus indicator 1512 to the clock 1504 (or to the portion of the clock nearest the cursor 1516), and can assign a smaller or less intense focus indicator 1514 to the basketball 1508.

The cursor 1516 is farther away from the cup 1502, the phone 1506, and the camera 1510 than their respective distance thresholds, therefore, the system does not, in this example, render a focus indicator around these objects (or, in other examples, may render a focus indicator that is less prominent than those of the clock and the basketball).

In some cases, the one of more distance thresholds are predetermined, while in other cases the one of more distance thresholds are dynamic and adjusted by the system depending on environmental factors. For example, the system can determine relatively large distance thresholds based at least in part on a determination that the objects in the user's field of view 1520 are relatively far away from each other. In contrast, the system can determine relatively small distance threshold based at least in part on a determination that the objects in the user's field of view 1520 are relatively close to each other, or that there are a relatively large amount of objects in the field of view 1520. This may advantageously allow a user to confidently select an object despite many objects being grouped or positioned close together.

The intensity (or brightness) of a focus indicator can also include a presence of glow in a particular region around or adjacent an object. For example, as a cursor moves closer to an object, the focus indicator of that object can begin to fill (or become present in) a larger region around the object. For example, with respect to FIG. 15A, if the cursor 1516 is within distance threshold 1526 then the focus indicator 1512 can surround the object 1504 and the focus indicator 1512 can be larger, brighter, or more intense than a focus indicator corresponding to other objects 1504.

Also, as further described with reference to FIGS. 16A-16D, 18A-18C, and 29A-29F, a focus indicator can be more visually perceptible on a side of the object closer or closest to the cursor and less perceptible on the opposite side of the object, which provides the user with a clear perception that the cursor is closer to that particular side of the object (and farther from the opposite side of the object). For example, as illustrated in FIG. 15B, as the cursor 1516 approaches the object 1504, the focus indicator 1512 can begin to move out from behind the object 1504 to meet the cursor 1516 (see also FIGS. 29A-29F). This gives the appearance that the focus indicator 1512 is attracted toward the cursor 1516 or pulled out from the object by the cursor. The object 1508 is farther from the cursor 1516 than the object 1504 (e.g., relative to the thresholds 1522, 1524), and in FIG. 15B, the focus indicator 1514 around the basketball has moved out toward the cursor 1516 less than the focus indicator 1512 around the clock. Accordingly, some or all of the relative brightnesses, positions, spatial extents (e.g., circumferential extent around an object), colors, graphical embellishments, etc. of the focus indicators can provide a strong visual indication to the user as to where the cursor is located, which objects are nearby the cursor (and how close or far), which objects have been selected by the user, and so forth.

Implementation of an Eclipse Cursor and Focus Indicator

A focus indicator represents a way of highlighting or emphasizing user selections within an AR, MR, or VR environment associated with the wearable system described herein. Rather than the conventional approach of showing a cursor that moves over and at least partially occludes interactable content, the system can render a cursor that moves behind and is eclipsed by real or virtual objects. The use of focus indicators provides positional feedback to the user via the relative appearance of, for example, glows or halos that radiate out from behind objects in the environment. Further, by continuing to track or determine user input (e.g., head pose, eye pose, body pose, input from user input device, etc.) even after assigning a focus indicator to an object, the system can modify the focus indicators of environmental objects, thereby providing sustained input feedback, an immersive user experience, and an accurate sense of cursor position to the user.

FIGS. 16A-16D illustrates an example of a process of rendering a focus indicator. Implementation of a focus indicator and eclipse cursor may be performed in various ways. For example, implementation of the focus indicator may include utilization of a graphics processor (GPU) or a computing device having at least moderate CPU power. In some cases, the GPU is configured to (i) run fragment shader programs, (ii) render off-screen render buffers, or (iii) perform several passes of full-screen processing work.

To determine the proximity of objects in the user's FOV, the system can determine a location of each of the objects relative to the cursor's location within the environment. For example, many of the objects in the environment can be represented by a 2D shape sitting on a 3D world selection plane. The system can cast a ray against that 3D world selection plane to determine the proximity of the cursor's location within the environment relative to any given object. The system can also determine one or more features of the objects, such as a shape or orientation of the objects. In some cases, based at least in part on the objects shape, silhouette, orientation, or proximity to the cursor's location within the environment, the system can determine a spatial relationship between the cursor's location within the environment and a portion of the object. For example, the system can determine when the cursor's location within the environment overlaps with an object or passes a threshold distance to a portion of the object (e.g., a closest portion of the object, a center of the object, etc.). In some cases, for instance when an environment includes multiple objects, the system can determine which object is closest to the cursor's location within the environment. In some cases, displayed properties of the focus indicator can be based at least in part on the proximity of an object relative to the cursor's location within the environment.

FIGS. 16A-16D schematically illustrate an example of a process by which the wearable system can render an eclipse cursor and focus indicator. This process can be performed by the local processing and data module 260 of the wearable display system 200 described with reference to FIG. 2. The example rendering process described with reference to FIGS. 16A-16D can be performed twice to represent each eye in a stereoscopically rendered AR/MR/VR environment.

Figure 16A:
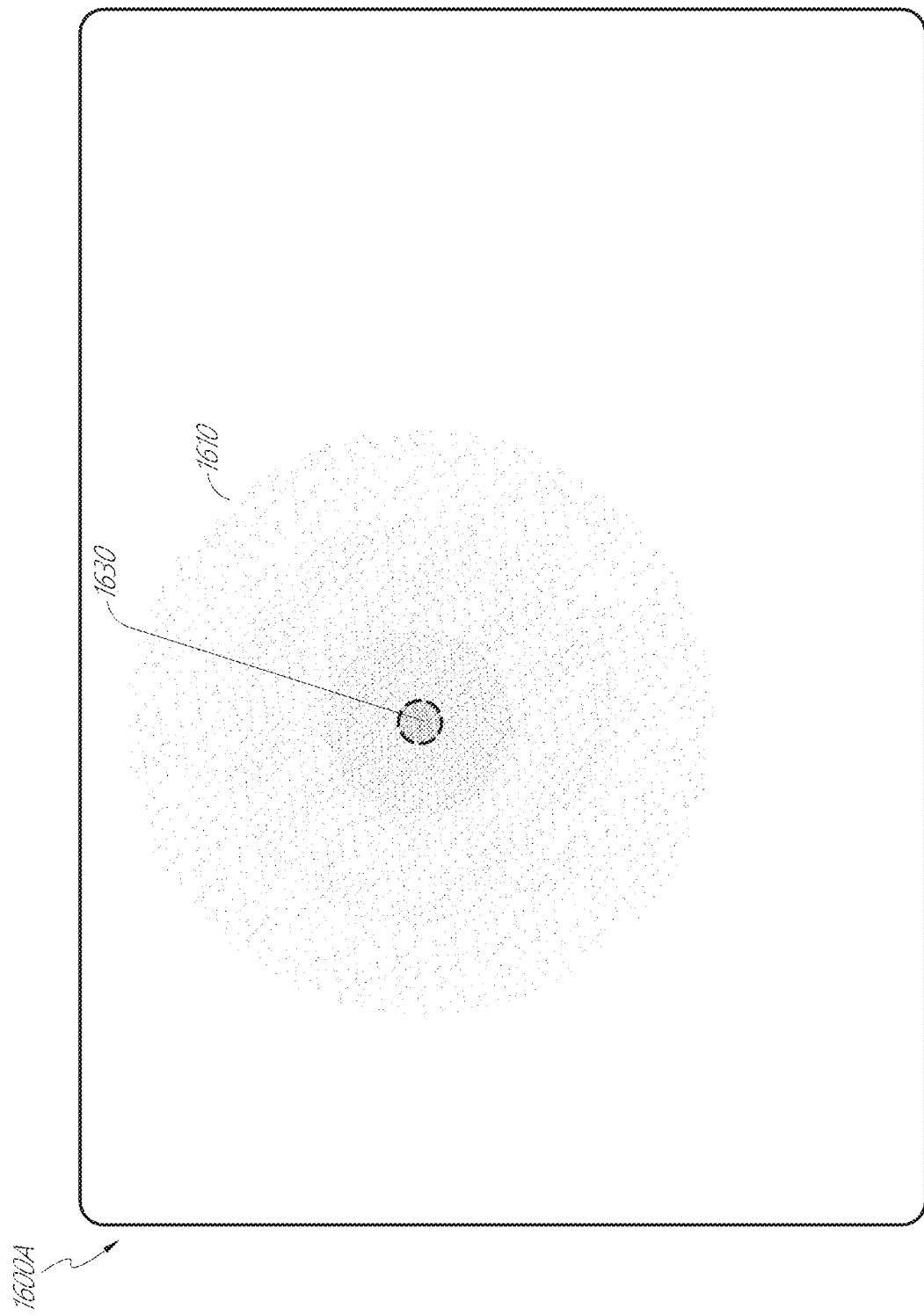
FIGS. 16A-16D illustrate an example of a process of rendering a focus indicator.

FIG. 16A illustrates a first off-screen render pass for rendering a focus indicator. Based at least in part on a determined cursor location within the environment, the system renders a cursor glow 1610 to an off-screen buffer 1600A (sometimes referred to as a "CursorSource buffer"). The cursor glow 1610 can be located in the environment as if it were a conventional cursor. For example, a center 1630 of the cursor glow 1610 can correspond to the cursor's location within the environment. The cursor glow 1610 will ultimately act as a mask defining the largest display-space area within which a focus indicator will appear. The size or shape of the cursor glow 1610 can be based on various criteria, such as a desired focus indicator size, a proximity of the object relative to other objects, a size or shape of the objects, a number or density of objects, etc.

Figure 16B:
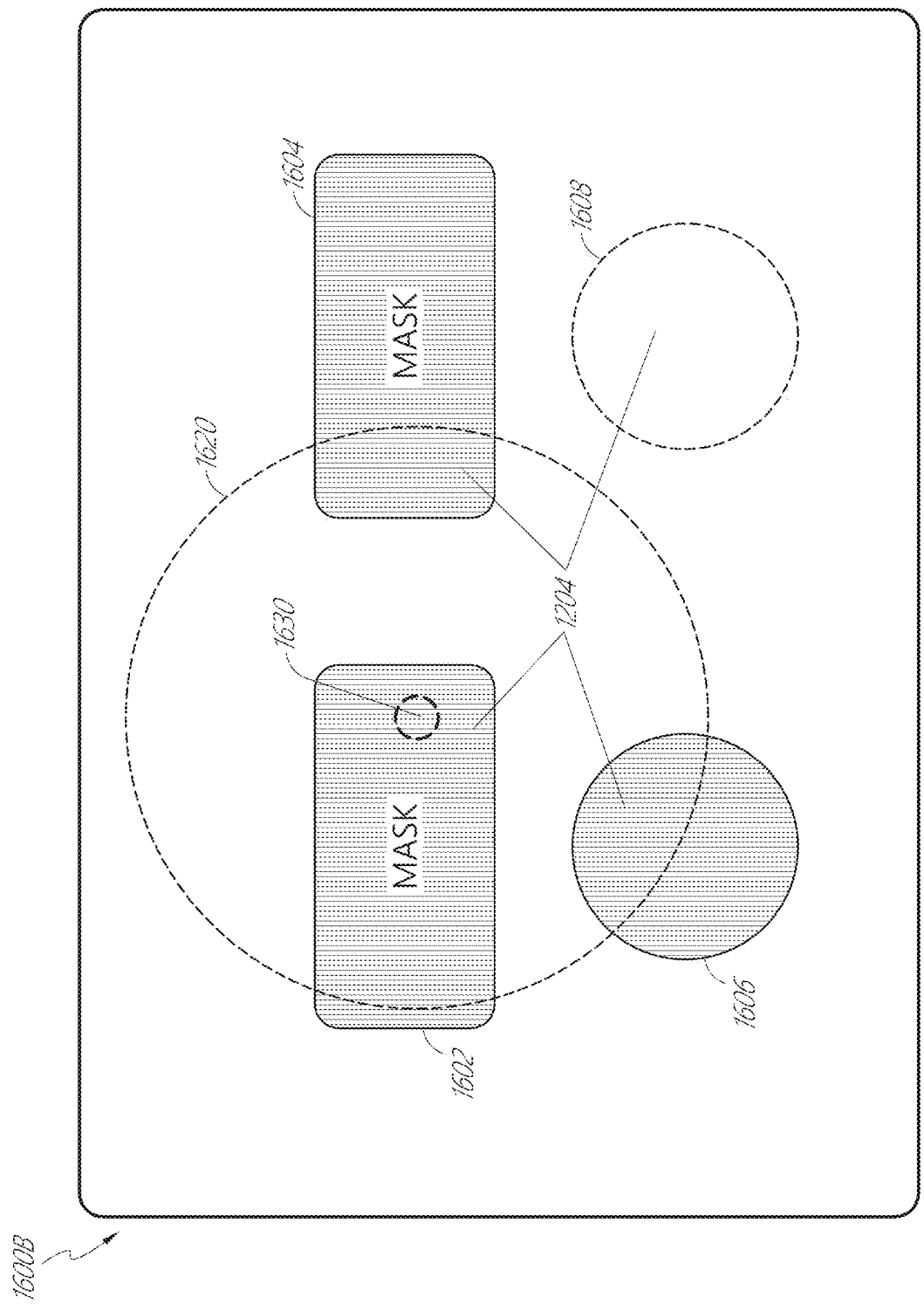

FIG. 16B illustrates a second off-screen render pass for rendering the focus indicator. The second off-screen render pass can be rendered to another off-screen buffer 1600B (sometimes referred to as a "ShapeMask buffer"), and can include a mask representation of one or more of the objects 1204. The mask representation can be based at least in part on a location, orientation, or size of the objects in 3D space. For example, as illustrated in FIG. 16B, the system may only create masks for objects that fall within an outer boundary or silhouette 1620 of the cursor glow 1610 from FIG. 16A. In some cases, the system may only create masks for objects which will be assigned focus indicators. Thus, in this example, the system renders masks 1602, 1604, and 1606 but does not render a mask for the object 1608, which is beyond the outer boundary 1620 of the cursor glow.

The system can determine the shape representation (e.g., the mask) of the objects 1204 in various ways. For example, the system can render masks reflective of a 3D camera transformation of their shape. In some cases, objects 1204 can be represented by 2D spheres, rectangles, or capsule shapes which correspond to an actual shape of the object. Similarly, objects (such as real-world objects) can be represented by a silhouette of the object. In some cases, to draw each shape mask, the system utilizes a shader program that algorithmically renders a given shape from a mathematical formula. In some cases, such as for a 3D object, the system can render a flat-color projection of the object. In some cases, the system uses a camera space approximation of the object's shape.

Figure 16C:
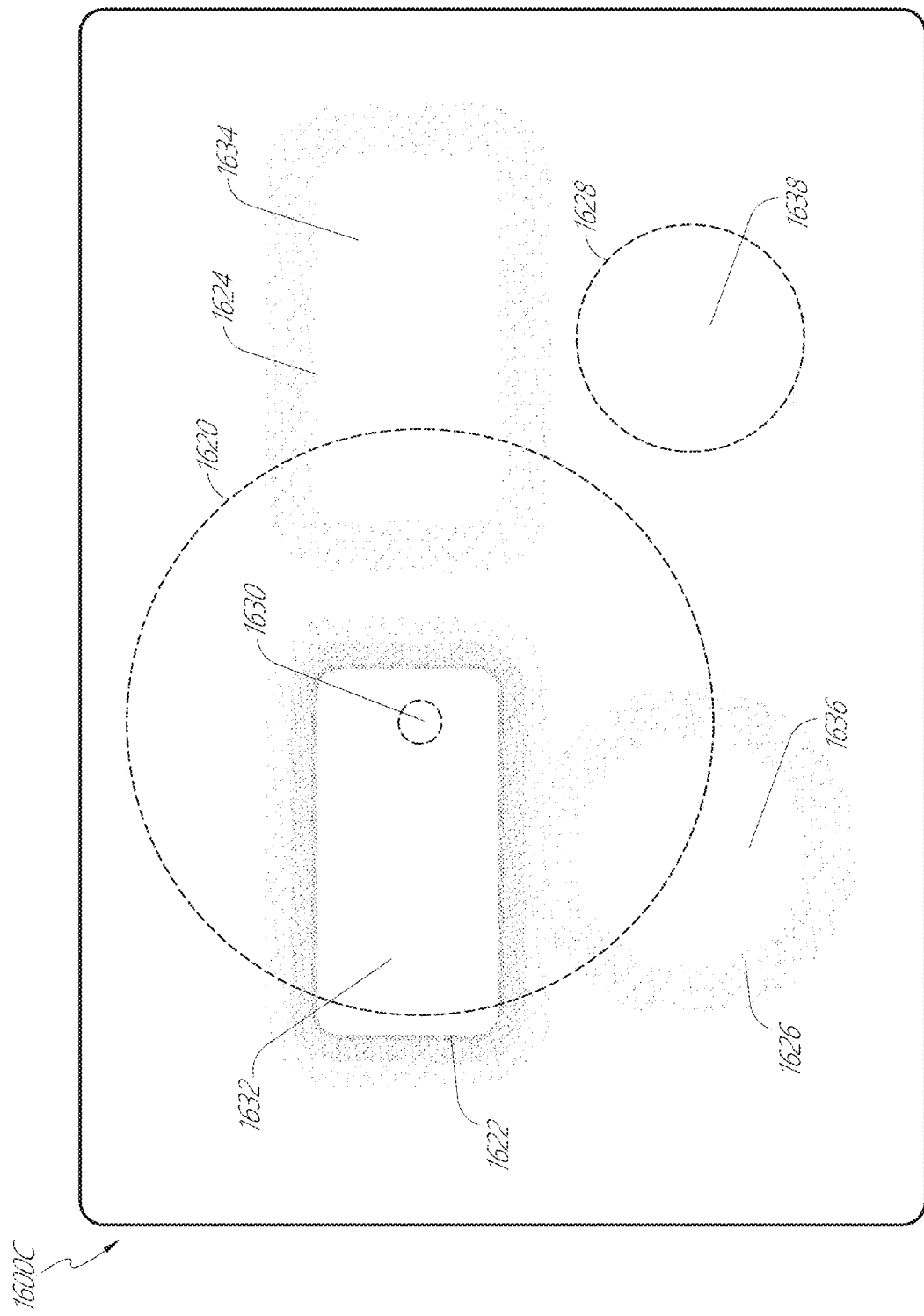

FIG. 16C illustrates a third off-screen render pass for rendering the focus indicator. The third off-screen render pass can be rendered to another off-screen buffer 1600C (sometimes referred to as a "GlowMask buffer"), and can include the masks (e.g., masks 1602, 1604, 1606) of the objects from the ShapeMask buffer 1600B, but can also include glow-masks (e.g., glow masks 1622, 1624, 1626 described below) for one or more of the objects. For example, as with the masks of FIG. 16B, the system may render glow masks for objects that fall within an outer boundary or silhouette 1620 of the cursor glow 1630 from FIG. 16A.

The system may render a glow mask (e.g., an edge glow, a halo, a shading, or other visual indicator) that radiates at least partially around the masks 1602, 1604, 1606. For example, similar to the masks of FIG. 16B, the system can utilize a shader program (or a multi-tap blur of the object-mask) that can draw the shape of an object in a way that feathers the edges of the object shapes by a tunable edge thickness amount. The shader program can use the location 1630 of the cursor and can vary the glow mask's edge thickness, glow brightness, color, or intensity in a way that reflects proximity to the cursor's location. For example, a more intense or brighter glow mask may be associated with a closer object, while a less intense or dimmer glow mask may be associated with an object that is further away. For example, in the example shown in FIG. 16C, glow mask 1622 is brighter than glow masks 1624 or 1626 because the object 1632 associated with glow mask 1622 is closer to the cursor's location 1630 than the objects 1636, 1624. In this example, a glow mask is not generated for the object 1608, because its distance from the center 1630 of the cursor glow 1610 exceeds the size of the cursor glow. The varying intensity of the glow masks can advantageously provide precise positional feedback, even when the system is not rendering an on-screen visual aid (e.g., a cursor) to indicate the position of the cursor.

To modify the glow mask's edge thickness, glow brightness, color, intensity, or other properties, the shader program can consider x and y display-space distances from each rendered pixel to the cursor, and can expand or contract feathering parameters (such as glow mask's edge thickness or glow intensity) accordingly.

Figure 16D:
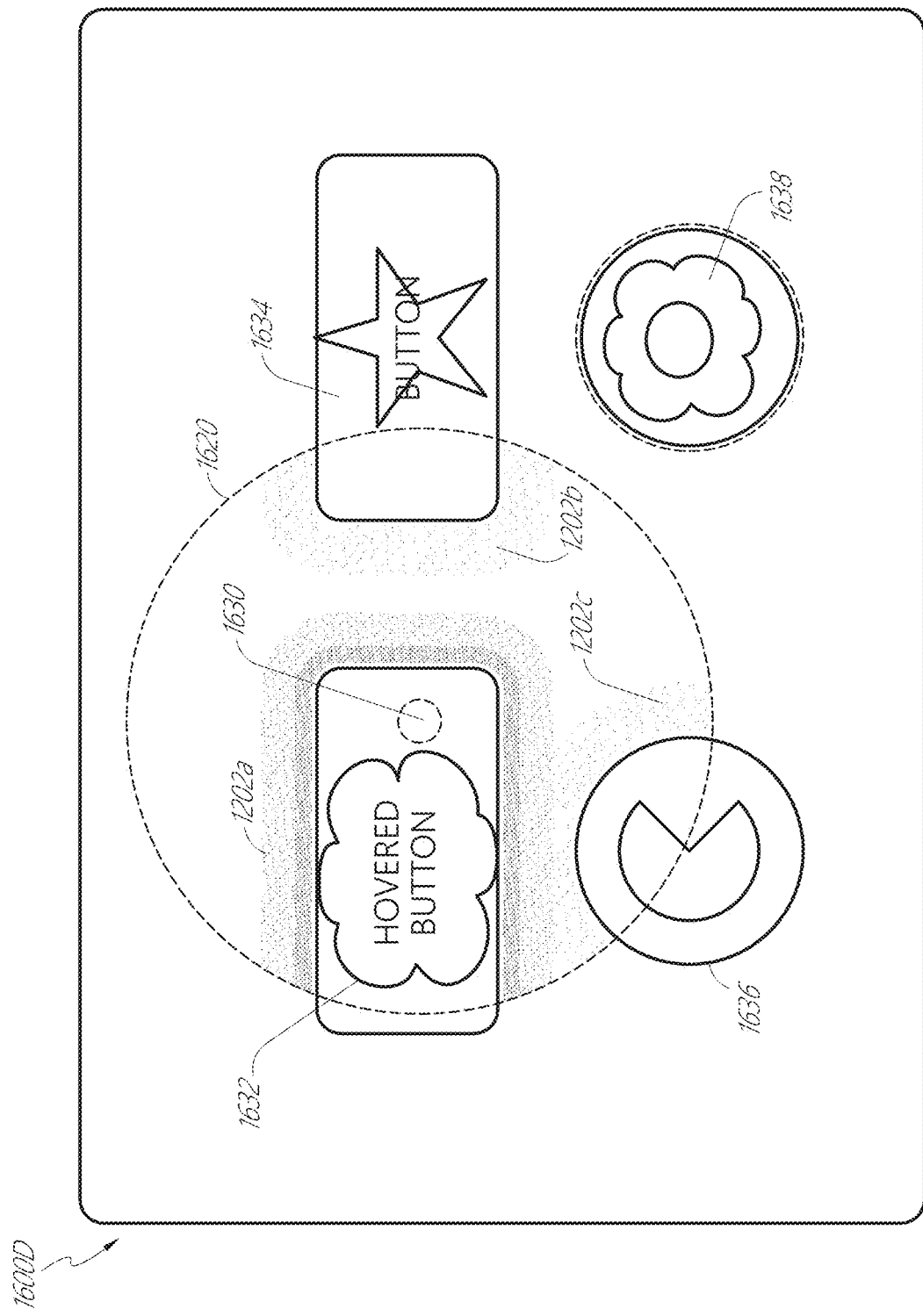

FIG. 16D illustrates a fourth render pass for rendering the focus indicator. The fourth render pass can be rendered on-screen, and can represent a later (or final) stage 1600D of rendering work for the entire scene. For this render pass, the system has access to the CursorSource buffer 1600A, the ShapeMask buffer 1600B, and the GlowMask 1600C buffer, as well as (optionally) one or more on- or off-screen buffers comprising 3D scene content rendered by the rendering application (sometimes referred to as a "SceneBuffer").

The system can combine the CursorSource buffer 1600A, the ShapeMask buffer 1600B, and GlowMask 1600C buffer, and SceneBuffer using various techniques. For example, a shader program can combine the various buffers together to generate the scene 1600D. For example, the shader program can subtract each non-zero ShapeMask 1600B pixel from the SceneBuffer color. In addition, the shader program can add, to the SceneBuffer colors, the combination of the GlowMask 1600C buffer minus the ShapeMask buffer 1600B and multiplied by the CursorSource buffer.

As illustrated in the scene 1600D of FIG. 16D, the objects 1632, 1634, and 1636 have been assigned a focus indicator 1202a, 1202b, 1202c, respectively. The focus indicators 1202a-1202c radiate at least partially around each of the respective objects 1632, 1634, 1636. In this example, the portion of which the focus indicators 1202 radiate corresponds to the portions of the objects that fall within the outer boundary or silhouette 1620 of the cursor glow. Portions of the objects that are outside the boundary 1620 are not rendered with a focus indicator in this example. However, in some cases, if at least a portion of the object falls within the silhouette 1620 of the cursor glow, the entire object and not just a portion of the object is assigned a focus indicator. As shown, because no portion of object 1638 falls within the silhouette 1620 of the cursor glow 1610 (for the illustrated location 1630 of the cursor), the object 1638 is not assigned a focus indicator.

Accordingly, a user who views the rendered scene in FIG. 16D will be provided strong visual cues that the cursor is behind the object 1632 due to the more intense focus indicator 1202a (compared to indicators 1202b and 1202c) and due to the fact that the focus indicators 1202b, 1202c extend only partly around their associated objects 1636, 1634, whereas the focus indicator 1202a extends almost entirely around the object 1632.

In regions where there are sufficient objects or they are relatively densely packed, the eclipse cursor and focus indicators can be effective at indicating the location of the cursor. However, in regions where there are few or no objects, the system can render a graphical element (e.g., a small glow sprite) to indicate the cursor position to the user.

The system may provide tunable parameters for each selectable object that control how strongly the object's edges might glow when selected or interacted with, or which allow for increase or decrease in the extent to which an object may glow as the cursor approaches it. In some cases, when rendering shape masks or glow masks, the system can use a mathematical shape representation to incorporate anti-aliasing into the source render process.

Real-World Objects

Although the implementation of the focus indicators 1202 illustrated in FIGS. 16A-16D show the focus indicators associated with virtual content, similar techniques are applicable in assigning focus indicators highlighting real-world objects in an augmented or mixed-reality environment. For example, the system can use a camera space approximation of the object's shape with a multi-tap blur used to generate the focus indicator.

Eclipse Cursor in Planar Layouts

For environments with many selectable objects, e.g., organized grids or lists, the system may display the cursor to behave more like a focus-indicator. FIG. 17 shows an example of a grid 1700 and user input on a totem 1702 (with a touch sensitive surface 1704). The user's touch on a trajectory 1706 on the touch sensitive surface 1704 moves the cursor along substantially the same trajectory 1710 across the grid layout 1700 of selectable objects. The objects may have the attractive effect described herein, so the cursor need not be displayed between objects as it is attracted to the closest object. For example, one of the objects in the grid 1700 may always have focus (e.g., and be emphasized by a focus indicator). Visual focus indicators and (optionally) haptic events on the totem 1702 can accompany hovering over (or selection of) objects.

For flexible navigation of more complex layouts, including regions with granular selection, such as a browser or a document with much selectable text, the cursor may always be visualized, because the layout is not full of eclipse objects that will occlude the cursor. Visual focus indicators and optional haptic events can still accompany hovering over selectable objects.

Additional Examples of Eclipse Cursors and Focus Indicators

Figure 18C:
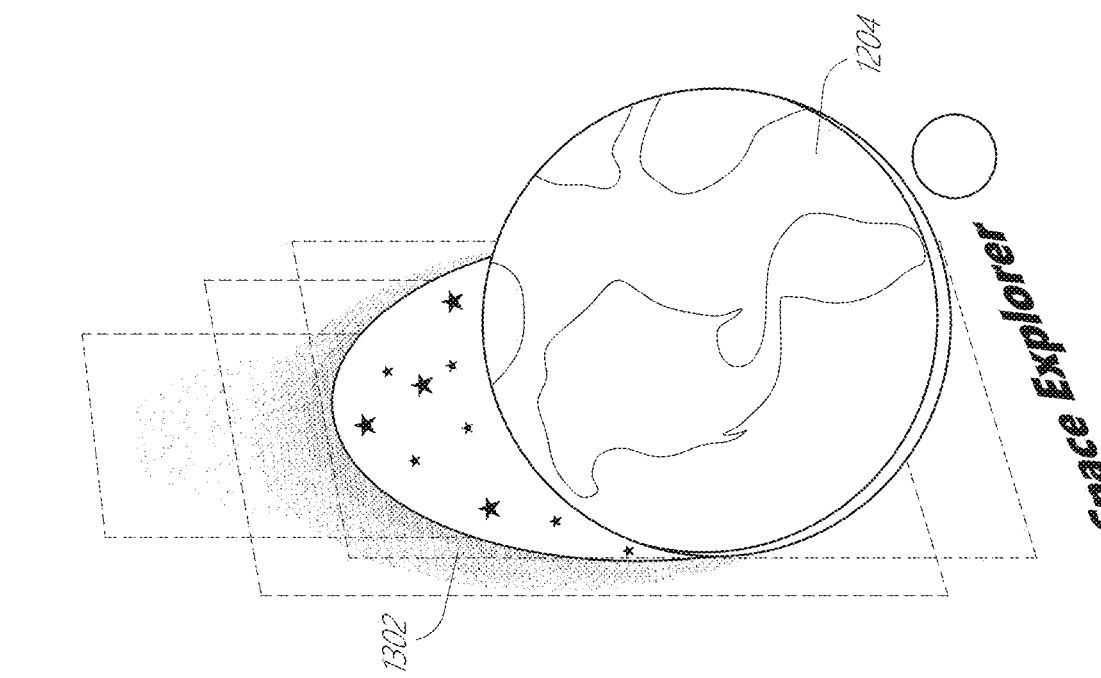
FIGS. 18A-18C illustrate an example of a cursor moving toward an object having a focus indicator.
Figure 18B:
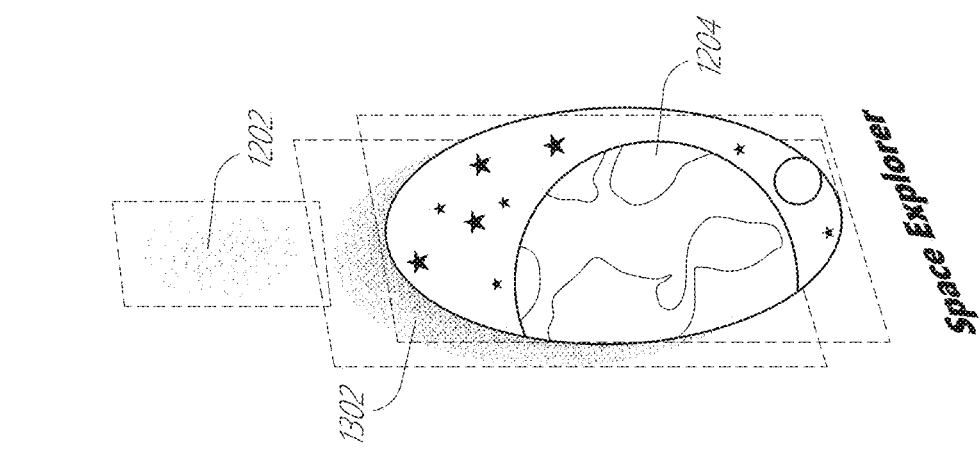
Figure 18A:
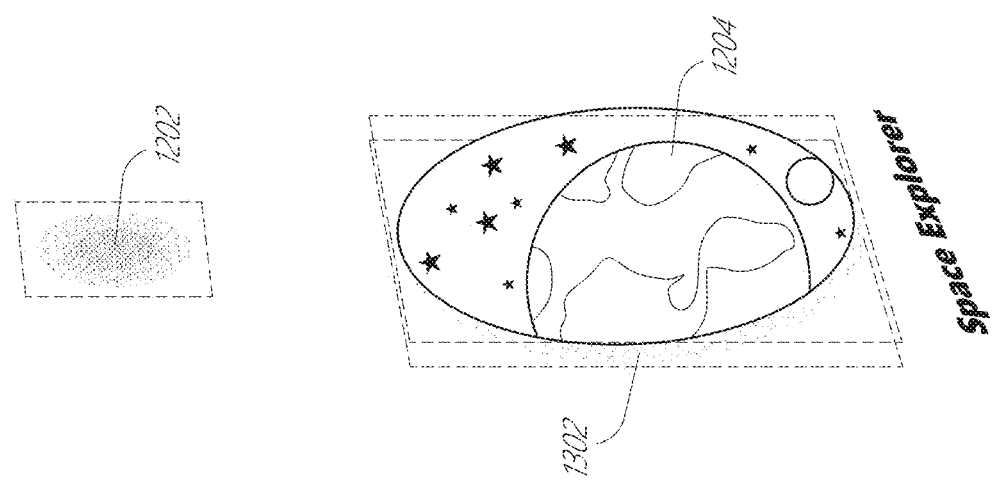

FIGS. 18A-18C illustrate an example of a cursor 1202 moving toward an object 1204 having a focus indicator 1302. The object 1204 may be a selectable object such as an icon, which can be selected to initiate execution of an application. In this example, for illustrative purposes, the icon is illustrated as the earth and moon in a starry background, and the executable application is labeled as Space Explorer. Dashed lines around the icon 1202, the focus indicator 1302, and the object 1204 indicate that each of these graphical elements may be rendered by the display system in different buffers, which can be combined as described with reference to FIGS. 16A-16D.

FIG. 18A illustrates an example when the cursor is remote from the object 1204. In this case, the cursor 1202 is relatively bright to aid visibility to the user and the focus indicator 1302 is relatively small and not very intense. The system may render the focus indicator 1302 as roughly the same size as the object 1202 (as shown by the dashed lines in FIG. 18A) and may render the object 1202 on top of the focus indicator 1302 or render the object 1202 after the focus indicator 1302. Thus, when the cursor 1202 is remote from object 1204, the focus indicator 1302 can be said to stay "hidden" behind the object 1204 and may be visually imperceptible or nearly imperceptible to the user.

FIG. 18B illustrates an example of the interactions between the cursor, object, and focus indicator as the cursor approaches the object. As illustrated, the focus indicator 1302 in FIG. 13B is larger, brighter, or more intense than the focus indicator of FIG. 18A. Furthermore, as the cursor 1202 approaches the object 1204, the focus indicator 1302 begins to move out from behind the object to meet the cursor 1202. This gives the appearance that the focus indicator is attracted toward the cursor 1202. In addition, FIGS. 18A and 18B illustrate how an intensity of the focus indicator can fade in or out depending on an object's proximity to the cursor and position relative to the cursor. For example, in FIG. 18B, the focus indicator 1302 is more visually perceptible on the side of the object 1204 closest to the cursor 1202 and less perceptible on the opposite side of the object, which provides the user with a clear perception that the cursor 1202 is close to that particular side of the object 1204.

FIG. 18C illustrates an example of the interactions between the cursor, object, and focus indicator as the cursor moves (or hovers) behind the object. When the cursor 1202 moves behind the object 1204, the object 1204 grows larger (in this example) and the object foreground expands such that the object 1204 appears closer or larger to the user. In addition, the focus indicator 1302 becomes brighter and may substantially surround the object to indicate that the object 1204 has been selected. In this example, the icon (which had been represented in 2D in FIGS. 18A and 18B) has expanded out so that the earth (and moon) are displayed in front of the starry background (e.g., at depths that are closer to the user than the depth of the starry background).

Example Focus Indicators

Figure 19:
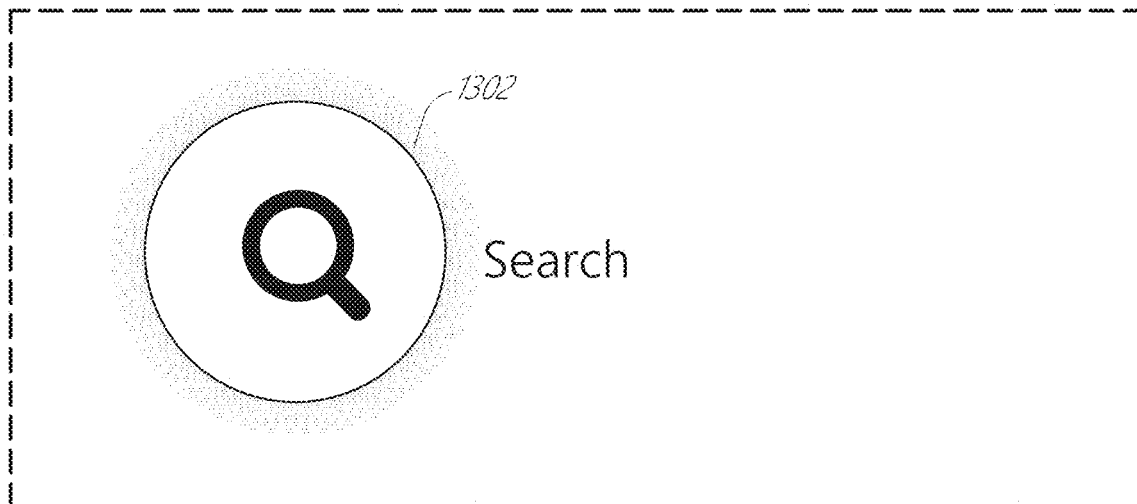
FIGS. 19-22 illustrate various examples of focus indicators that can be rendered by the system.
Figure 20:
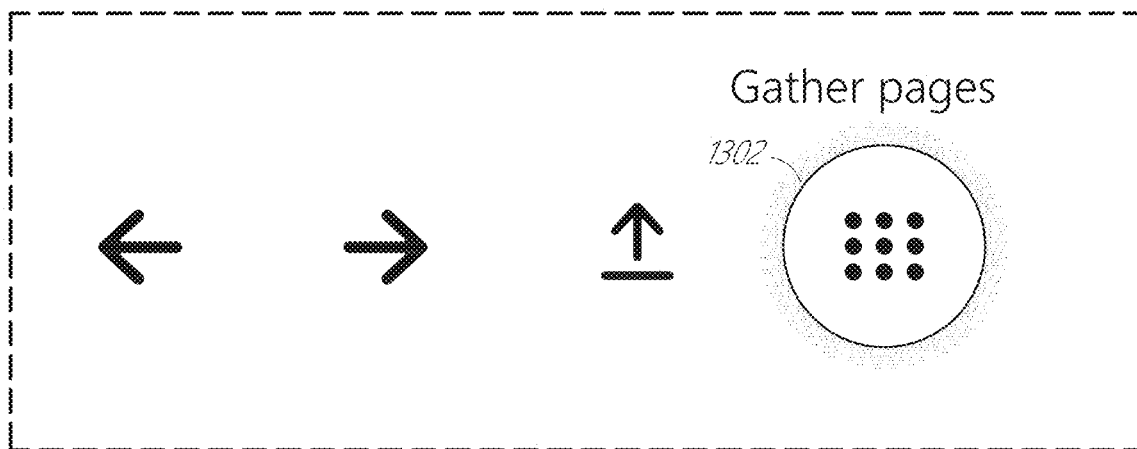
Figure 21:
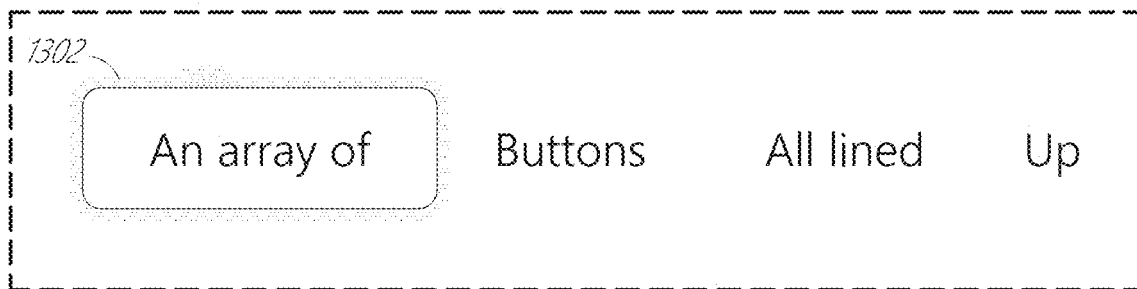
Figure 22:
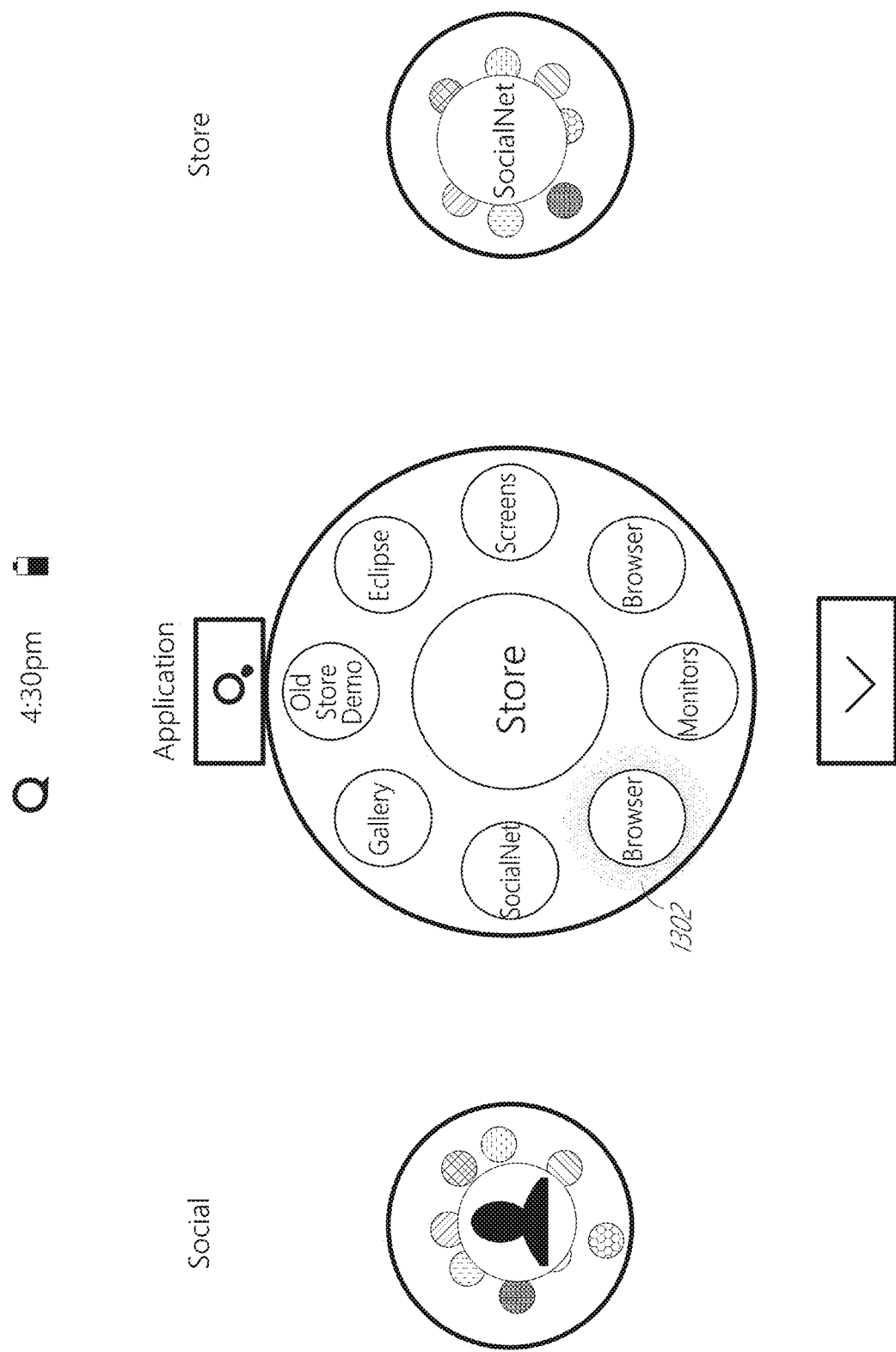

FIGS. 19-22 illustrate various examples of focus indicators that can be rendered by the system. The focus indicators 1302 can be circular (e.g., as shown in FIGS. 18, 19, and 21), rectangular (e.g., as shown in FIG. 20), or other shapes. In some cases, the focus indicator can include a label disposed adjacent (e.g., above, below, or to the side of) an object 1302. For example, FIG. 19 shows a label "Search" to the side of the object 1302 and FIG. 20 shows a label "Gather pages" above the object 1302. The label can be emphasized (e.g., made brighter) when the object is selected to provide a visual cue regarding the object to the user. Although these examples show textual labels, the label can be any graphical element. FIG. 22 shows an example where an application selection icon has been selected by the user, which permits the user to select among applications such as a browser, a social network, etc. In FIG. 22, the user has selected the Browser application and the system renders a focus indicator 1302 as a halo around the Browser icon.

Example Processes of Implementation of an Eclipse Cursor

Figure 23:
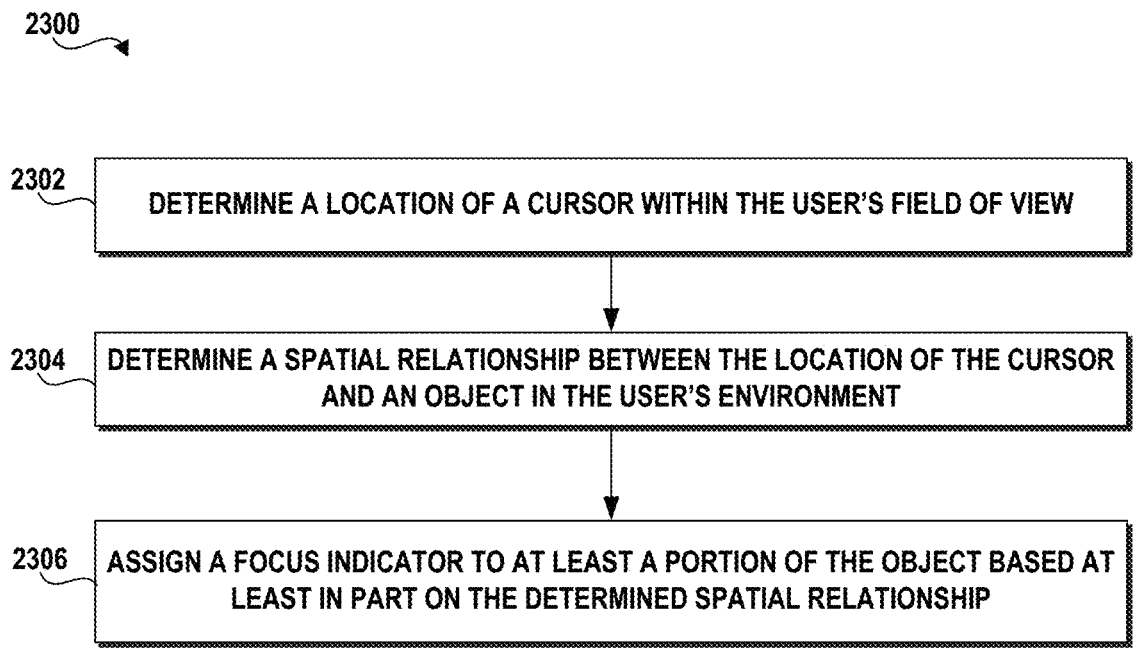
FIG. 23 is a flowchart that illustrates an example method for rendering a focus indicator in a 3D scene.
Figure 24:
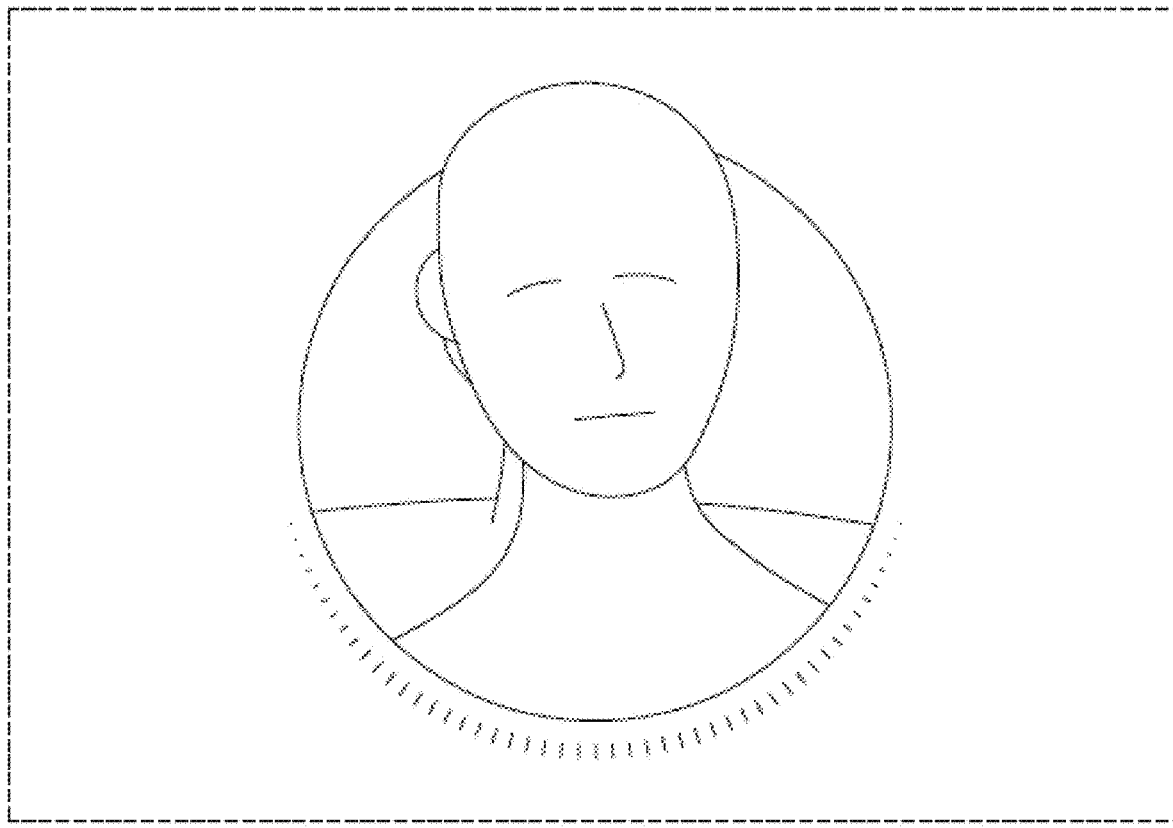
FIGS. 24-28 are front views of embodiments of a display screen or a portion thereof with an icon.
Figure 25:
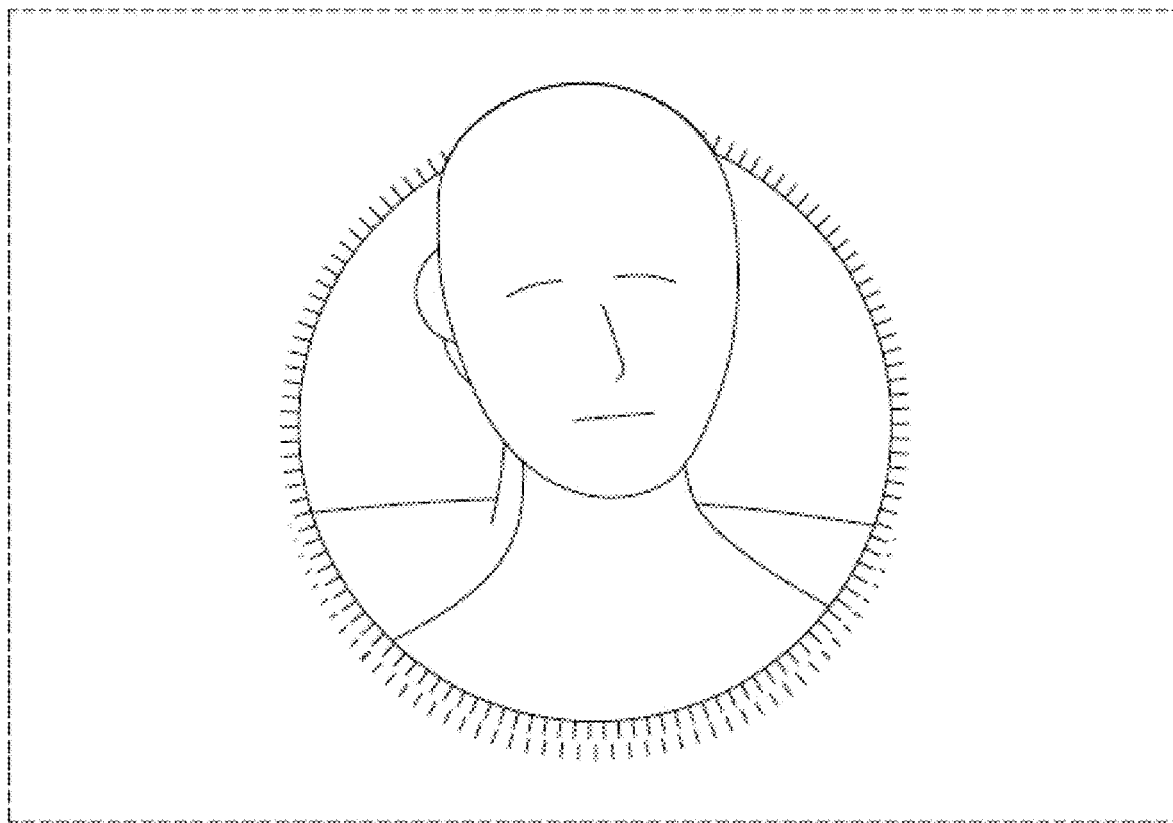
Figure 26:
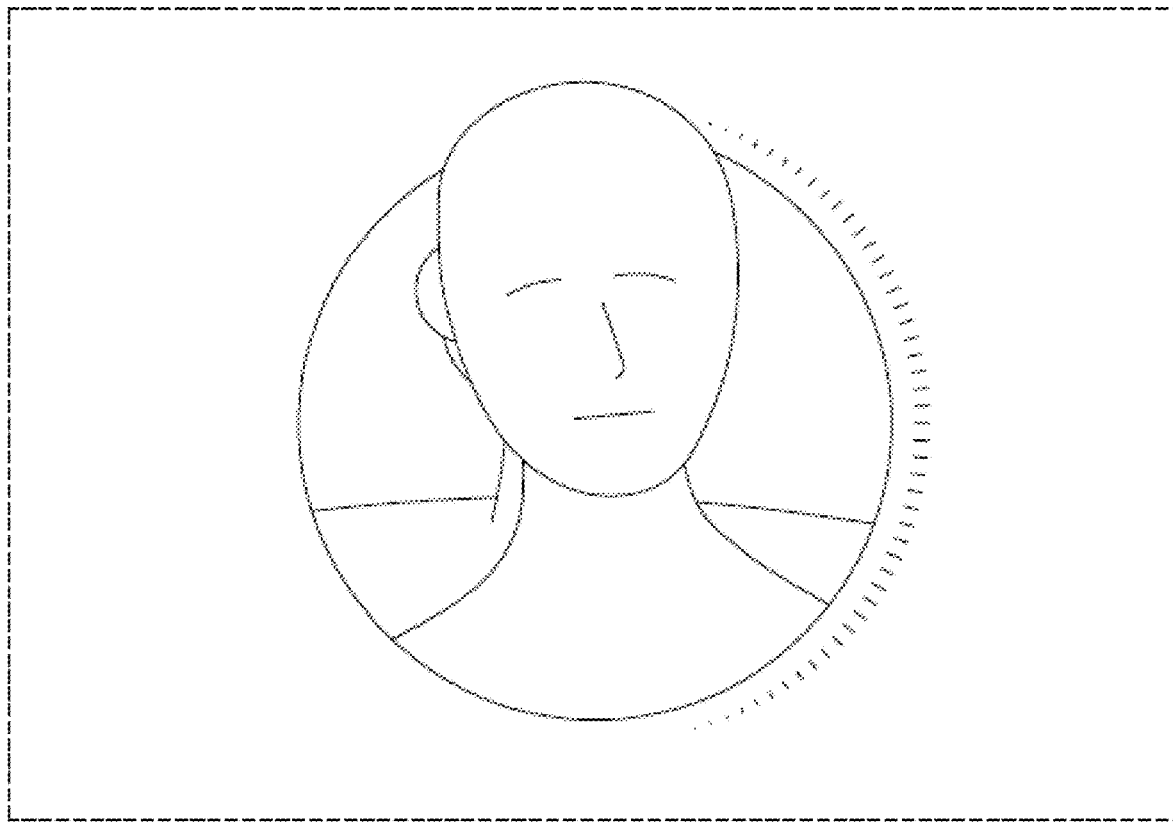
Figure 27:
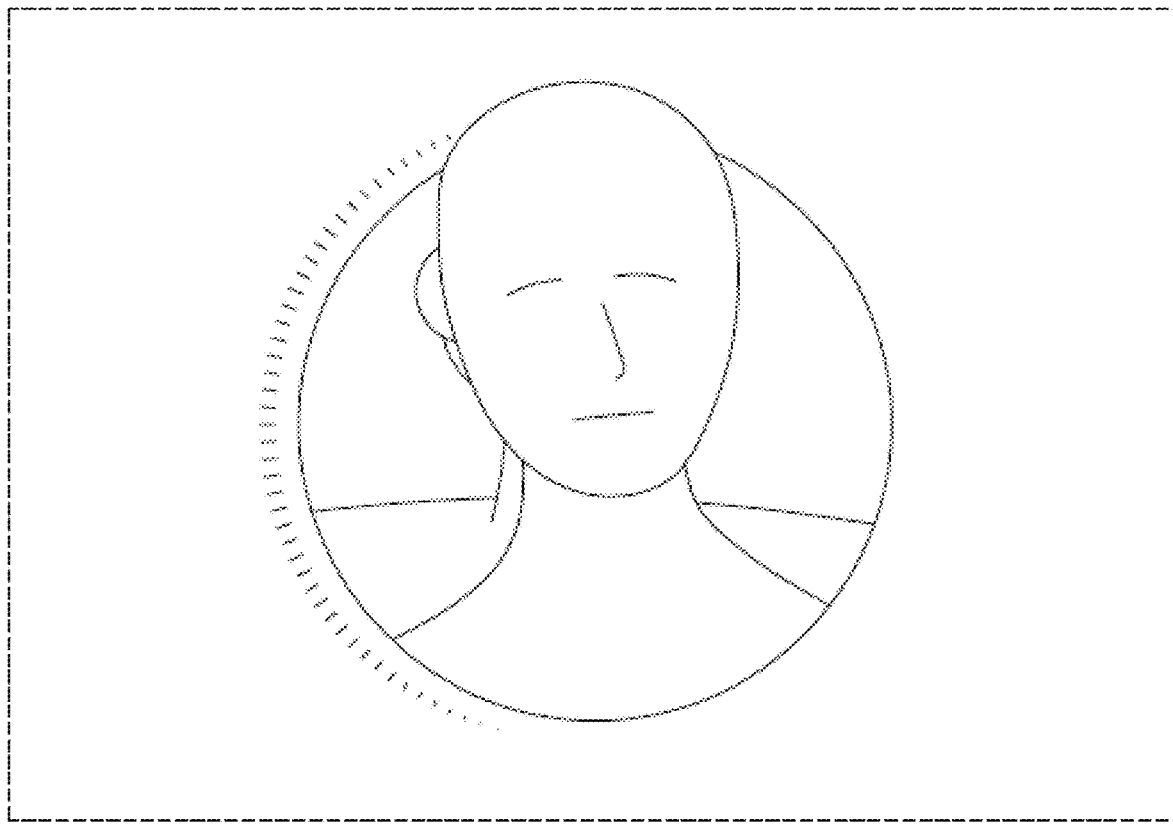

FIG. 23 illustrates a flowchart for an example method for rendering a focus indicator in a 3D scene. The process 2300 may be performed by one or more components of the wearable system 200 such as e.g., the remote processing module 270, the local processing and data module 260, a graphics processor (GPU), or another processor, alone or in combination. The display 220 of the wearable system 200 can present a scene to the user and the system can obtain user input data such as eye pose data from the inward-facing imaging system 462 or head pose data from IMUs, accelerometers, or gyroscopes or user input data for moving the cursor/cursor or selecting objects from a user input device 466 such as the hand-held totem 1702.

At block 2302, the wearable system can determine the cursor's location within the user's environment. The system can obtain user input data such as eye pose data from the inward-facing imaging system 462, head pose data from IMUs, accelerometers, or gyroscopes, or data from a user input device such as the user input device 466 of FIG. 4 or the totem 1702 of FIG. 17. Based at least in part on the user input data, the system can determine the cursor's location within the environment. In some cases, in addition to determining the cursor's location within the environment, the system can also render the cursor 1202 or other on-screen visual aid that corresponds to the cursor's location within the environment.

At block 2304, the system can determine a spatial relationship between the cursor's location within the environment and one or more objects in the user's field of view (or field of regard). In some cases, the system can determine one or more features of the objects, such as a location, a shape, an orientation, or a size of the one or more objects. Based at least in part on the one or more object features and the cursor's location within the environment determined at block 2302, the system can determine a spatial relationship between the cursor's location within the environment and any portion of the object. The spatial relationship can include relative location information, e.g., how far a portion of an object is from the cursor's location within the environment or a relative orientation between the cursor and the portion of the object (e.g., whether the cursor is above, below, to the left, to the right of the object. The system can determine whether the cursor's location within the environment overlaps with an object or is behind the object or can determine a distance between the cursor's location within the environment and a portion of the object (e.g., a closest portion of the object, a center of the object, etc.). In some cases, the system can determine which object(s) are closest to the cursor's location within the environment.

In some implementations, virtual objects in the environment can be represented by a 2D shape sitting on a 3D world selection plane. The system can cast a ray against that 3D world selection plane to determine the proximity of the cursor's location within the environment relative to any given object. The spatial relationship can include the distance between the cursor and the object (or portion of the object) and a relative orientation of the cursor and the object.

At block 2306, the system can assign a focus indicator to at least a portion of one or more objects based at least in part on the determined spatial relationship(s). For example, the system can render the focus indicator using the techniques described with reference to FIGS. 16A-16D. Also, as described with reference to FIG. 12B and FIGS. 18A-18C, if the determined spatial relationship provides that the cursor overlaps or is behind the object, the system can render the object in front of the cursor so that the cursor does not occlude the object.

The process 2300 is intended to be illustrative and not limiting. The various blocks described herein can be implemented in a variety of orders, and that the wearable system can implement one or more of the blocks concurrently or change the order, as desired. Fewer, more, or different blocks can be used as part of the process 2300. For example, the process 2300 can include blocks for displaying a cursor or performing other user interface actions.

Examples of a Portion of a Display with an Icon or a Graphical User Interface

Figure 28:
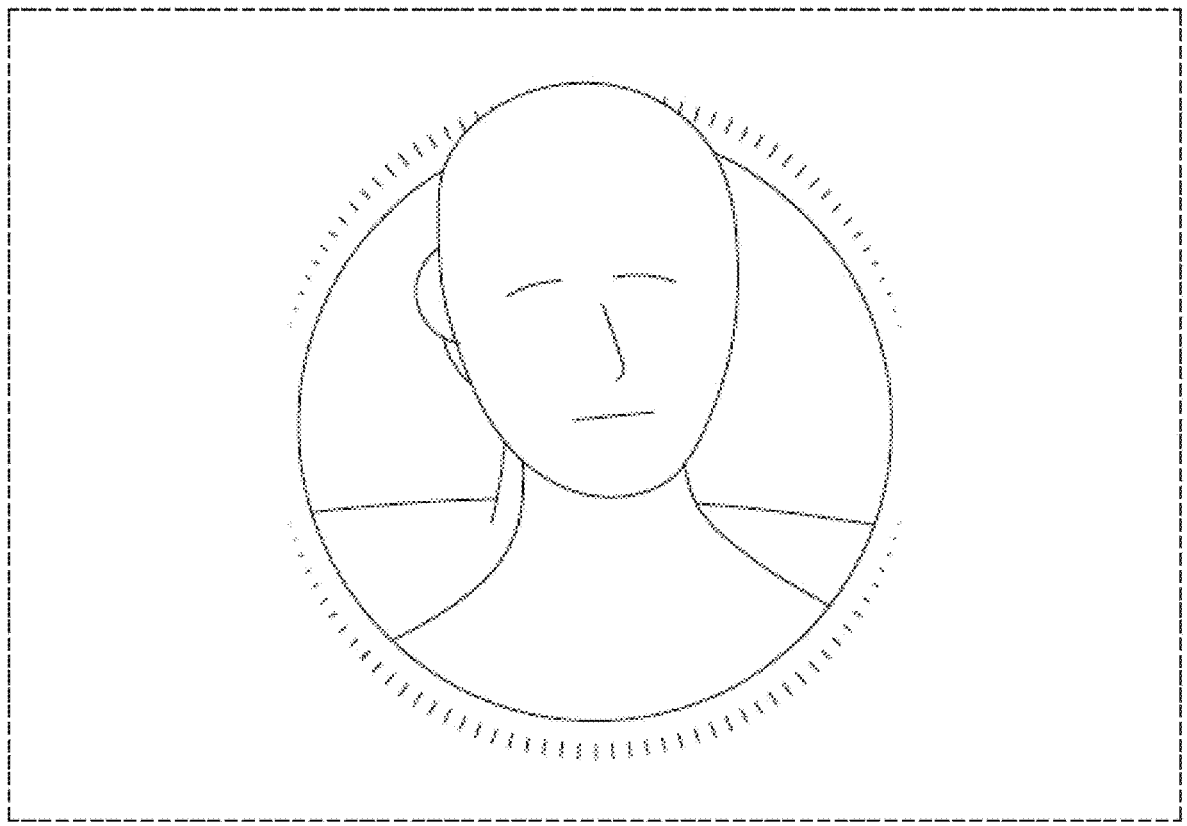

FIGS. 24-28 are front views of examples of a portion of a display screen with an icon. In these examples, the icon comprises a stylized representation of a head that is mostly within a circle. FIGS. 24-28 show examples a focus indicator at least partially surrounding the icon. The focus indicator is represented as short lines that appear to radiate outward from the icon. In these examples, relative to the icon, the focus indicator is generally below (FIG. 24), substantially surrounding (with greater extent below the icon in FIG. 25), on the right (FIG. 26), on the left (FIG. 27), and above and below (FIG. 28).

Figure 29A:
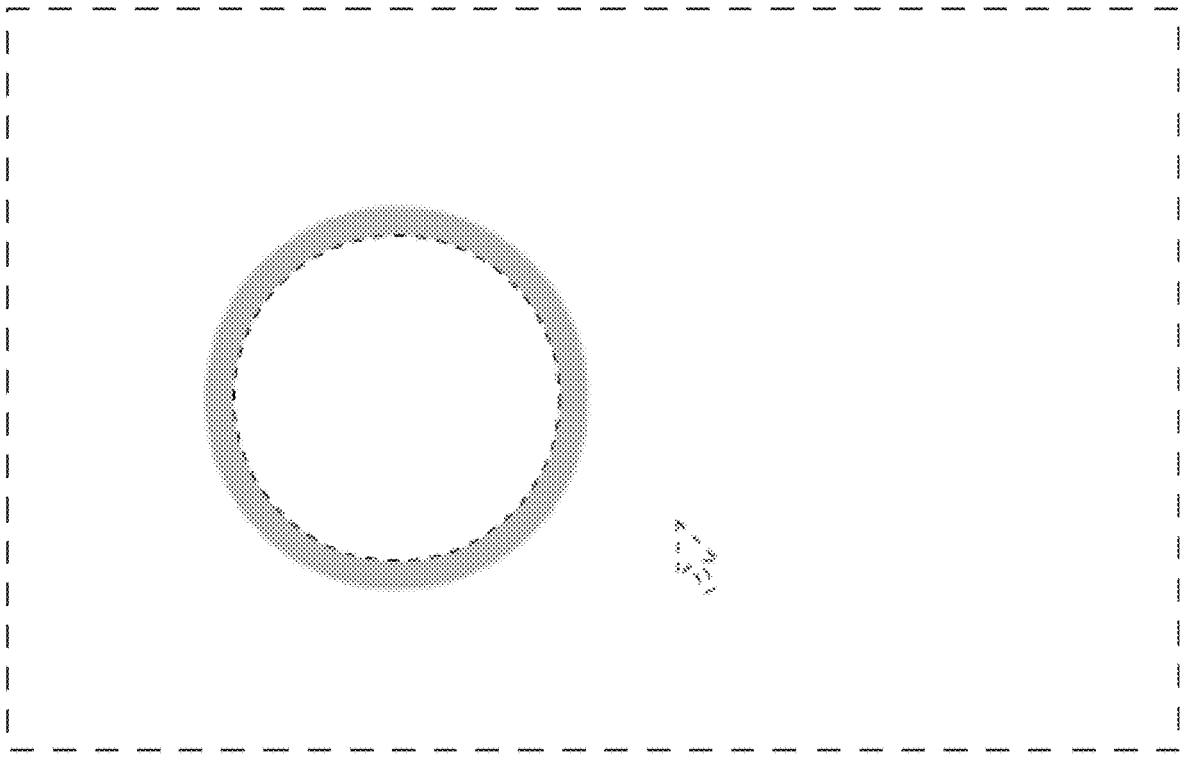
FIGS. 29A-29F are front views of an embodiment of a transitional sequence for a graphical user interface (GUI) on a display screen or a portion thereof.
Figure 29B:
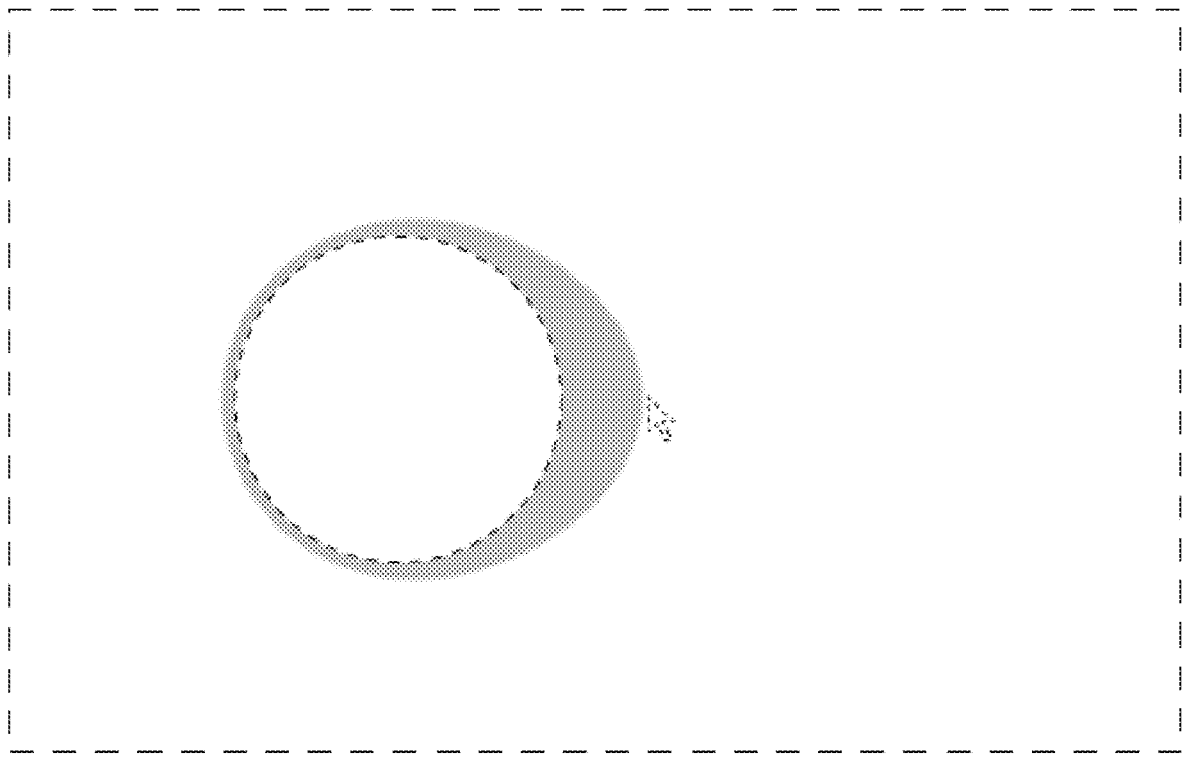
Figure 29C:
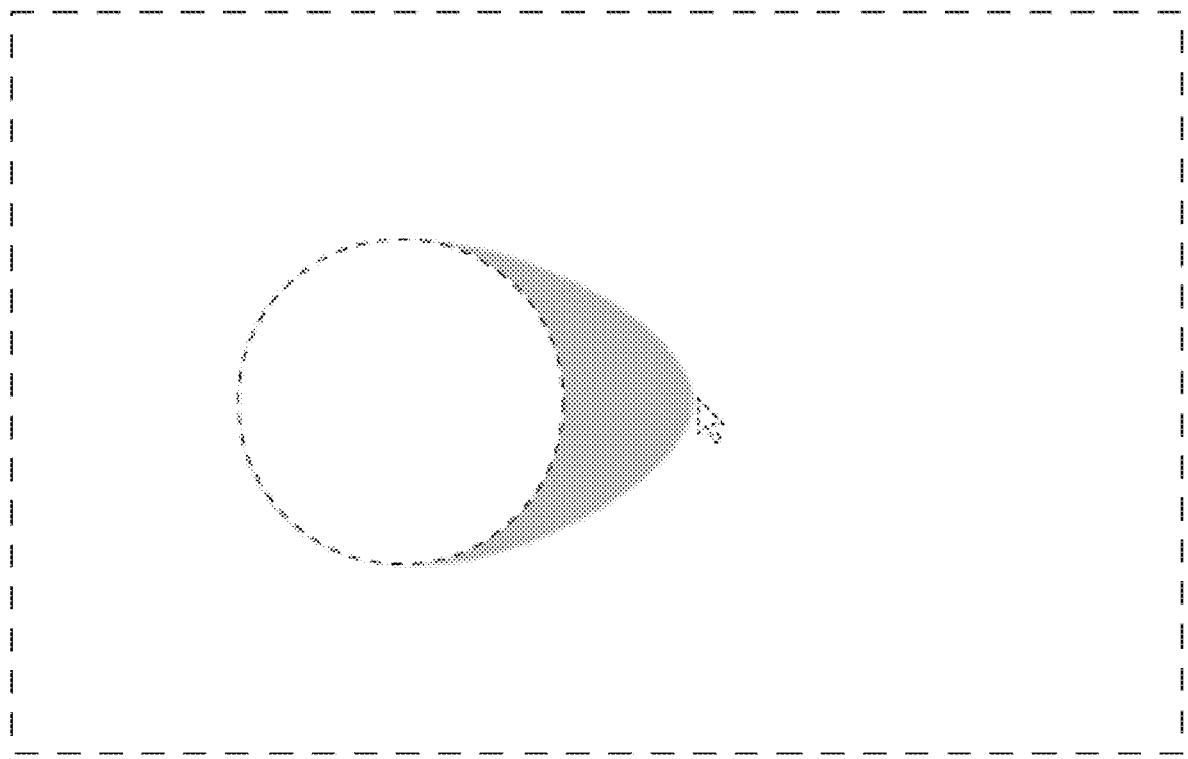
Figure 29D:
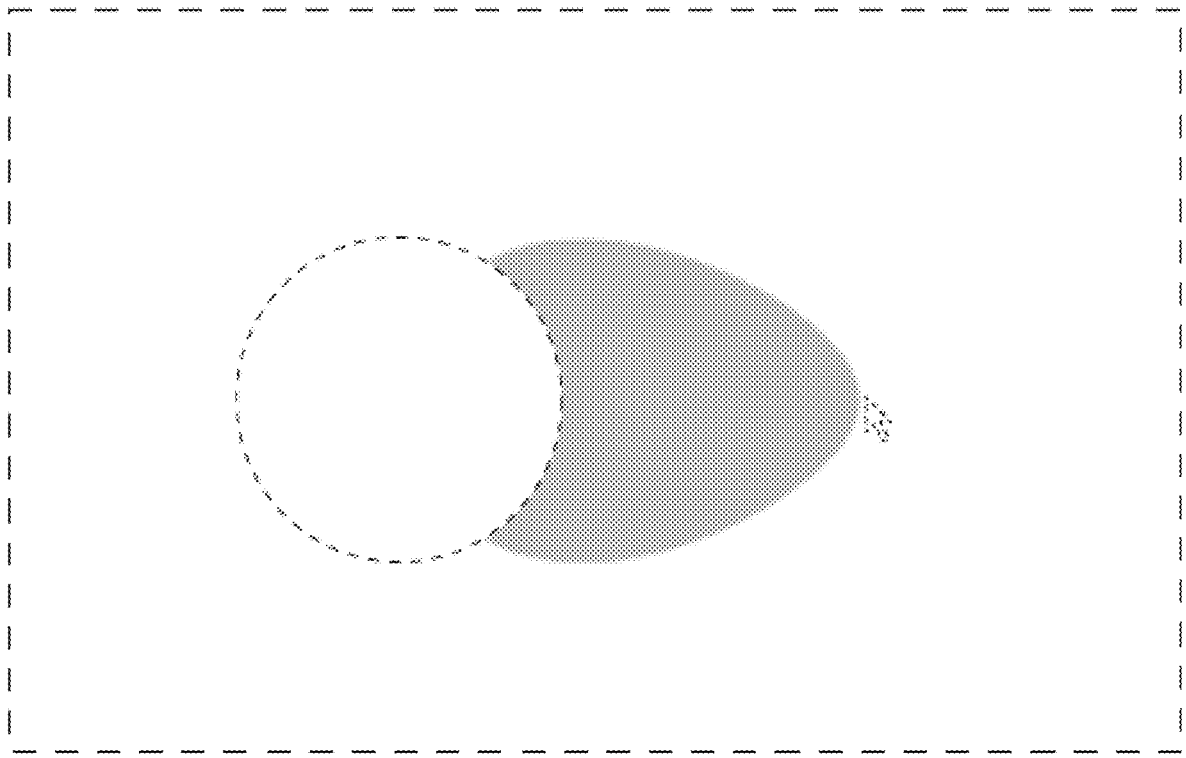
Figure 29E:
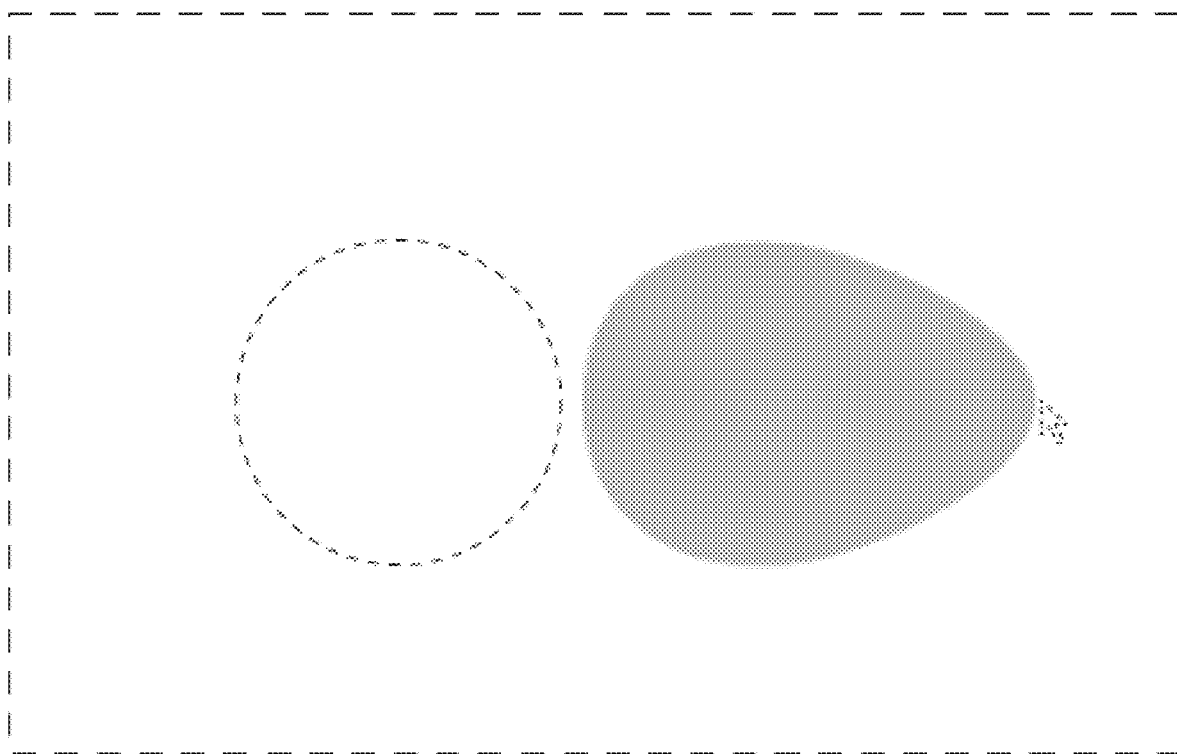
Figure 29F:
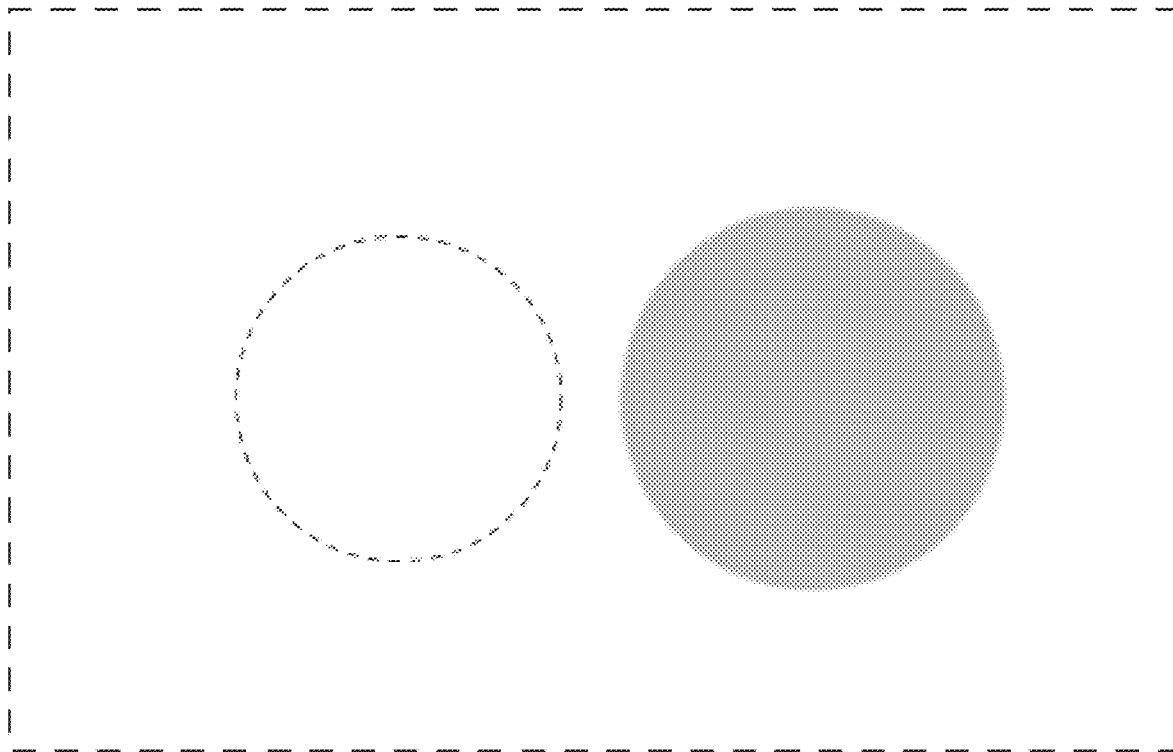

FIGS. 29A-29F are front views of an embodiment of a graphical user interface for a display screen or a portion thereof. The appearance of the graphical user interface sequentially transitions between the images shown in FIGS. 29A-29F. No ornamental aspects are associated with the process or period in which one image transitions to another image. In these example figures, a virtual object (e.g., an icon) is represented by a dashed circle and in other embodiments could be a rectangle, polygon, or other shape. In FIG. 29A, a focus indicator is shown in greyscale as a circular annulus surrounding the icon. A cursor is shown in dashed lines. In the transitional image sequence which continues in FIGS. 29B-29F, as the cursor moves away from the icon, the focus indicator is pulled outward and away from the icon and toward the cursor, until it separates from the icon in FIG. 29E and then transitions to a circular shape in FIG. 29F. In FIG. 29F, the focus indicator is represented as a greyscale circle, and the cursor is not rendered by the display.

The designs shown in FIGS. 24-29F can be embodied by an augmented reality or mixed reality display, such as a head-mounted display. For example, the display can comprise the display 220 of the wearable system 200 described with reference to FIG. 2, or the display of the wearable system 400 described with reference to FIG. 4, or the display of the optical display system 600 described with reference to FIG. 6. The display or a portion thereof is represented by the outer rectangular dashed lines in FIGS. 24-29F. Neither the display nor the icon (or other graphical elements of the animated graphical user interface) are limited to the scale shown in FIGS. 24-29F. Broken lines showing the display form no part of the design.

Accordingly, in various aspects, the disclosure provides the ornamental design for a display screen or a portion thereof with an icon or with a transitional (or animated) graphical user interface, as shown and described.

Examples of a Portion of a Display with an Icon or a Graphical User Interface

FIGS. 30A-30F illustrate an embodiment of a transitional sequence for a GUI on a display screen or a portion thereof. The GUI can be rendered by any of the wearable displays described herein, such as, e.g., the wearable display systems 200, 400, 600 described with reference to FIGS. 2, 4, and 6. FIGS. 30A-30F show a GUI having a cursor 1202 that sequentially transitions from Point A to Point F along an illustrative path 3001 indicated by a dashed line. As illustrated, the GUI includes a plurality of icons 3002 presented in a grid layout. The GUI uses the cursor 1202 or a focus indicator 1302, as described herein, to show interactions between the cursor, icon, or focus indicator as the cursor moves (or hovers) behind an icon. The grid layout, icon shape (e.g., rectangular in these figures), and cursor path are intended to be illustrative and not limiting. The icons in the grid layout can be rendered at a single depth (e.g., to appear 2D) or at multiple depths (e.g., to appear 3D). The icons 3002 can be thumbnails. The grid layout need not be planar and can be rendered as curved (e.g., with some portions of the layout at closer depths than other portions).

Figure 30A:
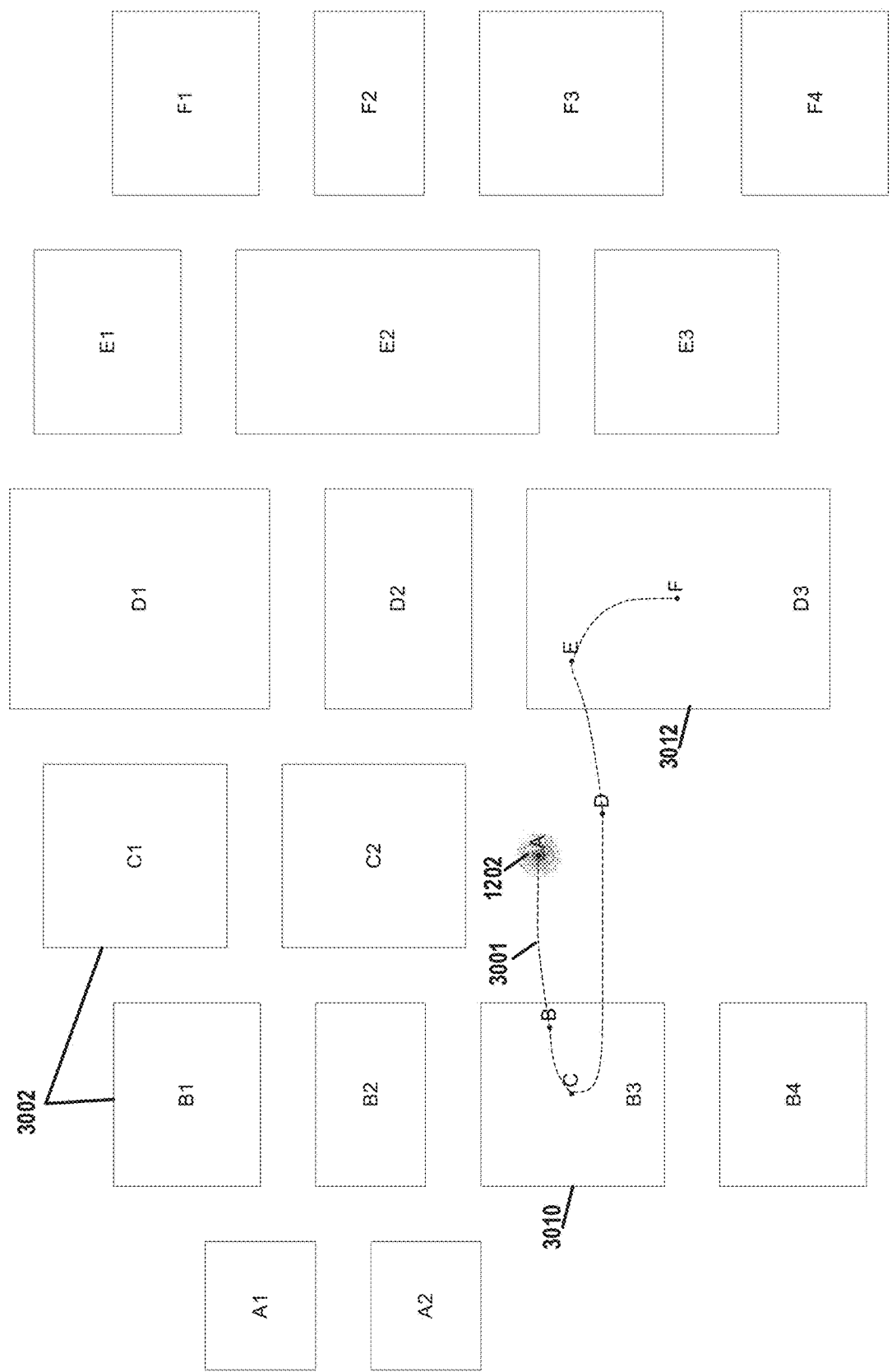

FIG. 30A illustrates an example of the interactions between icons 3002 and the cursor 1202 as the cursor 1202 is positioned at Point A. The icons 3002 can correspond to any type of interactable objects in the virtual environment of the user of the wearable system. Interactable objects include, without limitation, applications (e.g., apps), content folders, digital media such as, but not limited to, still images, videos, audio, music, albums, documents, or the like. As illustrated, at Point A the cursor 1202 is between icons 3010, 3012 (B3 and D3) within the grid layout. In other words, at Point A the cursor 1202 is not selecting any of icons 3002.

Figure 30B:
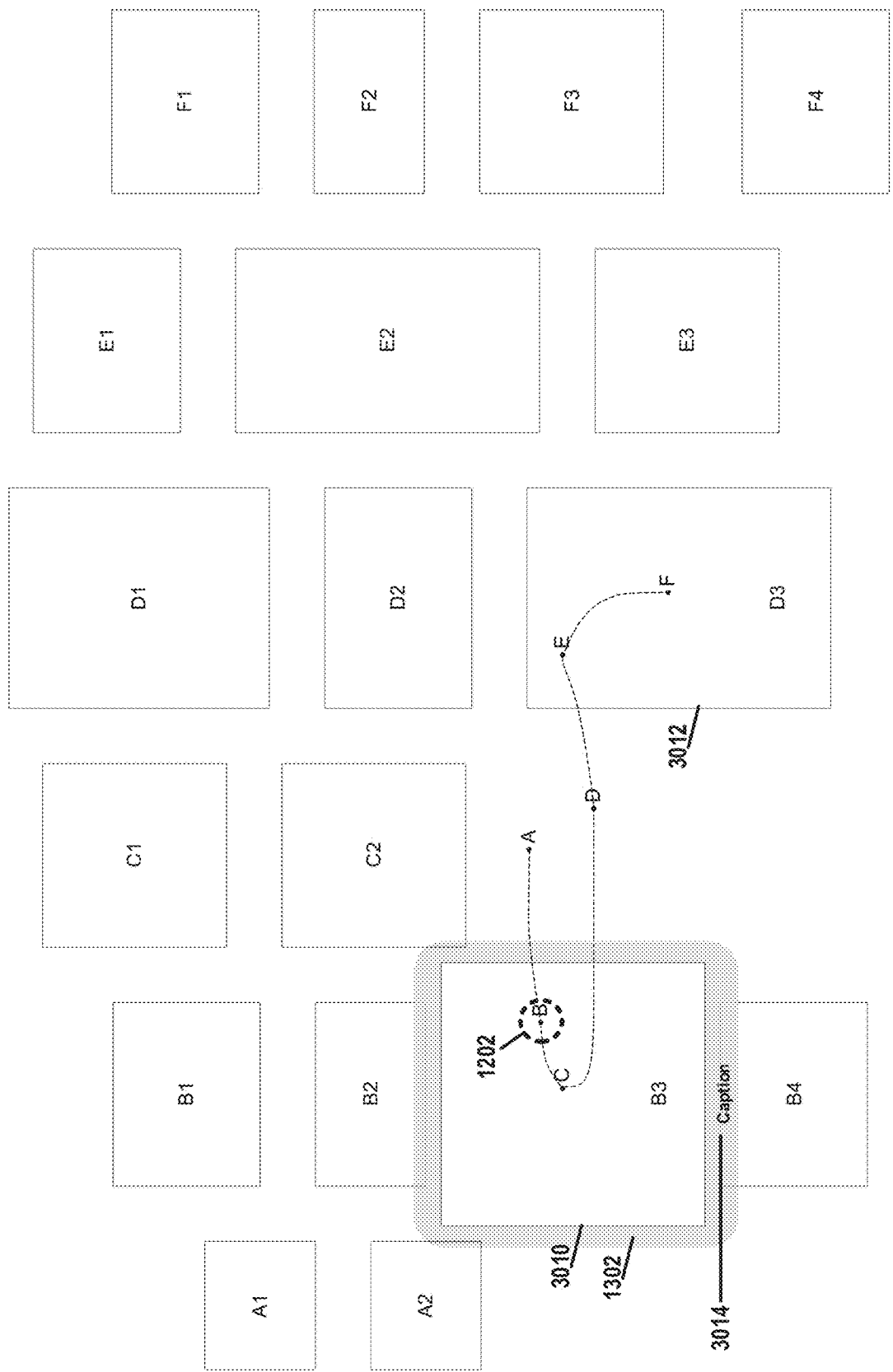

FIG. 30B illustrates an example of the interactions between icon 3010 (B3) and the focus indicator 1302 as the cursor 1202 moves (or hovers) behind the icon 3010 at Point B. As shown in this example, when the cursor 1202 moves behind the icon 3010, the GUI assigns a focus indicator 1302 that surrounds the icon 3010 to indicate that the icon 3010 has been hovered under by the cursor. The focus indicator 1302 is shown in greyscale as a curved shape, which in this example, substantially surrounds the icon. The cursor 1202 is eclipsed by the icon 3010 in FIG. 30B. Although the cursor 1202 is shown in dashed lines, the dashed lines merely indicate the position of where the cursor 1202 would be, if rendered.

In some cases, the visual appearance of the selected icon 3010 can change to indicate that the icon has been selected by the user. For example, the user may select the icon 3010 by hovering the cursor 1202 under the icon 3010 for a period of time (e.g., a few seconds or more), user input from a totem (e.g., actuating a touch sensitive surface such as clicking or double-clicking), an eye, head, or body gesture, etc. For example, the wearable system may detect user selection of the icon based at least partly on eye gaze, e.g., an eye tracking camera detects the user fixating on the icon 3010 for longer than a threshold time (e.g., 1 s or more).

The visual appearance of the other icons in the layout (e.g., the icons that do not eclipse the cursor) can change to indicate that icon 3010 has been hovered under or selected. The icon 3010 or the other icons can change in size or shape as the cursor 1202 moves behind icon 3010. For example, the icon 3010 can grow larger or the icon foreground can expand such that the icon 3010 appears closer or larger to the user (e.g., at depths that are closer to the user than the depth of the background). Similarly, the un-selected icons can grow smaller or the foreground of the un-selected icons can reduce such that the icons appear further from or smaller to the user. Additional or alternative changes to size, shape, or visual appearance of the icons can be used. For example, the selected icon 3010 can grow smaller or the other icons 3002 grow larger when icon 3010 is hovered under or selected.

The selected icon 3010 or the other icons can change in clarity (including transparency), resolution, or the like as the cursor 1202 moves behind icon 3010. For example, when no icon is selected (e.g., such as illustrated in FIG. 30A), each of the icons 3002 may be presented at a first clarity or a first resolution. As the cursor 1202 moves behind the icon 3010, the clarity or resolution of the hovered under or selected icon can change, for example, to a second clarity or a second resolution. In some cases, the second clarity is clearer than the first clarity, and in some cases, the second resolution is higher resolution than the first resolution. Accordingly, as an icon 3010 is selected, the icon 3010 can become more in focus, higher resolution, or higher quality than the icon was pre-selection.

In addition or alternatively, as the cursor 1202 moves behind icon 3010, the clarity or resolution of the other icons (e.g., un-selected icons) can change, for example, to a third clarity or a third resolution. In some cases, the third clarity can be less clear than the first clarity or the third resolution can be lower resolution than the first resolution. Accordingly, when icon 3010 is selected, the other icons can appeared blurred, out of focus, low resolution, or low quality.

However, in some cases, the clarity or resolution of the selected icon can decrease when selected. Similarly, the clarity or resolution of the non-selected icons can increase when an icon is selected. Additional or alternative changes to clarity, resolution, or the like can be implemented.

In some cases, as the cursor 1202 moves behind icon 3010, additional detail can be shown for the selected icon 3010. For example, addition detail can include a caption 3014, which can include a title for an app or media. Similarly, additional detail can include a size (e.g., in bytes), a date created, a date modified, a location, a file type, a resolution, video detail (e.g., length of video, producer, actors, etc.), or other characteristics corresponding to the selected icon 3010.

In some cases, as the cursor 1202 moves behind icon 3010, one or more features of the selected icon 3010 can activate. For example, if the icon 3010 corresponds to a video, the selection of the icon 3010 can cause the video to begin to play. Similarly, selection of the icon 3010 can cause GUI to cycle through images, play an album, play a GIF, or the like.

FIG. 30C illustrates an example of the interactions between the icon 3010 and the focus indicator 1302 as the cursor 1202 transitions behind the icon 3010 to Point C, near the center of the icon 3010. In the illustrated embodiment, as the cursor 1202 moves towards the center of the icon 3010, the icon 3010 continues to grow larger (e.g., as compared to FIG. 30B) such that the icon 3010 appears even closer or larger to the user (e.g., at a closer depth). For example, the icon 3010 can grow in size such that at least a portion of the icon 3010 overlaps with one or more other icons. In examples such as these, the overlapped icons can become more transparent or blurry, or they can become partially covered by the selected icon 3010.

Figure 30D:
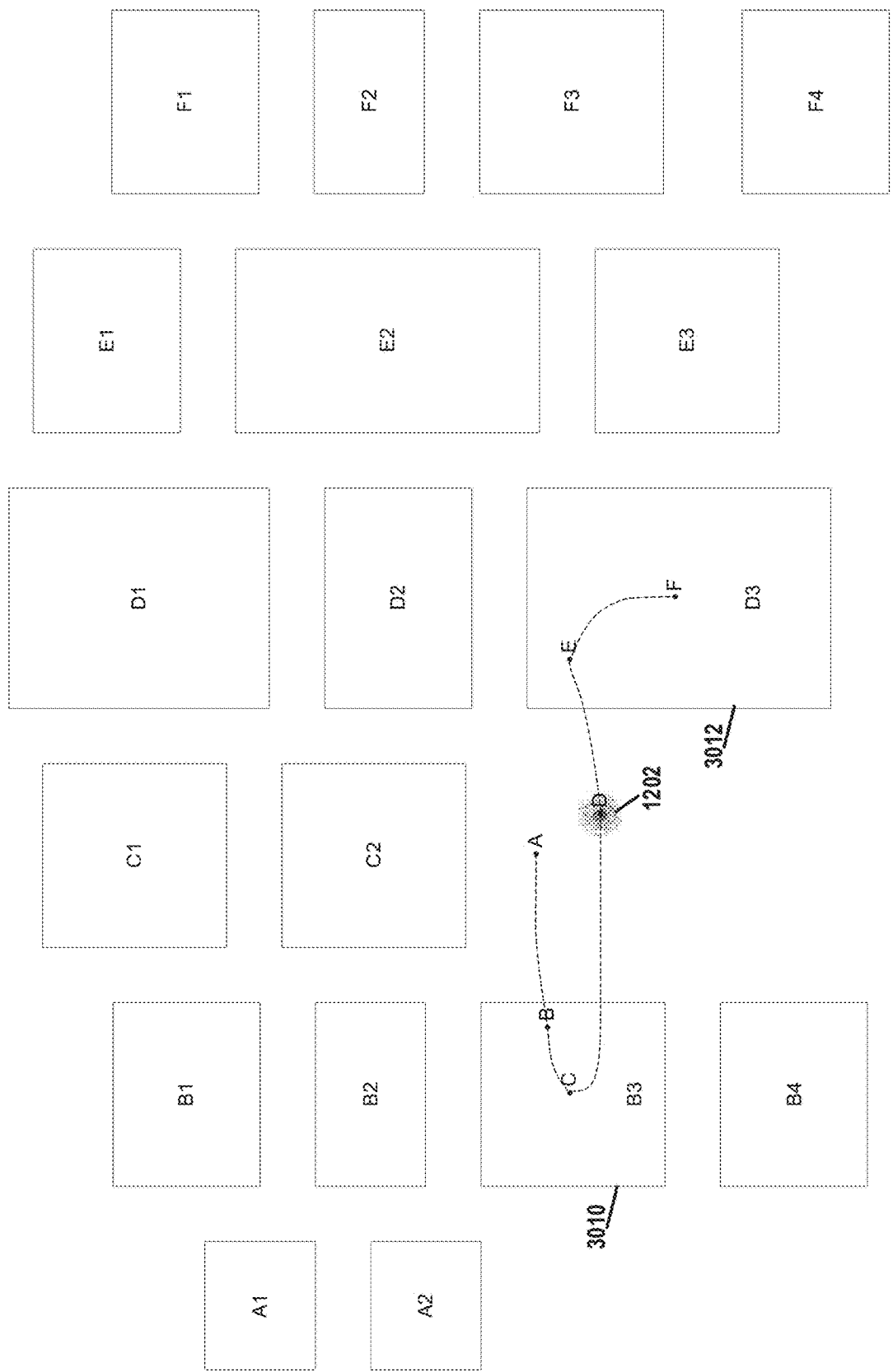

In addition or alternatively, as the cursor 1202 transitions to a more central location behind the icon 3010, the intensity of the focus indicator 1302 can change. For example, the focus indicator 1302 can become brighter or larger. Furthermore, the clarity, resolution, or the like of the selected icon 3010 or the other icons can continue to increase or decrease. By continuing to track the cursor (even after assigning a focus indicator) and modifying the intensity of the focus indicator or characteristics of the icons, the system can provide sustained input feedback and an accurate sense of cursor position to the user FIG. 30D illustrates an example of the interactions between icons 3010 and 3012 and the cursor 1202 as the cursor 1202 moves along the path from Point C (under the icon 3010) to Point D (between the icons 3010 and 3012). As illustrated, when the icon 3010 is no longer selected (or hovered under), the icon can return to its original size, shape, resolution, focus, clarity, or the like, as illustrated in FIG. 30A.

Figure 30E:
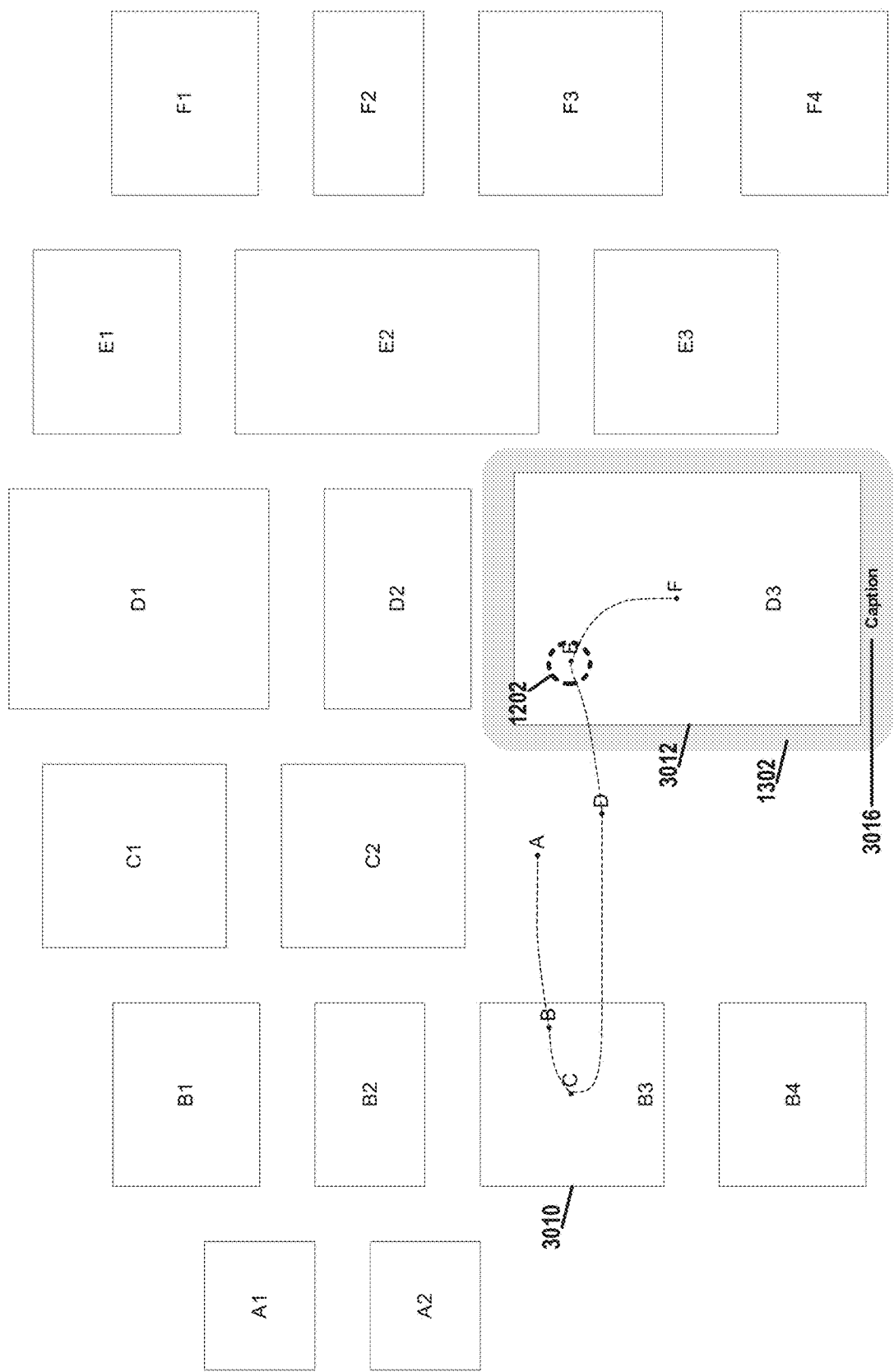

FIG. 30E illustrates an example of the interactions between icon 3012 and the focus indicator 1302 as the cursor 1202 moves (or hovers) behind the icon 3012 to Point E. As described herein with respect to FIG. 30B, when the cursor 1202 moves behind the icon 3012, the GUI can assign a focus indicator 1302 that surrounds the icon 3012 to indicate that the icon 3010 has been selected. The focus indicator can include a caption 3016.

Figure 30F:
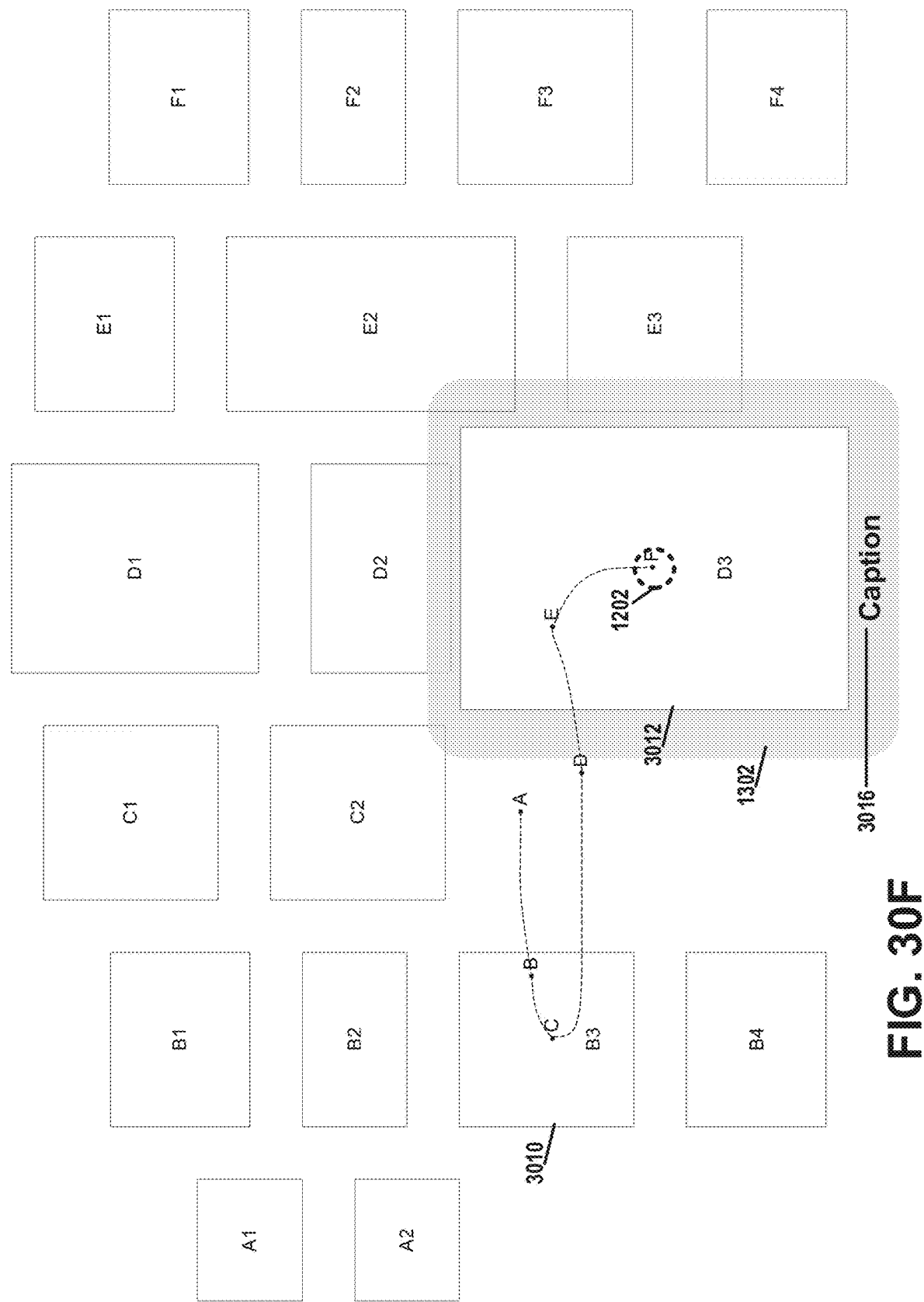

FIG. 30F illustrates an example of the interactions between icon 3010 and the focus indicator 1302 as the cursor 1202 transitions behind the icon 3012 to Point F. As described herein with respect to FIG. 30C, as the cursor 1202 moves towards the center of the icon 3012, the icon 3012 continues to grow larger (e.g., as compared to FIG. 30E) such that the icon 3012 appears even closer or larger to the user. For example, the icon 3010 can grow in size such that at least a portion of the icon 3012 overlaps with one or more other icons.

Similarly as described with reference to FIGS. 30A-30F, the GUI can continue to dynamically update the icons, the cursor, or the focus indicator as the cursor continues to move along an extension of the path 3001 or along a different path among the icons in the grid layout.

Examples of Scrolling of Data in a Graphical User Interface

Figure 31A:
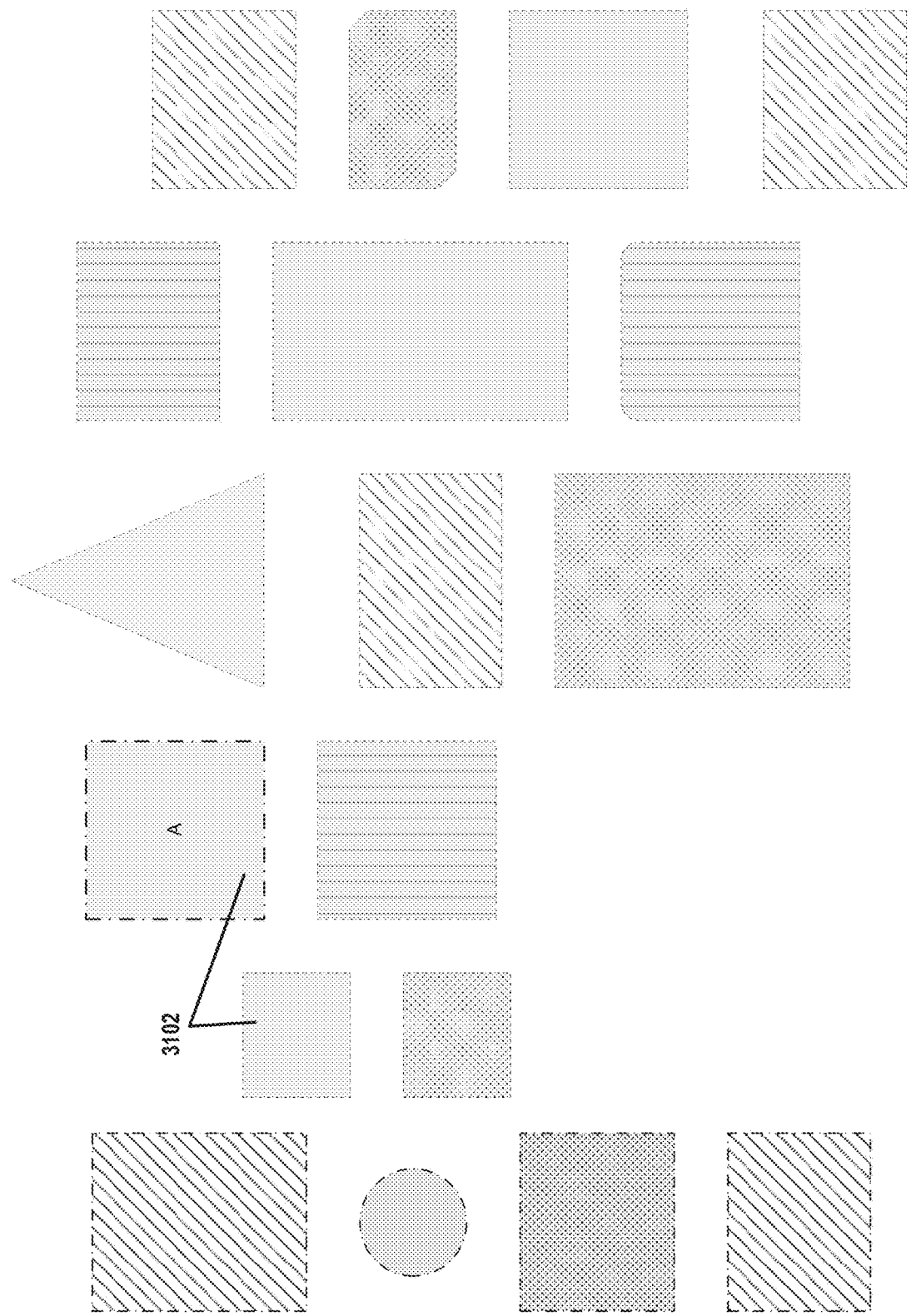
FIGS. 31A-31C illustrate an embodiment of a transitional sequence for a GUI on a display screen or a portion thereof.
Figure 31B:
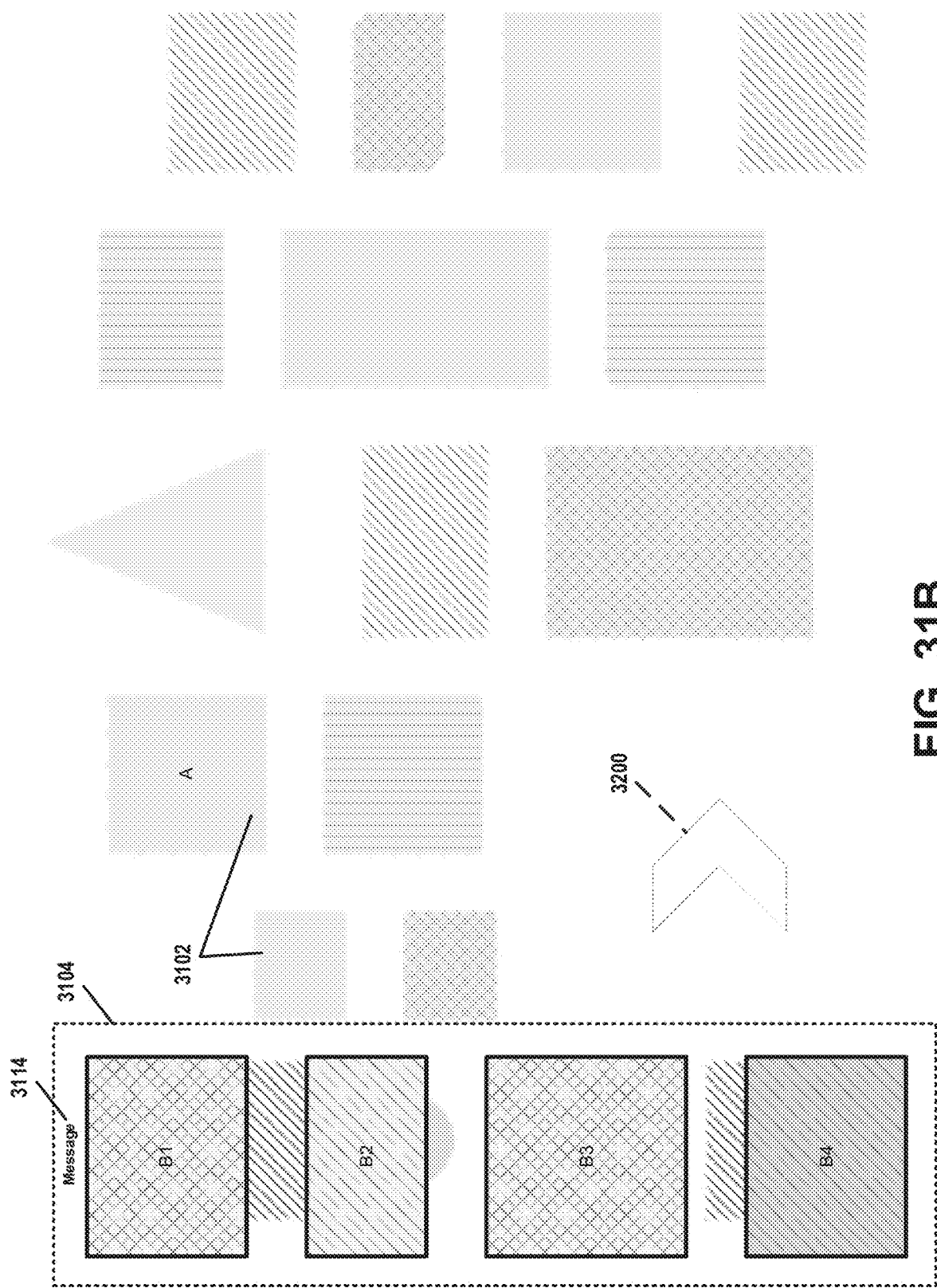
Figure 31C:
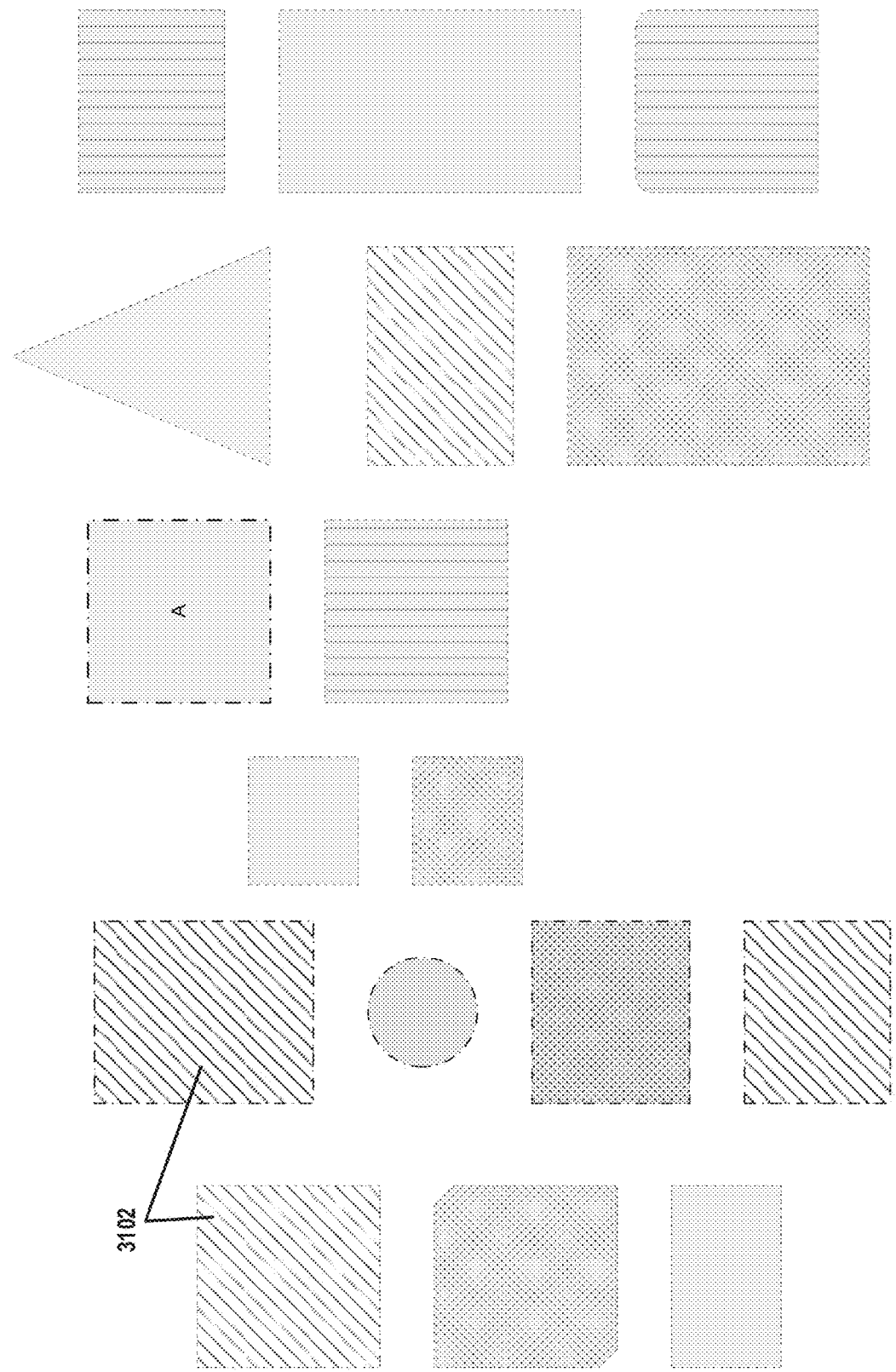

FIGS. 31A-31C illustrate an embodiment of a scrolling sequence of a GUI on a display screen or a portion thereof. The GUI can be rendered by any of the wearable displays described herein, such as, e.g., the wearable display systems

200, 400, 600 described with reference to FIGS. 2, 4, and 6. Scrolling of text, graphics, or other content in the GUI advantageously allows users to move large distances to navigate the content. In the illustrated examples, the GUI includes a plurality of icons 3102 arranged in a grid layout and further illustrates scrolling of the icons 3102 of the grid. The grid layout and icon shape (e.g., generally rectangular or triangular in these figures) are intended to be illustrative and not limiting. The icons in the grid layout can be rendered at a single depth or at multiple depths. The scrolling sequence depicted in FIGS. 31A-31C and the eclipse cursor features depicted in FIGS. 30A-30F can be used separately or together. For example, when the scrolling stops, the user can move the cursor to one of the icons in the grid layout, and the GUI can illustrate this cursor movement and hovering or selecting an icon as described with reference to FIGS. 30A-30F.

FIG. 31A illustrates the plurality of arranged icons 3012 in the GUI. As described with respect to FIGS. 30A-30F, the icons 3102 can correspond to virtual content such as, e.g., apps or digital media. Although the icons 3102 are arranged in a grid, the icons 3012 can be presented on the GUI in various ways. For example, the positioning of the icons 3012 can be selected or controlled by a user or the icons 3012 can be arranged automatically according to one or more grouping criteria (e.g., alphabetically by item name, by content type, by date, by frequency of use, etc.). The icons in the grid layout can be rendered at a single depth (e.g., to appear 2D) or at multiple depths (e.g., to appear 3D). The icons 3002 can be thumbnails. The grid layout need not be planar and can be rendered as curved (e.g., with some portions of the layout at closer depths than other portions).

FIG. 31B illustrates an example of the GUI after a scrolling sequence has been initiated by the user (e.g., by actuating a totem, swiping across the layout, hovering the cursor near an edge of the grid or display, etc.). The user initiation can provide a scrolling direction or a scrolling speed. The scrolling sequence can mimic momentum of the scrolling content that causes scrolling speed to increase (from rest) such that the scrolling content is blurred, unreadable, or the like, while scrolling. The scrolling sequence can simulate drag so that the scrolling speed slows down and comes to a stop. The wearable system can accept additional user input to halt the scrolling (e.g., a further actuation of the totem or a stop gesture by a hand of the user).

While scrolling, the icons 3102 can move to a more distant depth, change their sizes (e.g., become smaller), or be displayed with less clarity (e.g., with greater transparency) or less resolution. For example, FIG. 3B schematically depicts the icons 3102 as less sharp (compared to FIG. 3A or 3C). To assist the user in seeing what icons are coming up next, as the icons 3102 scroll, the GUI can display a content panel 3104 that corresponds to the scrolling icons. In this example, the icons 3102 scroll horizontally to the right (as shown by dashed arrow 3200, which may, but need not, be displayed to the user) so that new icons appear from the left (and disappear to the right). Thus, the content panel 3104 is displayed in the general location of from which new icons appear (e.g., on the left side of the display in this example). In other examples, the icons 3102 can scroll in any direction (e.g., left to right, right to left, down to up, up to down, diagonally, etc.). Since the wearable system can display content at multiple depths, the content can scroll from foreground (e.g., closer depths) to background (e.g., more distant depths) or from background to foreground. Any combination of these scrolling techniques can be used.

The content panel 3104 can include information regarding the scrolling content. For example, the icons 3102 can be part of a library, and the content panel 3104 can include favorites, recently used, or most used icons in the library. In some cases, the library can be grouped or sorted by a grouping criterion, such as by date created, date modified, a name, icon type (e.g., image, video, GIF, album, app, document, etc.), size, or the like. As the content scrolls by, the content panel 3104 can correspond to the particular group or class that corresponds to the content scrolling behind the content panel 3104. As the icons 3102 continue to scroll, the content panel 3104 can be periodically updated with new information that represents the passing content. FIG. 31B shows an instant where the content panel 3104 comprises icons B1-B4.

As a non-limiting example, the icons 3102 can be sorted by date. As the content scrolls, the content panel 3104 is periodically updated with new information that represents the passing dates. For example, if the scrolling icons 3102 include an October date, the content panel can include information regarding October. For instance, a message 3114 can include an abbreviation "OCT", and the content panel 3104 can include favorite icons from October, recently used icons from October, the most used icons from October, or the like. As the content continues to scroll to the next month (e.g., November), the content panel 3104 can update to include information that represents November (e.g., the abbreviation can change to "NOV", and the panel can show favorite icons from November, recently used icons from November, the most used icons from November, or the like). The content panel 3104 can continue to update as additional dates pass.

The content panel 3104 can be anchored at a location on the GUI, while content scrolls off-screen (and the same content can return when the user reverse scrolls). In the illustrated embodiments, the content panel 3104 is anchored on the left hand side of the GUI. However, the content panel 3104 can be located anywhere within the GUI, such as the center, bottom, top, or right hand side. In some cases, the location of the content panel 3104 is configurable by the user.

The content panel 3104 can be presented in various ways. For example, the size of the content bar can vary, for instance, based at least partly on the scrolling speed. A faster scrolling speed can cause the content bar to display at a first size, while slower scrolling can cause the content bar to display at a second size (e.g., smaller than the first size). Further, the shape of the content panel 3104 can vary. In the illustrated embodiment, the content panel 3104 includes a vertical list. However, the list can be vertical, horizontal, diagonal, square, or the like, In addition or alternatively, the content panel 3104 may not include a list, by instead can include a single object, an icon, an image, text, or the like. The content panel 3104 can be displayed at a different depth or depths than the grid layout. For example, it may be displayed in front of the grid layout (e.g., as shown in FIG. 31B), behind the layout, and so forth. In some cases, the characteristics of the content panel 3104 are configurable by the user.

The content panel 3104 can include detail (e.g., a message 3114) that can correspond to the content presented in the content panel. For example, the detail can include a caption, a title, or other characteristics corresponding to the scrolling content. For example, referring back to the example, where the icons are sorted by date, the message 3114 could include the date abbreviation (e.g., "OCT").

As the scrolling sequence ends, the icons 3102 can come to a stop and the content panel 3104 can disappear. For example, FIG. 31C illustrates an example of the icons 3102 after the scrolling sequence has ended. In contrast to FIG. 31B, the icons 3102 are in focus and are illustrated as having shifted slightly compared to FIG. 31A. Similar techniques can be used for other types of scrolling such as vertical or diagonal scrolling.

In some implementations, the GUI can utilize edge scrolling, in which scrolling begins when a user hovers the cursor near an edge of the grid (or of the display). The GUI can maintain user behavior history data so that the next time the user opens or accesses the grid layout, the GUI displays the cursor on the most recent icon added to the layout (e.g., the most recent music album or video the user has added) or the most recently accessed icon.

Example Software Code

Appendix A includes an example of code in the C# programming language that can be used to perform an embodiment of the eclipse cursor technology described herein. An embodiment of the process 2300 can be implemented at least in part by the example code in Appendix A. Appendix A also includes description of the software code. The disclosure of Appendix A is intended to illustrate an example implementation of various features of the eclipse cursor technology and is not intended to limit the scope of the technology. Appendix A is hereby incorporated by reference herein in its entirety so as to form a part of this specification.

Additional Aspects

In a first aspect, a wearable display system comprises a display configured to be positioned in front of an eye of a user, the display configured to project virtual content toward the eye of the user; a user input device configured to receive user input data associated with movement of a virtual cursor; and a hardware processor in communication with the display and the user input device, the hardware processor programmed to: identify a location of the virtual cursor in an environment of the user; determine a spatial relationship between the virtual cursor and an object in the environment of the user; and direct the display to render a focus indicator associated with the object based at least partly on the spatial relationship.

In a second aspect, the wearable display system of aspect 1, wherein the user input device comprises one or more of: a handheld totem comprising a touch sensitive surface, an outward-facing imaging system configured to detect a user gesture, an inward-facing imaging system configured to detect an eye pose of the user, or an inertial measurement unit configured to detect a head pose of the user.

In a third aspect, the wearable display system of aspect 1 or aspect 2, wherein to determine the spatial relationship between the virtual cursor and the object, the hardware processor is programmed to: determine a distance between the location of the virtual cursor and a portion of the object; or determine a relative orientation between the virtual cursor and the object; and direct the display to render the focus indicator based at least partly on the determined distance or the determined orientation.

In a fourth aspect, the wearable display system of any one of aspects 1-3, wherein the focus indicator comprises one or more of: a glow or a halo at least partially surrounding the object, a size or depth change of the object, or graphical highlighting.

In a fifth aspect, the wearable display system of any one of aspects 1-4, wherein to direct the display to render a focus indicator, the hardware processor is programmed to: perform a first render pass to render a cursor glow to a first buffer, a location of the cursor glow based at least partly on the location of the virtual cursor; perform a second render pass to render a shape mask representation of the object to a second buffer; perform a third render pass to render a glow mask associated with the object to a third buffer; and perform a fourth render pass configured to combine at least the first buffer, the second buffer, and the third buffer for presentation to the user.

In a sixth aspect, the wearable display system of aspect 5, wherein to perform the fourth render pass, the hardware processor is programmed to combine at least the first buffer, the second buffer, and the third buffer with a fourth buffer comprising virtual scene content.

In a seventh aspect, the wearable display system of any one of aspects 1-6, wherein the hardware processor is further programmed to: determine a distance between the location of the virtual cursor and the object; and update the location of the virtual cursor to be a location representative of the object if the distance is below a threshold distance.

In an eighth aspect, the wearable display system of any one of aspects 1-7, wherein the hardware processor is programmed to: determine an orientation between the location of the virtual cursor and the object; and direct the display to render the focus indicator preferentially toward the orientation of the virtual cursor.

In a ninth aspect, the wearable display system of any one of aspects 1-8, wherein the hardware processor is programmed to: update a location of the virtual cursor based at least partly on an earlier motion path of the virtual cursor.

In a 10th aspect, the wearable display system of aspect 9, wherein the hardware processor is programmed to update the location of the virtual cursor based at least partly on the earlier motion path in response to a cessation of user input from the user input device.

In an 11th aspect, the wearable display system of any one of aspects 1-10, wherein the hardware processor is programmed to: determine a distance between the location of the virtual cursor and a portion of the object; and in response to determining the distance is less than a threshold: render the object in front of the virtual cursor; or cease rendering the virtual cursor.

In a 12th aspect, a method of rendering a cursor relative to an object in a mixed reality environment, the method comprising: under control of a mixed reality display device comprising a display and a hardware processor: determining a location of the cursor in the mixed reality environment; determining a location associated with the object; determining whether an overlap occurs between the object and the cursor; in response to determining that the overlap does not occur, rendering the cursor; and in response to determining that the overlap does occur, rendering the object in front of the cursor, or ceasing rendering of the cursor.

In a 13th aspect, the method of aspect 12, wherein determining whether an overlap occurs between the object and the cursor comprises determining whether a distance between the location of the cursor and the location of the object is below a distance threshold.

In a 14th aspect, the method of aspect and 12 or aspect of 13, wherein in response to determining that the overlap does occur, the method further comprises rendering a focus indicator associated with the object.

In a 15th aspect, the method of aspect 14, wherein the focus indicator comprises one or more of: a glow or a halo at least partially surrounding the object, a size or depth change of the object, or graphical highlighting.

In a 16th aspect, the method of any one of aspects 12-15, further comprising: determining a spatial relationship between the cursor and the object; and rendering a focus indicator associated with the object based at least partly on the spatial relationship.

In a 17th aspect, an augmented reality display system comprising: a user input device configured to receive user input related to a position of a cursor in an environment of the user; a display through which a user can perceive virtual objects in the environment of the user; a hardware processor in communication with the user input device and the display, the hardware processor programmed to: cause a virtual object to be rendered via the display; track, based at least in part on the user input, a position of the cursor in the environment; identify a position of the virtual object; determine whether a first distance between the virtual object and the position of the cursor satisfies a distance threshold; in response to a determination that the first distance satisfies the distance threshold, cause a focus indicator proximate the object to be rendered via the display.

In an 18th aspect, the system of aspect 17, wherein in response to a determination that the first distance does not satisfy the distance threshold, the hardware processor is further programmed to cause a reticle indicating the position of the cursor to be rendered via the display.

In a 19th aspect, the system of aspect 17 or aspect 18, wherein the virtual object comprises a selectable object such that in response to a user input selecting the object, the hardware processor performs an action associated with the selectable object.

In a 20th aspect, the system of any one of aspects 17-19, wherein the first distance satisfies the distance threshold when the position of the cursor overlaps with the at least a portion of the virtual object.

In a 21st aspect, the system of any one of aspects 17-20, wherein the first distance satisfies the distance threshold when the position of the cursor and at least a portion of the virtual object would be mapped to a same pixel on the display.

In a 22nd aspect, the system of any one of aspects 17-21, wherein the first distance satisfies the distance threshold when the position of the cursor and at least a portion of the virtual object would be co-located when rendered on the display.

In a 23rd aspect, the system of any one of aspects 17-22, wherein the virtual object is a first object, wherein the focus indicator is a first focus indicator, and wherein the hardware processor is further programmed to: cause a second virtual object to be rendered via the display; identify a position of the second object; determine whether a distance between the second object and the position of the cursor satisfies a second distance threshold, in response to a determination that the distance between the second object and the position of the cursor satisfies the second distance threshold, cause a second focus indicator proximate the second virtual object to be rendered via the display.

In a 24th aspect, the system of aspect 23, wherein the hardware processor is programmed to: in response to a determination that the distance between the first virtual object and the cursor is less than the distance between the second virtual object and the cursor: cause the first focus indicator to be rendered more prominently than the second focus indicator.

In a 25th aspect, the system of aspect of 24, wherein to cause the first focus indicator to be rendered more prominently than the second focus indicator, the hardware processor is programmed to perform one or more of the following: cause the first focus indicator to be rendered brighter than the second focus indicator; cause the first focus indicator to be rendered larger than the second focus indicator; or cause the first focus indicator to be rendered more prominently in a direction toward the cursor than in a direction away from the cursor.

In a 26th aspect, the system of any one of aspects 17-25, wherein the hardware processor is programmed to: identify a shape of the virtual object; determine an orientation of the cursor relative to the virtual object; and cause the focus indicator to be rendered based at least partly on the shape of the virtual object and the orientation of the cursor relative to the virtual object.

In a 27th aspect, the system of aspect 26, wherein the hardware processor is programmed to cause the focus indicator to be rendered more prominently along a line between the cursor and the virtual object.

In a 28th aspect, an augmented reality display system comprising: a user input device configured to receive user input related to a position of a cursor in an environment of the user; a display through which a user can perceive virtual objects in the environment of the user; a hardware processor in communication with the user input device and the display, the hardware processor programmed to: cause a plurality of virtual objects to be rendered via the display; track a position of the cursor in a field of view of the display; identify positions of the plurality of virtual objects; compare the position of the cursor and the positions of the plurality of virtual objects to determine a closest object to the position of the cursor; cause a focus indicator to be rendered proximate the closest object via the display.

In a 29th aspect, the system of aspect 28, wherein the hardware processor is programmed to: cause a second focus indicator to be rendered proximate at least one other virtual object that is not the closest object, wherein the first focus indicator is rendered more prominently than the second focus indicator.

In a 30th aspect, the system of aspect 28 or aspect 29, wherein the hardware processor is programmed to: determine whether the position of the cursor overlaps with the closest object; and in response to a determination that the overlap does not occur, render the cursor; and in response to determining that the overlap does occur, render the closest object in front of the cursor, or cease rendering of the cursor.

In a 31st aspect, the system of any one of aspects 28-30, wherein the hardware processor is programmed to: accelerate the position of the cursor to the position of the closest object.

In a 32nd aspect, a method of rendering a graphical user interface for a mixed reality display device, the method comprising: under control of a mixed reality display device comprising a display and a hardware processor: determining a location of a cursor in a field of view of the display; rendering a focus indicator associated with an object in the field of view of the display; tracking a movement of the cursor relative to the object; and adjusting the rendering of the focus indicator based at least partly on the movement of the cursor relative to the object.

In a 33rd aspect, the method of aspect 32, wherein the focus indicator comprises one or more of: a glow or a halo at least partially surrounding the object, a size or depth change of the object, or graphical highlighting.

In a 34th aspect, the method of aspect 32 or aspect 33, further comprising rendering the cursor.

In a 35th aspect, the method of aspect 34, further comprising rendering the cursor less prominently or not at all if the cursor is located behind the object.

In a 36th aspect, the method of any one of aspects 32-35, wherein rendering the focus indicator comprises rendering at least a portion of the focus indicator more prominently in a direction toward the cursor than in a direction away from the cursor.

In a 37th aspect, the method of aspect 36, wherein rendering at least a portion of the focus indicator more prominently comprises one or more of: rendering the portion more brightly, rendering the portion larger, rendering the portion in a different color, or rendering the portion in a different graphical style.

In a 38th aspect, the method of any one of aspects 32-37, wherein adjusting the rendering of the focus indicator comprises simulating a visual appearance of an attraction between the focus indicator and the cursor.

In a 39th aspect, the method of any one of aspects 32-38, wherein adjusting the rendering of the focus indicator comprises emphasizing a visual appearance of a first portion of the focus indicator closer to the cursor compared to a visual appearance of a second portion of the focus indicator farther from the cursor.

In a 40th aspect, the method of any one of aspects 32-39, wherein adjusting the rendering of the focus indicator comprises simulating a visual appearance of the cursor pulling a portion of the focus indicator from the object and toward the cursor.

In a 41st aspect, a wearable display system comprising: a display configured to be positioned in front of an eye of a user, the display configured to project virtual content toward an eye of the user; a user input device configured to receive user input data associated with movement of a virtual cursor in a virtual environment; and a hardware processor in communication with the display and the user input device, the hardware processor programmed to: direct the display to render a virtual icon at a first depth in a virtual environment; direct the display to render a virtual cursor at a second depth in the virtual environment; track movement of the virtual cursor in the virtual environment; determine whether an overlap occurs between the virtual cursor and the virtual icon; and in response to the determination of the overlap, direct the display to render the virtual icon at a third depth closer to the user than the first depth or the second depth.

In a 42nd aspect, the wearable display system of aspect 41, wherein the user input device comprises one or more of: a handheld totem comprising a touch sensitive surface, an outward-facing imaging system configured to detect a user gesture, an inward-facing imaging system configured to detect an eye pose of the user, or an inertial measurement unit configured to detect a head pose of the user.

In a 43rd aspect, the wearable display system of aspect 41 or aspect 42, wherein the first depth is the same as the second depth.

In a 44th aspect, the wearable display system of any one of aspects 41-43, wherein in further response to the determination of the overlap, the hardware processor is programmed to emphasize a visual appearance of virtual icon compared to a visual appearance of the virtual cursor.

In a 45th aspect, the wearable display system of aspect 44, wherein to emphasize the visual appearance of the virtual icon, the hardware processor is programmed to direct the display to: render the virtual icon larger than when rendered at the first depth; or render a focus indicator around at least a portion of the virtual icon; or render a caption associated with the virtual icon; or render the virtual icon with additional virtual content than when rendered at the first depth; or render the virtual icon with higher resolution or higher brightness than when rendered at the first depth; cease the rendering of the virtual cursor; or render the virtual cursor with a reduced brightness or with an increased transparency.

In a 46th aspect, the wearable display system of any one of aspects 41-45, wherein the hardware processor is further programmed to accept user input to select the virtual icon.

In a 47th aspect, the wearable display system of any one of aspects 41-46, wherein the hardware processor is further programmed to: track further movement of the virtual cursor in the virtual environment; determine whether the overlap between the virtual cursor and the virtual icon ceases to occur; and in response to the determination that the overlap ceases to occur, direct the display to render the virtual icon at the first depth.

In a 48th aspect, the wearable display system of aspect 47, wherein the hardware processor is programmed to: render the virtual icon with a visual appearance that is the same as a visual appearance of the virtual icon before the overlap; or render the virtual cursor with a visual appearance that is the same as a visual appearance of the virtual cursor before the overlap.

In a 49th aspect, the wearable display system of any one of aspects 41-48, wherein the hardware processor is programmed to: render a virtual layout comprising a plurality of virtual icons, wherein the plurality of virtual icons includes the virtual icon.

In a 50th aspect, the wearable display system of aspect 49, wherein the hardware processor is programmed to receive a user indication to scroll the virtual layout.

In a 51st aspect, the wearable display system of aspect 50, wherein the user indication comprises a scroll direction or a scroll speed.

In a 52nd aspect, the wearable display system of aspect 50 or aspect 51, wherein the user indication comprises a hover of the virtual cursor at an edge of the virtual layout.

In a 53rd aspect, the wearable display system of any one of aspects 50-52, wherein the hardware processor is programmed to direct the display to: scroll the virtual layout; and render a virtual content panel that comprises a representation of virtual icons that were not rendered prior to the scroll.

In a 54th aspect, the wearable display system of aspect 53, wherein the virtual content panel is rendered at a depth that is different from a depth at which at least a portion of the virtual layout is rendered.

In a 55th aspect, the wearable display system of any one of aspects 49-54, wherein the virtual layout comprises a regular grid or an irregular grid.

In a 56th aspect, the wearable display system of any one of aspects 41-55, wherein the virtual icon comprises a thumbnail of an application or a media file.

In a 57th aspect, the wearable display system of aspect 56, wherein the media file comprises a video file, an audio file, or a document file.

In a 58th aspect, a wearable display system comprising: a display configured to be positioned in front of an eye of a user, the display configured to project virtual content toward an eye of the user; a user input device configured to receive user input data associated with movement of a virtual cursor in a virtual environment; and a hardware processor in communication with the display and the user input device, the hardware processor programmed to: direct the display to render a virtual layout of a plurality of virtual icons, wherein at least some of the plurality of virtual icons in the virtual layout are rendered at a first depth in the virtual environment; receive a user indication to scroll the virtual layout; and in response to receipt of the user indication to scroll the virtual layout, direct the display to: render a virtual content panel that comprises a representation of virtual icons that were not rendered prior to the scroll, the virtual content panel rendered at a second depth in the virtual environment.

In a 59th aspect, the wearable display system of aspect 58, wherein the first depth is different from the second depth.

In a 60th aspect, the wearable display system of aspect 58 or aspect 59, wherein the user indication comprises a scroll direction or a scroll speed.

In a 61st aspect, the wearable display system of any one of aspects 58-60, wherein the user indication comprises a hover of the virtual cursor at an edge of the virtual layout.

In a 62nd aspect, the wearable display system of any one of aspects 58-61, wherein the virtual content panel comprises a message indicative of the content of the plurality of icons being scrolled.

In a 63rd aspect, the wearable display system of any one of aspects 58-62, wherein the representation of the virtual icons comprises thumbnails.

In a 64th aspect, the wearable display system of any one of aspects 58-63, wherein the scroll of the virtual layout is performed with a momentum or a drag.

In a 65th aspect, the wearable display system of any one of aspects 58-64, wherein the hardware processor is further programmed to: receive a user indication to halt the scroll of the virtual layout; and in response to receipt of the user indication to halt the scroll of the virtual layout, direct the display to: cease the scroll of the virtual layout; and cease the render of the virtual content panel.

Additional Considerations

Each of the processes, methods, and algorithms described herein or depicted in the attached figures may be embodied in, and fully or partially automated by, code modules executed by one or more physical computing systems, hardware computer processors, application-specific circuitry, or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without author input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A wearable display system comprising:
   a wearable display configured to be positioned in front of an eye of a user, the wearable display configured to project virtual content toward the eye of the user;
   a user input device configured to receive user input data associated with movement of a virtual cursor in a virtual environment; and
   a hardware processor in communication with the wearable display and the user input device, the hardware processor programmed to:
      direct the wearable display to render a plurality of virtual icons at a first depth in the virtual environment;
      identify a cursor location within the virtual environment, wherein the cursor location changes in response to the user input data received by the user input device;
      while the cursor location moves to a location that does not overlap with any of the plurality of virtual icons, direct the wearable display to render the virtual cursor at the cursor location and at a second depth in the virtual environment; and
      while the cursor location moves to a location positioned behind a particular virtual icon of the plurality of virtual icons, wherein the particular virtual icon comprises a representation of a media file, wherein the media file comprises a an audio file, inhibit the virtual cursor from obscuring the particular virtual icon by:
         directing the wearable display of the wearable display system, configured to project virtual content toward the eye of the user to:
            render the particular virtual icon without rendering the virtual cursor thereby inhibiting the virtual cursor from obscuring the particular virtual icon, wherein the particular virtual icon is rendered at a third depth in the virtual environment that is closer to the user than the first depth or the second depth so that the particular virtual icon is rendered to appear closer to the user than the virtual cursor had been when the cursor location did not overlap with any of the plurality of virtual icons, and wherein the particular virtual icon is not visually obscured, and
            render a focus indicator surrounding the particular virtual icon without directing the wearable display to render the virtual cursor.

2. The wearable display system of claim 1, wherein the user input device comprises one or more of: a handheld totem comprising a touch sensitive surface, an outward-facing imaging system configured to detect a user gesture, an inward-facing imaging system configured to detect an eye pose of the user, or an inertial measurement unit configured to detect a head pose of the user.

3. The wearable display system of claim 1, wherein the first depth is the second depth.

4. The wearable display system of claim 1, wherein the focus indicator emphasizes a visual appearance of the particular virtual icon.

5. The wearable display system of claim 4, wherein to emphasize the visual appearance of the particular virtual icon, the hardware processor is programmed to direct the wearable display to:
   render the particular virtual icon larger than when rendered at the first depth;
   render a focus indicator around at least a portion of the particular virtual icon;

render a caption associated with the particular virtual icon;

render the particular virtual icon with additional virtual content than when rendered at the first depth; or render the virtual particular icon with higher resolution or higher brightness than when rendered at the first depth.

6. The wearable display system of claim 1, wherein the hardware processor is further programmed to accept user input to select the particular virtual icon.

7. The wearable display system of claim 1, wherein the hardware processor is further programmed to:

in response to a determination that the cursor location is no longer behind the particular virtual icon, direct the wearable display to render the particular virtual icon at the first depth.

8. The wearable display system of claim 7, wherein the hardware processor is programmed to:

in response to the determination that the cursor location is no longer behind the particular virtual icon, render the virtual cursor at the cursor location.

9. The wearable display system of claim 1, wherein the hardware processor is programmed to:

render a virtual layout comprising the plurality of virtual icons.

10. The wearable display system of claim 9, wherein the hardware processor is programmed to receive a user indication to scroll the virtual layout.

11. The wearable display system of claim 10, wherein the user indication comprises a scroll direction or a scroll speed.

12. The wearable display system of claim 10, wherein the user indication comprises a hover of the cursor location at an edge of the virtual layout.

13. The wearable display system of claim 10, wherein the hardware processor is programmed to direct the wearable display to:

scroll the virtual layout; and render a virtual content panel that comprises a representation of virtual icons that were not rendered prior to the scroll.

14. The wearable display system of claim 13, wherein the virtual content panel is rendered at a depth that is different from a depth at which at least a portion of the virtual layout is rendered.

15. The wearable display system of claim 9, wherein the virtual layout comprises a regular grid or an irregular grid.

16. The wearable display system of claim 1, wherein the plurality of virtual icons comprises a thumbnail of an application.

17. A wearable display system comprising:

a wearable display configured to be positioned in front of an eye of a user, the wearable display configured to project virtual content toward the eye of the user;

a user input device configured to receive user input data associated with movement of a virtual cursor in a virtual environment that comprises virtual 3D content; and a hardware processor in communication with the wearable display and the user input device, the hardware processor programmed to:

direct the wearable display to render a virtual layout of a plurality of virtual icons, wherein at least some of the plurality of virtual icons in the virtual layout are rendered at a first depth in the virtual environment;

receive, via the user input device, user input indicating an instruction to scroll the virtual layout, wherein the user input corresponds to at least one of a head pose gesture, an eye pose gesture, a body pose gesture, or input to a handheld totem;

in response to a determination that a cursor location is moves to a location behind a particular virtual icon of the plurality of virtual icons, wherein the particular virtual icon comprises a representation of a media file, wherein the media file comprises an audio file, inhibit the virtual cursor from obscuring the particular virtual icon by:

directing the wearable display to:

render the particular virtual icon without rendering the virtual cursor thereby inhibiting the virtual cursor from obscuring the particular virtual icon, wherein the particular virtual icon is rendered to appear closer to the user than the virtual cursor had been when the cursor location moved to a location that not behind the particular virtual icon, and render a focus indicator surrounding the particular virtual icon; and in response to receipt of the instruction to scroll the virtual layout:

direct the wearable display to render a virtual content panel that comprises a representation of virtual icons that were not rendered prior to the scroll, the virtual content panel rendered at a second depth in the virtual environment, and cause at least some of the plurality of virtual icons to scroll in a direction corresponding to the user input.

18. The wearable display system of claim 17, wherein the first depth is different from the second depth.

19. The wearable display system of claim 17, wherein the instruction to scroll comprises an indication of at least one of a scroll direction or a scroll speed.

20. The wearable display system of claim 17, wherein the virtual content panel comprises a message indicative of content of the plurality of icons being scrolled.

21. The wearable display system of claim 17, wherein the representation of the virtual icons comprises thumbnails.

22. The wearable display system of claim 17, wherein the scroll of the virtual layout is performed with a momentum or a drag.

23. The wearable display system of claim 17, wherein the user input is first user input and the instruction is a first instruction, wherein the hardware processor is further programmed to:

receive second user input indicating a second instruction to halt the scroll of the virtual layout; and in response to receipt of the second instruction, direct the wearable display to:

cease the scroll of the virtual layout; and cease the render of the virtual content panel.

24. The wearable display system of claim 17, wherein the hardware processor is further programmed to:

identify the cursor location within the environment, wherein the cursor location changes in response to the user input data received by the user input device;

based at least in part on a determination that the cursor location is not behind a location of a virtual icon, direct the wearable display to render a virtual icon of the plurality of virtual icons at the first depth and render the virtual cursor at the cursor location; and based at least in part on the determination that the cursor location is behind the location of the virtual icon of the plurality of virtual icons, direct the wearable display to render the virtual icon at a third depth in lieu of directing the wearable display to render the virtual cursor at the cursor location.

\* \* \* \* \*

UNITED STATES PATENT AND TRADEMARK OFFICE
CERTIFICATE OF CORRECTION

PATENT NO. : 11,567,627 B2
APPLICATION NO. : 15/920830
DATED : January 31, 2023
INVENTOR(S) : John Austin Day et al.

Page 1 of 1

It is certified that error appears in the above-identified patent and that said Letters Patent is hereby corrected as shown below:

In the Claims

Column 54, Claim 1, Line 27:
"comprises a an audio file," should read: --comprises an audio file,--.

Signed and Sealed this
First Day of April, 2025

Coke Morgan Stewart
*Acting Director of the United States Patent and Trademark Office*